(12) United States Patent
Costantino et al.

(10) Patent No.: US 10,711,140 B2
(45) Date of Patent: *Jul. 14, 2020

(54) METHODS FOR SOL-GEL POLYMERIZATION IN ABSENCE OF SOLVENT AND CREATION OF TUNABLE CARBON STRUCTURE FROM SAME

(71) Applicant: Group14 Technologies, Inc., Woodinville, WA (US)

(72) Inventors: Henry R. Costantino, Woodinville, WA (US); Alan Tzu-Yang Chang, Renton, WA (US); Benjamin E. Kron, Seattle, WA (US); Avery J. Sakshaug, Everett, WA (US); Leah A. Thompkins, Seattle, WA (US); Aaron M. Feaver, Seattle, WA (US)

(73) Assignee: Group14 Technologies, Inc., Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,197

(22) Filed: Jan. 16, 2020

(65) Prior Publication Data

US 2020/0148886 A1 May 14, 2020

Related U.S. Application Data

(63) Continuation of application No. 15/125,920, filed as application No. PCT/US2014/029106 on Mar. 14, 2014.

(51) Int. Cl.
*C09C 1/48* (2006.01)
*C08L 77/12* (2006.01)
(Continued)

(52) U.S. Cl.
CPC ............. *C09C 1/48* (2013.01); *C01B 32/05* (2017.08); *C08F 2/02* (2013.01); *C08G 8/22* (2013.01);
(Continued)

(58) Field of Classification Search
None
See application file for complete search history.

(56) References Cited

U.S. PATENT DOCUMENTS 3,518,123 A 6/1970 Katsoulis et al.
3,619,428 A 11/1971 David
(Continued)

FOREIGN PATENT DOCUMENTS

CA 2176452 A1 11/1997
CN 1762900 A 4/2006
(Continued)

OTHER PUBLICATIONS

"A Basic Guide to Particle Characterization," Malvern Instruments Worldwide—White Paper, Retrieved from the Internet: URL:http://golik.co.il/Data/ABasicGuidtoParticleCharacterization(2)1962085150.pdf, XP55089322A, 2012 (26 Pages).
(Continued)

*Primary Examiner* — Colleen P Dunn
(74) *Attorney, Agent, or Firm* — Seed Intellectual Property Law Group LLP

(57) ABSTRACT

The present application is directed to methods for solvent-free preparation of polymers and their subsequent processing into activated carbon materials. These methods unexpectedly demonstrate ability to tune pore structure in the polymer gel and carbon produced there from, while also providing distinct advantages over the current art.

19 Claims, 29 Drawing Sheets

FTIR spectra in the region of ~1800 to ~800 cm-1 for samples 1-1A and 1-1B

(51) Int. Cl.

| | | |
|---|---|---|
| *C08G 73/06* | (2006.01) | |
| *C08G 69/44* | (2006.01) | |
| *C08L 61/34* | (2006.01) | |
| *C08G 14/08* | (2006.01) | |
| *H01M 12/08* | (2006.01) | |
| *H01M 10/06* | (2006.01) | |
| *H01M 4/587* | (2010.01) | |
| *H01G 11/34* | (2013.01) | |
| *H01G 11/24* | (2013.01) | |
| *C01B 32/05* | (2017.01) | |
| *C08F 2/02* | (2006.01) | |
| *C08G 8/22* | (2006.01) | |
| *C08L 79/04* | (2006.01) | |
| *H01M 10/052* | (2010.01) | |
| *H01M 4/62* | (2006.01) | |

(52) U.S. Cl.
CPC ............ *C08G 14/08* (2013.01); *C08G 69/44* (2013.01); *C08G 73/065* (2013.01); *C08G 73/0638* (2013.01); *C08L 61/34* (2013.01); *C08L 77/12* (2013.01); *C08L 79/04* (2013.01); *H01G 11/24* (2013.01); *H01G 11/34* (2013.01); *H01M 4/587* (2013.01); *H01M 10/06* (2013.01); *H01M 12/08* (2013.01); *C01P 2002/82* (2013.01); *C01P 2006/12* (2013.01); *C01P 2006/14* (2013.01); *C01P 2006/17* (2013.01); *C01P 2006/40* (2013.01); *C08L 2201/54* (2013.01); *H01M 4/625* (2013.01); *H01M 10/052* (2013.01); *Y02E 60/128* (2013.01); *Y02E 60/13* (2013.01)

(56) References Cited

U.S. PATENT DOCUMENTS

| | | |
|---|---|---|
| 3,876,505 A | 4/1975 | Stoneburner |
| 3,892,580 A | 7/1975 | Messing |
| 3,977,901 A | 8/1976 | Buzzelli |
| 4,082,694 A | 4/1978 | Wennerberg et al. |
| 4,159,913 A | 7/1979 | Birchall et al. |
| 4,198,382 A | 4/1980 | Matsui |
| 4,543,341 A | 9/1985 | Barringer et al. |
| 4,580,404 A | 4/1986 | Pez et al. |
| 4,769,197 A | 9/1988 | Kromrey |
| 4,843,015 A | 6/1989 | Grubbs, Jr. et al. |
| 4,862,328 A | 8/1989 | Morimoto et al. |
| 4,873,218 A | 10/1989 | Pekala |
| 4,954,469 A | 9/1990 | Robinson |
| 4,997,804 A | 3/1991 | Pekala |
| 4,999,330 A | 3/1991 | Bose et al. |
| 5,061,416 A | 10/1991 | Willkens et al. |
| 5,093,216 A | 3/1992 | Azuma et al. |
| 5,260,855 A | 11/1993 | Kaschmitter et al. |
| 5,294,498 A | 3/1994 | Omaru et al. |
| 5,416,056 A | 5/1995 | Baker |
| 5,420,168 A | 5/1995 | Mayer et al. |
| 5,465,603 A | 11/1995 | Anthony et al. |
| 5,508,341 A | 4/1996 | Mayer et al. |
| 5,529,971 A | 6/1996 | Kaschmitter et al. |
| 5,614,460 A | 3/1997 | Schwarz et al. |
| 5,626,637 A | 5/1997 | Baker |
| 5,626,977 A | 5/1997 | Mayer et al. |
| 5,670,571 A | 9/1997 | Gabrielson et al. |
| 5,674,642 A | 10/1997 | Le et al. |
| 5,710,092 A | 1/1998 | Baker |
| 5,726,118 A | 3/1998 | Ivey et al. |
| 5,744,258 A | 4/1998 | Bai et al. |
| 5,789,338 A | 8/1998 | Kaschmitter et al. |
| 5,834,138 A | 11/1998 | Yamada et al. |
| 5,858,486 A | 1/1999 | Metter et al. |
| 5,882,621 A | 3/1999 | Doddapaneni et al. |
| 5,891,822 A | 4/1999 | Oyama et al. |
| 5,908,896 A | 6/1999 | Mayer et al. |
| 5,945,084 A | 8/1999 | Droege |
| 5,965,483 A | 10/1999 | Baker et al. |
| 6,006,797 A | 12/1999 | Billow et al. |
| 6,064,560 A | 5/2000 | Hirahara et al. |
| 6,069,107 A | 5/2000 | Kuznetsov et al. |
| 6,072,693 A | 6/2000 | Tsushima et al. |
| 6,096,456 A | 8/2000 | Takeuchi et al. |
| 6,117,585 A | 9/2000 | Anani et al. |
| 6,147,213 A | 11/2000 | Poli et al. |
| 6,153,562 A | 11/2000 | Villar et al. |
| 6,205,016 B1 | 3/2001 | Niu |
| 6,225,257 B1 | 5/2001 | Putyera et al. |
| 6,242,127 B1 | 6/2001 | Paik et al. |
| 6,268,081 B1 | 7/2001 | Clough |
| 6,309,446 B1 | 10/2001 | Nakanoya et al. |
| 6,310,762 B1 | 10/2001 | Okamura et al. |
| 6,339,528 B1 | 1/2002 | Lee et al. |
| 6,509,119 B1 | 1/2003 | Kobayashi et al. |
| 6,574,092 B2 | 6/2003 | Sato et al. |
| 6,592,838 B1 | 7/2003 | Nomoto et al. |
| 6,631,072 B1 | 10/2003 | Paul et al. |
| 6,631,073 B1 | 10/2003 | Sakata et al. |
| 6,697,249 B2 | 2/2004 | Maletin et al. |
| 6,764,667 B1 | 7/2004 | Steiner, III |
| 6,815,105 B2 | 11/2004 | Cooper et al. |
| 6,865,068 B1 | 3/2005 | Murakami et al. |
| 7,245,478 B2 | 7/2007 | Zhong et al. |
| 7,419,649 B2 | 9/2008 | Lundquist et al. |
| 7,582,902 B2 | 9/2009 | Tano et al. |
| 7,626,804 B2 | 12/2009 | Yoshio et al. |
| 7,722,991 B2 | 5/2010 | Zhang et al. |
| 7,723,262 B2 | 5/2010 | Feaver et al. |
| 7,754,178 B2 | 7/2010 | Tano et al. |
| 7,785,495 B2 | 8/2010 | Kikuchi et al. |
| 7,816,413 B2 | 10/2010 | Feaver et al. |
| 7,835,136 B2 | 11/2010 | Feaver et al. |
| 8,158,556 B2 | 4/2012 | Feaver et al. |
| 8,293,818 B2 | 10/2012 | Costantino et al. |
| 8,329,252 B2 | 12/2012 | Markavov et al. |
| 8,361,659 B2 | 1/2013 | Richard |
| 8,404,384 B2 | 3/2013 | Feaver et al. |
| 8,411,415 B2 | 4/2013 | Yoshinaga et al. |
| 8,467,170 B2 | 6/2013 | Feaver et al. |
| 8,480,930 B2 | 7/2013 | Suh et al. |
| 8,482,900 B2 | 7/2013 | Gadkaree et al. |
| 8,580,870 B2 | 11/2013 | Costantino et al. |
| 8,654,507 B2 | 2/2014 | Costantino et al. |
| 8,691,177 B2 | 4/2014 | Pfeifer et al. |
| 8,709,971 B2 | 4/2014 | Feaver et al. |
| 8,797,717 B2 | 8/2014 | Feaver et al. |
| 8,906,978 B2 | 12/2014 | Costantino et al. |
| 8,916,296 B2 | 12/2014 | Feaver et al. |
| 8,999,202 B2 | 4/2015 | Mulik et al. |
| 9,005,812 B2 | 4/2015 | Ma et al. |
| 9,067,848 B2 | 6/2015 | Stadie et al. |
| 9,112,230 B2 | 8/2015 | Feaver et al. |
| 9,133,295 B2 | 9/2015 | Qureshi et al. |
| 9,133,337 B2 | 9/2015 | Ludvik et al. |
| 9,136,064 B2 | 9/2015 | Gadkaree et al. |
| 9,186,174 B2 | 11/2015 | Krishnan |
| 9,269,502 B2 | 2/2016 | Chang et al. |
| 9,287,556 B2 | 3/2016 | Neumann et al. |
| 9,409,777 B2 | 8/2016 | Geramita et al. |
| 9,412,523 B2 | 8/2016 | Costantino et al. |
| 9,464,162 B2 | 10/2016 | Kron et al. |
| 9,580,321 B2 | 2/2017 | Feaver et al. |
| 9,666,860 B2 | 5/2017 | Lam et al. |
| 9,680,159 B2 | 6/2017 | Feaver et al. |
| 9,709,971 B2 | 7/2017 | Ellis |
| 9,714,172 B2 | 7/2017 | Geramita et al. |
| 9,985,289 B2 | 5/2018 | Costantino et al. |
| 10,141,122 B2 | 11/2018 | Feaver et al. |
| 10,147,950 B2 | 12/2018 | Sakshaug et al. |
| 10,173,900 B2 | 1/2019 | Ludvik et al. |
| 10,195,583 B2 | 2/2019 | Costantino et al. |
| 10,273,328 B2 | 4/2019 | Kron et al. |
| 10,287,170 B2 | 5/2019 | Feaver et al. |
| 10,454,103 B2 | 10/2019 | Sakshaug et al. |

(56) References Cited

U.S. PATENT DOCUMENTS

| | | | |
|---|---|---|---|
| 10,490,358 B2 | 11/2019 | Feaver et al. |
| 10,522,836 B2 | 12/2019 | Thompkins et al. |
| 2001/0002086 A1 | 5/2001 | Webb |
| 2002/0031706 A1 | 3/2002 | Dasgupta et al. |
| 2002/0031710 A1 | 3/2002 | Kezuka et al. |
| 2002/0036885 A1 | 3/2002 | Lee et al. |
| 2002/0104474 A1 | 8/2002 | Wakamatsu et al. |
| 2002/0114126 A1 | 8/2002 | Hirahara et al. |
| 2002/0122985 A1 | 9/2002 | Sato et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0013606 A1 | 1/2003 | Hampden-Smith et al. |
| 2003/0064564 A1 | 4/2003 | Lin |
| 2003/0108785 A1 | 6/2003 | Wu et al. |
| 2003/0170548 A1 | 9/2003 | Otsuki et al. |
| 2004/0106040 A1 | 6/2004 | Fukuoka et al. |
| 2004/0132845 A1 | 7/2004 | Rhine et al. |
| 2004/0141963 A1 | 7/2004 | Umekawa et al. |
| 2004/0180264 A1 | 9/2004 | Honbo et al. |
| 2004/0241237 A1 | 12/2004 | Pirard et al. |
| 2004/0248730 A1 | 12/2004 | Kim et al. |
| 2004/0248790 A1 | 12/2004 | Hinuma et al. |
| 2005/0014643 A1 | 1/2005 | Lini et al. |
| 2005/0041370 A1 | 2/2005 | Wilk et al. |
| 2005/0058589 A1 | 3/2005 | Lundquist et al. |
| 2005/0058907 A1 | 3/2005 | Kurihara et al. |
| 2005/0079349 A1 | 4/2005 | Hampden-Smith et al. |
| 2005/0079359 A1 | 4/2005 | Fujita et al. |
| 2005/0135993 A1 | 6/2005 | Xu et al. |
| 2005/0153130 A1 | 7/2005 | Long et al. |
| 2005/0196336 A1 | 9/2005 | Chatterjee et al. |
| 2005/0221981 A1 | 10/2005 | Wagh et al. |
| 2005/0233195 A1 | 10/2005 | Arnold et al. |
| 2005/0250011 A1 | 11/2005 | Mitchell et al. |
| 2005/0266990 A1 | 12/2005 | Iwasaki et al. |
| 2005/0282062 A1 | 12/2005 | Manako et al. |
| 2006/0008408 A1 | 1/2006 | Ho Yoon et al. |
| 2006/0057355 A1 | 3/2006 | Suzuki et al. |
| 2006/0079587 A1 | 4/2006 | Albert et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0002523 A1 | 1/2007 | Ando et al. |
| 2007/0008677 A1 | 1/2007 | Zhong et al. |
| 2007/0048605 A1 | 3/2007 | Pez et al. |
| 2007/0104981 A1 | 5/2007 | Lam et al. |
| 2007/0142222 A1 | 6/2007 | Erkey et al. |
| 2007/0166602 A1 | 7/2007 | Burchardt |
| 2008/0011986 A1 | 1/2008 | Yamakawa et al. |
| 2008/0044726 A1 | 2/2008 | Feng et al. |
| 2008/0112876 A1 | 5/2008 | Dailey |
| 2008/0132632 A1 | 6/2008 | Schiraldi et al. |
| 2008/0145757 A1 | 6/2008 | Mah et al. |
| 2008/0145761 A1 | 6/2008 | Petrat et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0293911 A1 | 11/2008 | Qureshi et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0286160 A1 | 11/2009 | Kozono et al. |
| 2009/0305131 A1 | 12/2009 | Kumar et al. |
| 2010/0008021 A1 | 1/2010 | Hu et al. |
| 2010/0047671 A1 | 2/2010 | Chiang et al. |
| 2010/0051881 A1 | 3/2010 | Ahn et al. |
| 2010/0092370 A1 | 4/2010 | Zhang et al. |
| 2010/0097741 A1 | 4/2010 | Zhong et al. |
| 2010/0098615 A1 | 4/2010 | Tennison et al. |
| 2010/0110613 A1 | 5/2010 | Zhong et al. |
| 2010/0279172 A1 | 11/2010 | Hwang et al. |
| 2010/0288970 A1 | 11/2010 | Watanabe et al. |
| 2010/0310941 A1 | 12/2010 | Kumta et al. |
| 2010/0316907 A1 | 12/2010 | Yamamoto et al. |
| 2011/0053765 A1 | 3/2011 | Feaver et al. |
| 2011/0111284 A1 | 5/2011 | Maeshima et al. |
| 2011/0159375 A1 | 6/2011 | Feaver et al. |
| 2011/0177393 A1 | 7/2011 | Park et al. |
| 2011/0200848 A1 | 8/2011 | Chiang et al. |
| 2011/0281180 A1 | 11/2011 | Kim et al. |
| 2011/0287189 A1 | 11/2011 | Shembel |
| 2011/0300447 A1 | 12/2011 | Archer |
| 2011/0311873 A1 | 12/2011 | Schulz et al. |
| 2012/0045685 A1 | 2/2012 | Seki et al. |
| 2012/0129049 A1 | 5/2012 | Rayner |
| 2012/0156493 A1 | 6/2012 | Maisels et al. |
| 2012/0156567 A1 | 6/2012 | Ayme-Perrot et al. |
| 2012/0183856 A1 | 7/2012 | Cui et al. |
| 2012/0241691 A1 | 9/2012 | Soneda et al. |
| 2012/0251876 A1 | 10/2012 | Jagannathan |
| 2012/0262127 A1 | 10/2012 | Feaver et al. |
| 2012/0264020 A1 | 10/2012 | Burton et al. |
| 2012/0305651 A1 | 12/2012 | Anderson et al. |
| 2012/0308870 A1 | 12/2012 | Okuda et al. |
| 2012/0321959 A1 | 12/2012 | Yushin et al. |
| 2013/0082213 A1 | 4/2013 | Duncan et al. |
| 2013/0169238 A1 | 7/2013 | Rojeski |
| 2013/0189575 A1 | 7/2013 | Anguchamy et al. |
| 2013/0244862 A1 | 9/2013 | Ivanovici et al. |
| 2013/0252082 A1 | 9/2013 | Thompkins et al. |
| 2013/0295462 A1 | 11/2013 | Atanassova et al. |
| 2013/0337334 A1 | 12/2013 | Tao et al. |
| 2013/0344391 A1 | 12/2013 | Yushin et al. |
| 2014/0038042 A1 | 2/2014 | Rios et al. |
| 2014/0170482 A1 | 6/2014 | Park et al. |
| 2014/0272592 A1 | 9/2014 | Thompkins et al. |
| 2014/0287317 A1 | 9/2014 | Tiquet et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0162603 A1 | 6/2015 | Yushin et al. |
| 2015/0207148 A1 | 7/2015 | Kimura et al. |
| 2015/0238917 A1 | 8/2015 | Mulik et al. |
| 2015/0306570 A1 | 10/2015 | Mayes et al. |
| 2016/0039970 A1 | 2/2016 | Kron et al. |
| 2016/0043384 A1 | 2/2016 | Zhamu et al. |
| 2016/0104882 A1 | 4/2016 | Yushin et al. |
| 2016/0133394 A1 | 5/2016 | Sakshaug et al. |
| 2016/0344030 A1 | 11/2016 | Sakshaug et al. |
| 2016/0372750 A1 | 12/2016 | Chang et al. |
| 2017/0015559 A1 | 1/2017 | Costantino et al. |
| 2017/0152340 A1 | 6/2017 | Geramita et al. |
| 2017/0316888 A1 | 11/2017 | Geramita et al. |
| 2018/0097240 A1 | 4/2018 | Feaver et al. |
| 2018/0294484 A1 | 10/2018 | Fredrick et al. |
| 2018/0331356 A1 | 11/2018 | Feaver et al. |
| 2019/0088931 A1 | 3/2019 | Abrahamson et al. |
| 2019/0097222 A1 | 3/2019 | Feaver et al. |
| 2019/0103608 A1 | 4/2019 | Costantino et al. |
| 2019/0259546 A1 | 8/2019 | Kron et al. |
| 2019/0267622 A1 | 8/2019 | Sakshaug et al. |
| 2019/0280298 A1 | 9/2019 | Sakshaug et al. |
| 2019/0287737 A1 | 9/2019 | Feaver et al. |
| 2019/0358607 A1 | 11/2019 | Costantino et al. |

FOREIGN PATENT DOCUMENTS

| | | |
|---|---|---|
| CN | 1986401 A | 6/2007 |
| CN | 101318648 A | 12/2008 |
| CN | 101604743 A | 12/2009 |
| CN | 101969120 A | 2/2011 |
| CN | 102820455 A | 12/2012 |

(56) References Cited

FOREIGN PATENT DOCUMENTS

| | | |
|---|---|---|
| CN | 103094528 A | 5/2013 |
| CN | 103746098 A | 4/2014 |
| CN | 104108698 A | 10/2014 |
| CN | 102509781 B | 11/2015 |
| EP | 0 649 815 A1 | 4/1995 |
| EP | 0 861 804 A1 | 9/1998 |
| EP | 0 891 943 A1 | 1/1999 |
| EP | 1 049 116 A1 | 11/2000 |
| EP | 1 052 716 A2 | 11/2000 |
| EP | 1 248 307 A1 | 10/2002 |
| EP | 1 514 859 A2 | 3/2005 |
| EP | 2 117 068 A1 | 11/2009 |
| EP | 2 330 676 A1 | 6/2011 |
| EP | 2 983 186 A1 | 2/2016 |
| JP | 2-300222 A | 12/1990 |
| JP | 4-59806 A | 2/1992 |
| JP | 4-139174 A | 5/1992 |
| JP | 5-117493 A | 5/1993 |
| JP | 5-156121 A | 6/1993 |
| JP | 5-320955 A | 12/1993 |
| JP | 8-59919 A | 3/1996 |
| JP | 8-112539 A | 5/1996 |
| JP | 9-63905 A | 3/1997 |
| JP | 9-275042 A | 10/1997 |
| JP | 10-297912 A | 11/1998 |
| JP | 2001-89119 A | 4/2001 |
| JP | 2001-278609 A | 10/2001 |
| JP | 2004-67498 A | 3/2004 |
| JP | 2004-203715 A | 7/2004 |
| JP | 2004-221332 A | 8/2004 |
| JP | 2004-315283 A | 11/2004 |
| JP | 2005-132696 A | 5/2005 |
| JP | 2005-136397 A | 5/2005 |
| JP | 2005-187320 A | 7/2005 |
| JP | 2006-248848 A | 9/2006 |
| JP | 2006-264993 A | 10/2006 |
| JP | 2007-115749 A | 5/2007 |
| JP | 2008-7387 A | 1/2008 |
| JP | 2008-94925 A | 4/2008 |
| JP | 2009-259803 A | 11/2009 |
| WO | 95/01165 A1 | 1/1995 |
| WO | 02/39468 A2 | 5/2002 |
| WO | 2004/087285 A1 | 10/2004 |
| WO | 2004/099073 A2 | 11/2004 |
| WO | 2005/043653 A1 | 5/2005 |
| WO | 2007/061761 A1 | 5/2007 |
| WO | 2009/032104 A2 | 3/2009 |
| WO | 2010/138760 A2 | 12/2010 |
| WO | 2011/002536 A2 | 1/2011 |
| WO | 2011/003033 A1 | 1/2011 |
| WO | 2012/045002 A1 | 4/2012 |
| WO | 2012/092210 A1 | 7/2012 |
| WO | 2012/167117 A2 | 12/2012 |
| WO | 2013/120009 A1 | 8/2013 |
| WO | 2013/120011 A1 | 8/2013 |
| WO | 2014/201275 A2 | 12/2014 |
| WO | 2019/147836 A2 | 8/2019 |

OTHER PUBLICATIONS

Abánades et al., "Experimental Analysis of Direct Thermal Methane Cracking," *International Journal of Hydrogen Energy* 36(20):12877-12886, 2011.

Abraham et al., "A Polymer Electrolyte-Based Rechargeable Lithium/Oxygen Battery," *J. Electrochem. Soc.* 143(1):1-5, Jan. 1996.

Alcañiz-Monge et al., "Methane Storage in Activated Carbon Fibres," *Carbon* 35(2):291-297, 1997.

Anderegg, "Grading Aggregates: II—The Application of Mathematical Formulas to Mortars," *Industrial and Engineering Chemistry* 23(9): 1058-1064, 1931.

Andreasen et al., "Ueber die Beziehung zwischen Kornabstufung und Zwischenraum in Produkten aus losen Körnern (mit einigen Experimenten)," *Kolloid-Zeitschrift* 50(3):217-228, Mar. 1930, with translation of summary. (17 pages).

Babić et al., "Carbon cryogel as support of platinum nano-sized electrocatalyst for the hydrogen oxidation reaction," *Electrochimica Acta* 51:3820-3826, 2006.

Babić et al., "Characterization of carbon cryogel synthesized by sol-gel polycondensation and freeze-drying," *Carbon* 42:2617-2624, 2004.

Babić et al., "Characterization of carbon cryogels synthesized by sol-gel polycondensation," *J. Serb. Chem. Soc.* 70(1):21-31, 2005.

Barbieri et al., "Capacitance limits of high surface area activated carbons for double layer capacitors," *Carbon* 43:1303-1310, 2005.

Barton et al., "Tailored Porous Materials," *Chem. Mater.* 11:2633-2656, 1999.

Beattie et al., "High-Capacity Lithium-Air Cathodes," *J. Electrochem. Soc.* 156(1):A44-A47, 2009.

Besenhard, "Handbook of battery materials," Weinheim, Wiley—VCH, Weinheim, New York, 398-401, Dec. 31, 1999.

Bock et al., "Structural Investigation of Resorcinol Formaldehyde and Carbon Aerogels Using SAXS and BET," *Journal of Porous Materials* 4:287-294, 1997.

Buiel et al., "Li-insertion in hard carbon anode materials for Li-ion batteries," *Electrochimica Acta* 45:121-130, 1999.

Burchell et al., "Low Pressure Storage of Natural Gas for Vehicular Applications," *The Engineering Society for Advancing Mobility Land Sea Air and Space, Government/Industry Meeting*, Washington D.C., Jun. 19-21, 2000, 7 pages.

Butler et al., "Braking Performance Test Procedure for the Hybrid Vehicle Energy Storage Systems: Capacitor Test Results," Joint International Meeting of the Electrochemical Society, Abstract 686, Honolulu, HI, Oct. 3-8, 2004, 5 pages.

Cao et al., "Li-ion capacitors with carbon cathode and hard carbon/stabilized lithium metal powder anode electrodes," *Journal of Power Sources* 213:180-185, Apr. 2012.

Chmiola et al., "Anomalous Increase in Carbon Capacitance at Pore Sizes Less Than 1 Nanometer," *Science* 313:1760-1763, Sep. 22, 2006.

Conway et al., "Partial Molal Volumes of Tetraulkylammonium Halides and Assignment of Individual Ionic Contributions," *Trans. Faraday Soc.* 62:2738-2749, 1966.

Czakkel et al., "Influence of drying on the morphology of resorcinol-formaldehyde-based carbon gels," *Microporous and Mesoporous Materials* 86:124-133, 2005.

Débart et al., "α-MnO2 Nanowires: A Catalyst for the O2 Electrode in Rechargeable Lithium Batteries," *Agnew. Chem. Int. Ed.* 47:4521-4524, 2008.

Ding et al., "How Conductivities and Viscosities of PC-DEC and PC-EC Solutions of LiBF4, LiPF6, LiBOB, Et4NBF4, and Et4NBF6 Differ and Why," *Journal of The Electrochemical Society* 151(12):A2007-A2015, 2004.

Dinger et al., "Particle Packing III—Discrete versus Continuous Particle Sizes," *Interceram* 41(5):332-334, 1992.

Dinger et al., "Particle Packing IV—Computer Modelling of Particle Packing Phenomena," *Interceram* 42(3):150-152, 1993.

Edward, "Molecular Volumes and the Stokes-Einstein Equation," *Journal of Chemical Education* 47(4):261-270, Apr. 1970.

Eikerling et al., "Optimized Structure of Nanoporous Carbon-Based Double-Layer Capacitors," *Journal of the Electrochemical Society* 152(1):E24-E33, 2005.

Endo et al., "Morphology and organic EDLC applications of chemically activated AR-resin-based carbons," *Carbon* 40:2613-2626, 2002.

Feaver et al., "Activated carbon cryogels for low pressure methane storage," *Carbon* 44:590-593, 2006.

Fotouhi et al., "A Low Cost, Disposable Cable-Shaped Al-Air Battery for Portable Biosensors," *J. Micromech. Microeng.* 26:055011, 2016. (8 pages).

Furnas, "Grading Aggregates I—Mathematical Relations for Beds of Broken Solids of Maximum Density," *Industrial and Engineering Chemistry* 23(9): 1052-1058, 1931.

Gao et al., "Nitrogen-rich graphene from small molecules as high performance anode material," *Nanotechnology* 25:415402, 2014, 8 pages.

(56) References Cited

OTHER PUBLICATIONS

Gouérec et al., "Preparation and Modification of Polyacrylonitrile Microcellular Foam Films for Use as Electrodes in Supercapacitors," *Journal of the Electrochemical Society* 148(1):A94-A101, 2001.

Hahn et al., "A dilatometric study of the voltage limitation of carbonaceous electrodes in aprotic EDLC type electrolytes by charge-induced strain," *Carbon* 44:2523-2533, 2006.

Hasegawa et al., "Preparation of carbon gel microspheres containing silicon powder for lithium ion battery anodes," *Carbon* 42:2573-2579, 2004.

Hirscher et al., "Are carbon nanostructures an efficient hydrogen storage medium?" *Journal of Alloys and Compounds* 356-357:433-437, 2003.

Hong et al., "Hydrogen evolution inhibition with diethylenetriamine modification of activated carbon for a lead-acid battery," *RSC Adv.* 4:33574-33577, 2014.

Hsieh et al., "Synthesis of mesoporous carbon composite and its electric double-layer formation behavior," *Microporous and Mesoporous Materials* 93:232-239, 2006.

Hu et al., "Effects of electrolytes and electrochemical pretreatments on the capacitive characteristics of activated carbon fabrics for supercapacitors," *Journal of Power Sources* 125:299-308, 2004.

Huang et al., "Nitrogen-containing mesoporous carbons prepared from melamine formaldehyde resins with $CaCl_2$ as a template," *J. Colloid Interface Sci.* 363(1):193-198, 2011.

Indo German Carbons Limited, "Activated Carbon," Apr. 2009, URL=http://www.igcl.com/php/activated_carbon.php, download date Nov. 29, 2018, 3 pages.

Inomata et al., "Natural gas storage in activated carbon pellets without a binder," *Carbon* 40:87-93, 2002.

Job et al., "Carbon aerogels, cryogels and xerogels: Influence of the drying method on the textural properties of porous carbon materials," *Carbon* 43:2481-2494, 2005.

Job et al., "Highly dispersed platinum catalysts prepared by impregnation of texture-tailored carbon xerogels," *Journal of Catalysis* 240:160-171, 2006.

Job et al., "Synthesis of transition metal-doped carbon xerogels by solubilization of metal salts in resorcinol-formaldehyde aqueous solution," *Carbon* 42:3217-3227, 2004.

Khomenko et al., "High-voltage asymmetric supercapacitors operating in aqueous electrolyte," *Appl. Phys. A* 82:567-573, 2006.

Kim et al., "Correlation between the capacitor performance and pore structure," *Tanso* 221:31-39, 2006.

Kim et al., "Adsorption of phenol and reactive dyes from aqueous solution on carbon cryogel microspheres with controlled porous structure," *Microporous and Mesoporous Materials* 96:191-196, 2006 (English Abstract).

Kocklenberg et al., "Texture control of freeze-dried resorcinol-formaldehyde gels," *Journal of Non-Crystalline Solids* 225:8-13, 1998.

Konno et al., "Preparation of activated carbon having the structure derived from biomass by alkali activation with NaOH, and its application for electric double-layer capacitor," *Tanso* 231:2-7, 2008 (English Abstract).

Kowalczyk et al., "Estimation of the pore-size distribution function from the nitrogen adsorption isotherm. Comparison of density functional theory and the method of Do and co-workers," *Carbon* 41:1113-1125, 2003.

Lozano-Castelló et al., "Influence of pore structure and surface chemistry on electric double layer capacitance in non-aqueous electrolyte," *Carbon* 41:1765-1775, 2003.

Lozano-Castelló et al., "Powdered Activated Carbons and Activated Carbon Fibers for Methane Storage: A Comparative Study," *Energy & Fuels* 16:1321-1328, 2002.

McEwen et al., "Nonaqueous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.

Miller, "Pulse Power Performance of Electrochemical Capacitors: Technical Status of Present Commercial Devices," Proceedings of the 8th International Seminar on Double Layer Capacitors and Similar Energy Storage Devices, Deerfield Beach, Florida, Dec. 7-9, 1998, 9 pages.

Naoi et al., "Second generation 'nanohybrid supercapacitor': Evolution of capacitive energy storage devices," *Energy Environ. Sci.* 5:9363-9373, 2012.

Nishihara et al., "Preparation of resorcinol—formaldehyde carbon cryogel microhoneycombs," *Carbon* 42:899-901, 2004.

Ogasawara et al., "Rechargeable $LI_2O_2$ Electrode for Lithium Batteries," *Journal of the American Chemical Society* 128(4):1390-1393, 2006.

Otowa et al., "Production and adsorption characteristics of MAXSORB: High-surface-area active carbon," *Gas Separation and Purification* 7(4):241-245, 1993.

Pääkkö, "Long and entangled native cellulose I nanofibers allow flexible aerogels and hierarchically porous templates for functionalities," *Soft Matter* 4:2492-2499, 2008.

Pekala et al., "Aerogels derived from multifunctional organic monomers," *Journal of Non-Crystalline Solids* 145:90-98, 1992.

Pekala et al., "Structure of Organic Aerogels. 1. Morphology and Scaling," *Macromolecules* 26:5487-5493, 1993.

Pekala, "Organic aerogels from the polycondensation of resorcinol with formaldehyde," *Journal of Materials Science* 24:3221-3227, 1989.

Perrin et al., "Methane Storage within Dry and Wet Active Carbons: A Comparative Study," *Energy & Fuels* 17:1283-1291, 2003.

Pimenta et al., "Studying disorder in graphite-based systems by Raman spectroscopy," *Phys. Chem. Chem. Phys.* 9:1276-1291, 2007.

Pojanavaraphan et al., "Prevulcanized natural rubber latex/clay aerogel nanocomposites," *European Polymer Journal* 44:1968-1977, 2008.

Qu et al., "Studies of activated carbons used in double-layer capacitors," *Journal of Power Sources* 74:99-107, 1998.

Ravikovitch et al., "Unified Approach to Pore Size Characterization of Microporous Carbonaceous Materials from N2, Ar, and CO2 Adsorption Isotherms," *Langmuir* 16:2311-2320, 2000.

Read, "Ether-Based Electrolytes for the Lithium/Oxygen Organic Electrolyte Battery," *J. Electrochem. Soc.* 153(1):A96-A100, 2006.

Read et al., "Oxygen Transport Properties of Organic Electrolytes and Performance of Lithium/Oxygen Battery," *J. Electrochem. Soc.* 150(10):A1351-A1356, 2003.

Read, "Characterization of the Lithium/Oxygen Organic Electrolyte Battery," *J. Electrochemical Soc.* 149(9):A1190-A1195, 2002.

Reichenauer et al., "Microporosity in carbon aerogels," *Journal of Non-Crystalline Solids* 225:210-214, 1998.

Salitra et al., "Carbon Electrodes for Double-Layer Capacitors I. Relations Between Ion and Pore Dimensions," *Journal of the Electrochemical Society* 147(7):2486-2493, 2000.

Setoyama et al., "Simulation Study on the Relationship Between a High Resolution $\alpha_s$-Plot and the Pore Size Distribution for Activated Carbon," *Carbon* 36(10):1459-1467, 1998.

Simon et al., "Materials for electrochemical capacitors," *Nature Materials* 7:845-854, Nov. 2008.

Sivakkumar et al., "Evaluation of Lithium-ion capacitors assembled with pre-lithiated graphite anode and activated carbon cathode," *Electrochimica Acta* 65:280-287, Jan. 2012.

Takeuchi et al., "Removal of single component chlorinated hydrocarbon vapor by activated carbon of very high surface area," *Separation and Purification Technology* 15:79-90, 1999.

Tamon et al., "Influence of freeze-drying conditions on the mesoporosity of organic gels as carbon precursors," *Carbon* 38:1099-1105, 2000.

Tamon et al., "Preparation of mesoporous carbon by freeze drying," *Carbon* 37:2049-2055, 1999.

Tonanon et al., "Influence of surfactants on porous properties of carbon cryogels prepared by sol-gel polycondensation of resorcinol and formaldehyde," *Carbon* 41:2981-2990, 2003.

Toyo Tanso Carbon Products, "Special Graphite and Compound Material Products," Toyo Tanso Co., Ltd. Catalog published 2008.

(56) References Cited

OTHER PUBLICATIONS

Toyo Tanso, "Graphite Applications," Toyo Tanso Co., Ltd. Catalog published 1998. (Machine Translation Attached).
Toyo Tanso, "Isotropic Graphite Engineering Data," Toyo Tanso Co., Ltd. Catalog published 1994.
Toyo Tanso, "Isotropic Graphite Technical Data," Toyo Tanso Co., Ltd. Catalog published 1997.
Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.
WebElements, "Lead: the essentials," attached as a PDF showing the webpage availability date as of Aug. 14, 2009 (via the Wayback Machine), web URL is http://www.webelements.com/lead/, pp. 1-3.
Wei et al., "A novel electrode material for electric double-layer capacitors," *Journal of Power Sources* 141:386-391, 2005.
Williford et al., "Air electrode design for sustained high power operation of Li/air batteries," *Journal of Power Sources* 194:1164-1170, 2009.
Wu et al., "Fabrication and nano-structure control of carbon aerogels via a microemulsion-templated sol-gel polymerization method," *Carbon* 44:675-681, 2006.
Xiang et al., "Beneficial effects of activated carbon additives on the performance of negative lead-acid battery electrode for high-rate partial-state-of-charge operation," *Journal of Power Sources* 241:150-158, 2013.
Xie et al., "Pore size control of Pitch-based activated carbon fibers by pyrolytic deposition of propylene," *Applied Surface Science* 250:152-160, 2005.
Xu et al., "Optimization of Nonaqueous Electrolytes for Primary Lithium/Air Batteries Operated in Ambient Environment," *Journal of the Electrochemical Society* 156(10):A773-A779, 2009.
Xu et al., "Synthesis of mesoporous carbon and its adsorption property to biomolecules," *Microporous and Mesoporous Materials* 115:461-468, 2008.
Yamamoto et al., "Porous properties of carbon gel microspheres as adsorbents for gas separation," *Carbon* 42:1671-1676, 2004.
Yamamoto et al., "Control of mesoporosity of carbon gels prepared by sol-gel polycondensation and freeze drying," *Journal of Non-Crystalline Solids* 288:46-55, 2001.
Yamamoto et al., "Preparation and characterization of carbon cryogel microspheres," *Carbon* 40:1345-1351, 2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte Li/O2 battery," *Journal of Power Sources* 195:1235-1240, 2010.
Zhao et al., "Highly-Ordered Mesoporous Carbon Nitride with Ultrahigh Surface Area and Pore Volume as a Superior Dehydrogenation Catalyst," *Chem. Mater.* 26(10):3151-3161, 2014.

FTIR spectra in the region of ~1800 to ~800 cm-1 for samples 3-1A, 3-1B, 3-2A, and 3-2B (A) Nitrogen sorption isotherm for sample 9-5B.
(B) Pore volume distribution for sample 9-5B.

(A) Nitrogen sorption isotherm for sample 10-3.
(B) Pore volume distribution for sample 10-3.

FTIR spectra of glucose resin (cured at 140 C, 2hrs).

Voltage profile of carbon produced from glucose resin.

FTIR spectra of glucose resin (cured at 140 C, 48 hrs).

Voltage profile of carbon produced from fructose resin.

Nitrogen sorption isotherm for Sample 14-1.

Nitrogen sorption isotherm for Sample 17-1.

METHODS FOR SOL-GEL POLYMERIZATION IN ABSENCE OF SOLVENT AND CREATION OF TUNABLE CARBON STRUCTURE FROM SAME

BACKGROUND

Technical Field

The present invention generally relates to novel methods for preparing polymeric resin materials without the use of solvent, and preparation of carbon materials from the same.

Description of the Related Art

Activated carbon is commonly employed in electrical storage and distribution devices. The surface area, conductivity and porosity of activated carbon allows for the design of electrical devices having desirable electrochemical performance. Electric double-layer capacitors (EDLCs or "ultracapacitors") are an example of such devices. EDLCs often have electrodes prepared from an activated carbon material and a suitable electrolyte, and have an extremely high energy density compared to more common capacitors. Typical uses for EDLCs include energy storage and distribution in devices requiring short bursts of power for data transmissions, or peak-power functions such as wireless modems, mobile phones, digital cameras and other hand-held electronic devices. EDLCs are also commonly used in electric vehicles such as electric cars, trains, buses and the like.

Batteries are another common energy storage and distribution device which often contain an activated carbon material (e.g., as anode material, current collector, or conductivity enhancer). For example, lithium/carbon batteries having a carbonaceous anode intercalated with lithium represent a promising energy storage device. Other types of carbon-containing batteries include lithium air batteries, which use porous carbon as the current collector for the air electrode, and lead acid batteries which often include carbon additives in either the anode or cathode. Batteries are employed in any number of electronic devices requiring low current density electrical power (as compared to an EDLC's high current density).

One known limitation of EDLCs and carbon-based batteries is decreased performance at high-temperature, high voltage operation, repeated charge/discharge cycles and/or upon aging. This decreased performance has been attributed, at least in part, to electrolyte impurity or impurities in the carbon electrode itself, causing breakdown of the electrode at the electrolyte/electrode interface. Thus, it has been suggested that EDLCs and/or batteries comprising electrodes prepared from higher purity carbon materials could be operated at higher voltages and for longer periods of time at higher temperatures than existing devices.

In addition to purity, another known limitation of carbon-containing electrical devices is the pore structure of the activated carbon itself. While activated carbon materials typically comprise high porosity, the pore size distribution is not optimized for use in electrical energy storage and distribution devices. Such optimization may include a blend of both micropores and mesopores. Additionally in some applications a high surface area carbon may be desirable, while in others a low surface area material is preferred. Idealized pore size distributions can maximize performance attributes including but not limited to, increased ion mobility (i.e., lower resistance), increased power density, improved volumetric capacitance, increased cycle life efficiency of devices prepared from the optimized carbon materials.

One common method for producing carbon materials is to pyrolyze an existing carbon-containing material (e.g., coconut fibers or tire rubber). This results in a char with relatively low surface area which can subsequently be over-activated to produce a material with the surface area and porosity necessary for the desired application. Such an approach is inherently limited by the existing structure of the precursor material, and typically results in a carbon material having non-optimized pore structure and an ash content (e.g., metal impurities) of 1% or higher.

Activated carbon materials can also be prepared by chemical activation. For example, treatment of a carbon-containing material with an acid, base or salt (e.g., phosphoric acid, potassium hydroxide, sodium hydroxide, zinc chloride, etc.) followed by heating results in an activated carbon material. However, such chemical activation also produces an activated carbon material not suitable for use in high performance electrical devices.

Another approach for producing high surface area activated carbon materials is to prepare a synthetic polymer from carbon-containing organic building blocks (e.g., a polymer gel). As with the existing organic materials, the synthetically prepared polymers are pyrolyzed and activated to produce an activated carbon material. To this end, the current approach is to conduct the polymerization, for example creation of sol-gel polymer, in the presence of one or more solvents. Upon removal of solvents, the dried gel exhibits a pore structure as a result of the voids left behind by the removed solvent. Solvents do not become part of the carbon network, therefore this traditional approach results in lower carbon yield per mass of precursor materials, and higher processing costs since solvent removal is an energy-intensive process Accordingly, a polymer manufacturing approach that improving carbon yield and reduce carbon processing costs is needed. The present invention, which provides for tunable pore structures contrary to current teachings in the art, fulfills these needs and provides further related advantages.

BRIEF SUMMARY

In general terms, the current invention is directed to novel methods for preparing polymers and their further processing into carbon materials comprising tunable pore structure. The methods generally comprise preparation of a mixture of solid polymer precursors and crosslinking agents, blending in the solid form, and exposure to sufficient conditions to promote polymerization. The process can be carried out in various modes to create polymer particles of various sizes and geometries. The resulting polymer can then optionally be converted to carbon materials by any number of post-processing procedures, including pyrolysis and/or activation.

Prior art teaches that solvents are required (i.e., sol-gel polymerization) to produce polymers suitable for manufacturing tunable carbon materials. The present inventors have discovered novel polymerization methodologies with little or no solvent employed that unexpected allowed for preparation of tunable carbon pore structures.

Solvent-free polymer gels and carbon materials prepared according to the disclosed methods are also provided. Electrodes and devices comprising the carbon materials are also provided. These and other aspects of the invention will be apparent upon reference to the following detailed description. To this end, various references are set forth herein which describe in more detail certain background information, procedures, compounds and/or compositions, and are each hereby incorporated by reference in their entirety.

Accordingly, in some embodiments the present invention provides a method for preparing a polymer, the method comprising physical blending of a mixture of particles comprising polymer precursors and aging the mixture at a temperature and for a time sufficient for the one or more polymer precursors to react with each other and form a polymer gel, and wherein the mixture comprises less than 10% solvent by weight. For example, in some embodiments the mixture comprises less than 1% solvent by weight. In other embodiments, the mixture comprises less than 0.1% solvent by weight.

In different embodiments of the foregoing method, the temperature is at or above the glass transition temperature of one or more species of polymer precursor particles.

In still other embodiments, the temperature is at or above the melting temperature of one or more species of polymer precursor particles. In other embodiments, the temperature is at or above 30 C below the melting temperature of one or more species of polymer precursor particles.

In certain other embodiments of the foregoing, the polymer precursors are selected from an amine-containing compound, an alcohol-containing compound and a carbonyl-containing compound. In other embodiments, the polymer precursors are selected from an alcohol, a phenol compound, a polyalcohol, a sugar, an alkyl amine, an aromatic amine, an aldehyde, a ketone, a carboxylic acid, an ester, melamine, a urea, an acid halide and an isocyanate. In more specific embodiments, the phenolic compound is phenol, resorcinol, naphthol, bisphenol A, or any combination thereof. In other embodiments, the sugar is fructose, sucrose, glucose, or any combination thereof. In some embodiments, the carboxylic acid is acetic acid, formic acid, oxalic acid, lactic acid, citric acid, cyanuric acid, or any combination thereof.

In some embodiments, the polymer precursors further comprise hexamethylenetetramine. For example, in some embodiments the polymer precursors comprise hexamethylenetetramine and bisphenol A present at a mole ratio between 0.05:1 to 5:1.

In other embodiments, the method further comprises pyrolyzing the solvent free polymer gel particles in an inert atmosphere at temperatures ranging from 500° C. to 2400° C. to obtain pyrolyzed polymer gel particles.

In other embodiments, the method further comprises activating the pyrolyzed polymer gel particles to obtain activated polymer gel particles by a method comprising contacting the pyrolyzed polymer gel particles with an atmosphere comprising carbon dioxide, carbon monoxide, steam, oxygen or combinations thereof at a temperature may ranging from 800° C. to 1300° C.

In other embodiments, the invention provides a carbon material having a maximum theoretical capacitance of greater than 26 F/cm$^3$, wherein the capacitance is measured at a current density of 0.5 Amp/g employing an electrolyte comprising tetraethylammonium tetrafluoroborane in acetonitrile. In some embodiments, the maximum theoretical capacitance is greater than 27 F/cm$^3$. In other embodiments, the maximum theoretical capacitance is greater than 28 F/cm$^3$. In still more embodiments, the maximum theoretical capacitance is greater than 29 F/cm$^3$.

In various other embodiments of the foregoing carbon material, the nitrogen content is 1-8%.

In some embodiments, an electrode comprising the foregoing carbon material is provided.

Also provided in various embodiments is an electrode comprising carbon, wherein the carbon comprises a maximum theoretical capacitance of greater than 25 F/cm$^3$, wherein the capacitance is measured after incubation at 3 V and 65 C for 12 h, and at a current density of 0.5 Amp/g employing an electrolyte comprising tetraethylammonium tetrafluoroborane in acetonitrile.

In different embodiments, the invention is directed to an electrical energy storage device comprising the foregoing electrode. In some embodiments, the electrical energy storage device is an electric double layer capacitor. In other embodiments, the electrical energy storage device is a battery. In still other embodiments, the electrical energy storage device is a lithium/carbon battery, zinc/carbon battery, lithium air battery or lead acid battery.

In other embodiments, a solvent-free process for producing a carbon within a reactor is provided, wherein the process comprises:
(a) reducing the particle size of solid polymer precursor materials, either within or external to the reactor;
(b) introducing particles of polymer precursor materials into the reactor;
(c) thorough blending of particles within the reactor or reactor feeding mechanism;
(d) incubating at a temperature, residence time, and atmosphere suitable to induce polymerization; and
(e) incubating at a temperature, residence time, and atmosphere suitable to induce pyrolysis, activation, reduction of surface functional groups, or any combination thereof.

A solvent-free process for increasing the nitrogen content of carbonaceous material is also provided in a different embodiments, wherein the process comprises:
(a) physically mixing carbonaceous material and a compound capable of decomposing to formaldehyde and ammonia;
(b) incubating at a temperature, residence time, and atmosphere suitable to induce nitrogen incorporation; and
(c) incubating at a temperature, residence time, and atmosphere suitable to remove unreacted components.

In some embodiments of the foregoing process, the compound is hexamethylenetetramine.

Other electrodes comprising carbon are also provided, wherein the carbon comprises a BF of 0.1 or lower, wherein the BF is measured employing an electrolyte comprising tetraethylammonium tetrafluoroborane in acetonitrile.

In still more embodiments, an electrode comprising carbon is provided, wherein the carbon comprises a BF of 0.1 or lower, wherein the capacitance is measured after incubation at 3 V and 65 C for 12 h employing an electrolyte comprising tetraethylammonium tetrafluoroborane in acetonitrile.

These and other aspects of the invention will be apparent upon reference to the following detailed description. To this end, various references are set forth herein which describe in more detail certain background information, procedures, compounds and/or compositions, and are each hereby incorporated by reference in their entirety.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
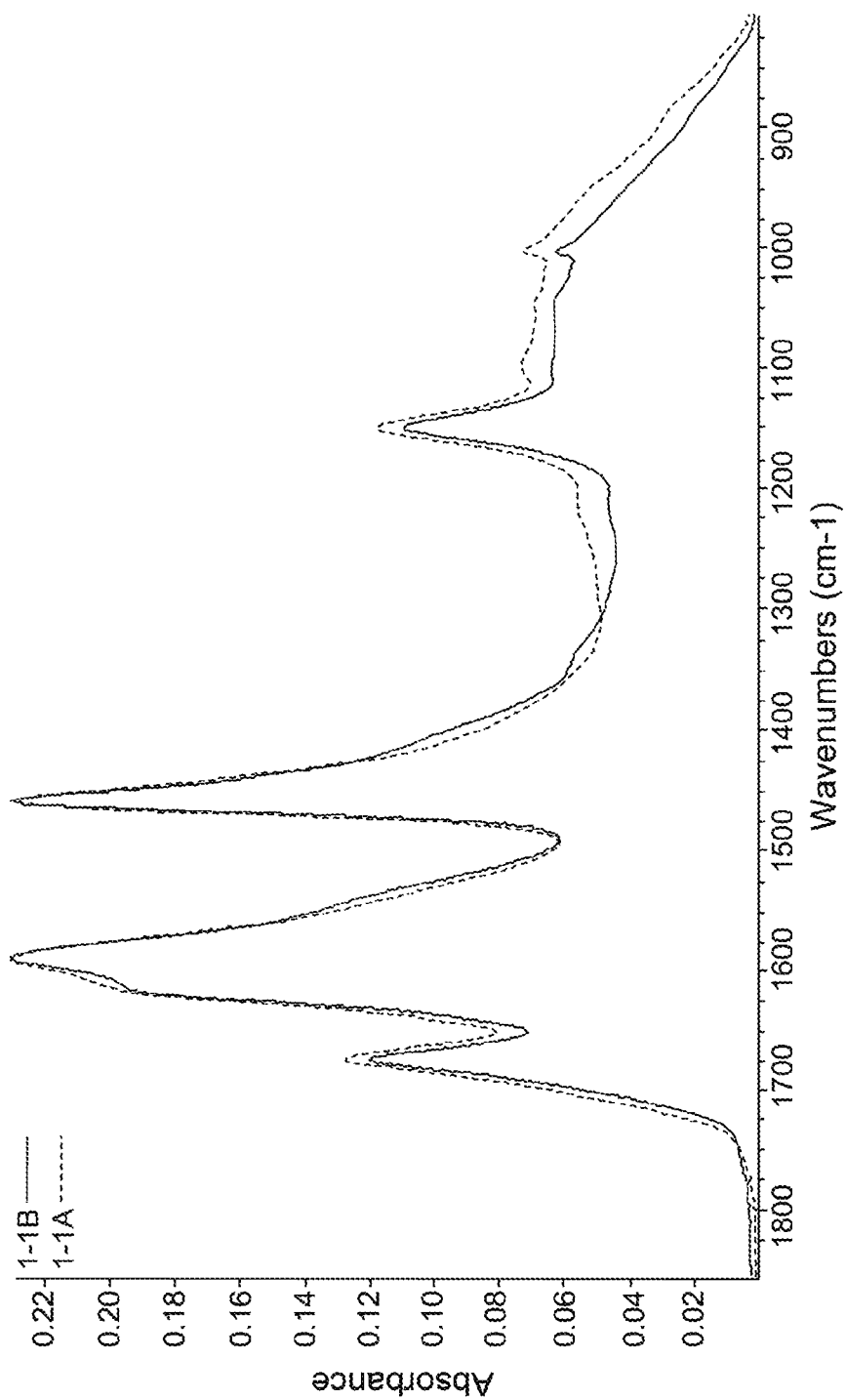
FIGS. 1-14 are FTIR spectra of exemplary samples.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Definitions

As used herein, and unless the context dictates otherwise, the following terms have the meanings as specified below.

"Carbon material" refers to a material or substance comprised substantially of carbon (e.g., >90%, >95%, greater than 99% or greater than 99.9% carbon on a weight basis). Carbon materials include ultrapure as well as amorphous and crystalline carbon materials. Some carbon materials may comprise electrochemical modifiers (e.g. Si or N) to modify (e.g., enhance) device performance as described in more detail below. Examples of carbon materials include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like.

"Electrochemical modifier" refers to any chemical element, compound comprising a chemical element or any combination of different chemical elements and compounds which modifies (e.g., enhances or decreases) the electrochemical performance of a carbon material. Electrochemical modifiers can change (increase or decrease) the resistance, capacity, power performance, stability and other properties of a carbon material. Electrochemical modifiers generally impart a desired electrochemical effect. In contrast, an impurity in a carbon material is generally undesired and tends to degrade, rather than enhance, the electrochemical performance of the carbon material. Examples of electrochemical modifiers within the context of the present disclosure include, but are not limited to, elements, and compounds or oxides comprising elements, in groups 12-15 of the periodic table, other elements such as sulfur, tungsten and silver and combinations thereof. For example, electrochemical modifiers include, but are not limited to, lead, tin, antimony, bismuth, arsenic, tungsten, silver, zinc, cadmium, indium, silicon and combinations thereof as well as oxides of the same and compounds comprising the same.

"Group 12" elements include zinc (Zn), cadmium (Cd), mercury (Hg), and copernicium (Cn).

"Group 13" elements include boron (B), aluminum (Al), gallium (Ga), indium (In) and thallium (Tl).

"Group 14" elements include carbon (C), silicon (Si), germanium (Ge), tin (Sn) and lead (Pb).

"Group 15" elements include nitrogen (N), phosphorous (P), arsenic (As), antimony (Sb) and bismuth (Bi).

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphene.

"Synthetic" refers to a substance which has been prepared by chemical means rather than from a natural source. For example, a synthetic carbon material is one which is synthesized from precursor materials and is not isolated from natural sources.

"Impurity" or "impurity element" refers to an undesired foreign substance (e.g., a chemical element) within a material which differs from the chemical composition of the base material. For example, an impurity in a carbon material refers to any element or combination of elements, other than carbon, which is present in the carbon material. Impurity levels are typically expressed in parts per million (ppm).

"PIXE impurity" or "PIXE element" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, a polymer gel or a carbon material. PIXE impurity concentrations and identities may be determined by proton induced x-ray emission (PIXE).

"Ultrapure" refers to a substance having a total PIXE impurity content of less than 0.050%. For example, an "ultrapure carbon material" is a carbon material having a total PIXE impurity content of less than 0.050% (i.e., 500 ppm).

"Ash content" refers to the nonvolatile inorganic matter which remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a macromolecule comprised of one or more structural repeating units.

"Synthetic polymer precursor material" or "polymer precursor" refers to compounds used in the preparation of a synthetic polymer. Polymer precursors are generally compounds which may combined (i.e., reacted) with other compounds to form a polymer, for example a condensation polymer. Polymer precursors include monomers, as well as monomers which have been partially polymerized (i.e., dimers, oligomers, etc.). Generally, the polymer precursors are selected from aromatic or aliphatic alcohols or amines and carbonyl containing compounds (e.g., carboxylic acids, ketones, aledehydes, isocyanates, ureas, amides, acid halides, esters, activated carbonyl-containing compounds and the like). Examples of polymer precursors that can be used in certain embodiments of the preparations disclosed herein include, but are not limited to, aldehydes (i.e., HC(=O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, naphthol, and phloroglucinol. Amines, such as melamine, and urea may also be used. Mixtures of two or more polyhydroxy benzenes are also contemplated within the meaning of polymer precursor. Yet another example of a useful polymer precursor in this regard is cyanuric acid and related compounds comprising both carboxylic groups and anime groups.

"Condensation polymer" is a polymer that results from reaction of one or more polymer precursors with elimination of a small molecule (e.g. water). Exemplary condensation polymers include, but are not limited to, polymers formed from reaction of an alcohol or amine with a carbonyl containing compound.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"RF polymer hydrogel" refers to a sub-class of polymer gel wherein the polymer was formed from the catalyzed reaction of resorcinol and formaldehyde in water or mixtures of water and one or more water-miscible solvent.

"Continuous Phase" refers to the liquid phase in which the polymerization components (i.e., polymer precursors, catalyst, acid, etc.) are dissolved, suspended and/or emulsified. Continuous phases may be either hydrophilic or hydrophobic and have varying viscosities. Mixtures of two or more different continuous phases are also contemplated. Any number of different liquids (e.g., solvents) may be employed within the context of the invention as described in more detail herein.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Miscible" refers to the property of a mixture wherein the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a polymer gel (e.g., an ultrapure polymer gel) as described herein can be any compound that facilitates the polymerization of the polymer precursors to form an ultrapure polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Solvent" refers to a substance which dissolves or suspends reactants (e.g., ultrapure polymer precursors) and provides a medium in which a reaction may occur. Examples of solvents useful in the preparation of the gels, ultrapure polymer gels, ultrapure synthetic carbon materials and ultrapure synthetic amorphous carbon materials disclosed herein include, but are not limited to, water, alcohols and mixtures thereof. Exemplary alcohols include ethanol, t-butanol, methanol and mixtures thereof. Such solvents are useful for dissolution of the synthetic ultrapure polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

"Dried gel" or "dried polymer gel" refers to a gel or polymer gel, respectively, from which the solvent, generally water, or mixture of water and one or more water-miscible solvents, has been substantially removed.

"Pyrolyzed dried polymer gel" refers to a dried polymer gel which has been pyrolyzed but not yet activated, while an "activated dried polymer gel" refers to a dried polymer gel which has been activated.

"Cryogel" refers to a dried gel that has been dried by freeze drying.

"RF cryogel" refers to a dried gel that has been dried by freeze drying wherein the gel was formed from the catalyzed reaction of resorcinol and formaldehyde.

"Pyrolyzed cryogel" is a cryogel that has been pyrolyzed but not yet activated.

"Activated cryogel" is a cryogel which has been activated to obtain activated carbon material.

"Xerogel" refers to a dried gel that has been dried by air drying, for example, at or below atmospheric pressure.

"Pyrolyzed xerogel" is a xerogel that has been pyrolyzed but not yet activated.

"Activated xerogel" is a xerogel which has been activated to obtain activated carbon material.

"Aerogel" refers to a dried gel that has been dried by supercritical drying, for example, using supercritical carbon dioxide.

"Pyrolyzed aerogel" is an aerogel that has been pyrolyzed but not yet activated.

"Activated aerogel" is an aerogel which has been activated to obtain activated carbon material.

"Organic extraction solvent" refers to an organic solvent added to a polymer hydrogel after polymerization of the polymer precursors has begun, generally after polymerization of the polymer hydrogel is complete.

"Rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about $-10°$ C. Alternatively, the suitably cold medium can be a gas, liquid, or solid with a temperature below about $-20°$ C. Alternatively, the suitably cold medium can be a gas, liquid, or solid with a temperature below about $-30°$ C.

"Activate" and "activation" each refer to the process of heating a raw material or carbonized/pyrolyzed substance at an activation dwell temperature during exposure to oxidizing atmospheres (e.g., carbon dioxide, oxygen, steam or combinations thereof) to produce an "activated" substance (e.g., activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon, nitrogen or combinations thereof) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution and pore length. Generally the pore structure of an activated carbon material comprises micropores and mesopores. For example, in certain embodiments the ratio of micropores to mesopores is optimized for enhanced electrochemical performance.

"Mesopore" refers to a pore having a diameter ranging from 2 nanometers to 50 nanometers while the term "micropore" refers to a pore having a diameter less than 2 nanometers.

"Macropore" refers to a pore having a diameter greater than 50 nm.

"Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Effective length" refers to the portion of the length of the pore that is of sufficient diameter such that it is available to accept salt ions from the electrolyte.

"Electrode" refers to a conductor through which electricity enters or leaves an object, substance or region.

"Binder" refers to a material capable of holding individual particles of a substance (e.g., a carbon material) together such that after mixing a binder and the particles together the resulting mixture can be formed into sheets, pellets, disks or other shapes. In certain embodiments, an electrode may comprise the disclosed carbon materials and a binder. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Inert" refers to a material that is not active in the electrolyte of an electrical energy storage device, that is it does not absorb a significant amount of ions or change chemically, e.g., degrade.

"Conductive" refers to the ability of a material to conduct electrons through transmission of loosely held valence electrons.

"Current collector" refers to a part of an electrical energy storage and/or distribution device which provides an electrical connection to facilitate the flow of electricity in to, or out of, the device. Current collectors often comprise metal and/or other conductive materials and may be used as a backing for electrodes to facilitate the flow of electricity to and from the electrode.

"Electrolyte" means a substance containing free ions such that the substance is electrically conductive. Electrolytes are commonly employed in electrical energy storage devices. Examples of electrolytes include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as tetralkylammonium salts such as TEA TFB (tetraethylammonium tetrafluoroborate), MTEATFB (methyltriethylammonium tetrafluoroborate), EMITFB (1-ethyl-3-methylimidazolium tetrafluoroborate), tetraethylammonium, triethylammonium based salts or mixtures thereof. In some embodiments, the electrolyte can be a water-based acid or water-based base electrolyte such as mild aqueous sulfuric acid or aqueous potassium hydroxide.

"Solvent-free" mixture refers to a mixture of solid or liquid components (for instance mixture of polymer precursors and cross linking agents) that does not comprise an added liquid at a level that dissolves or dilutes one or more of the solid or liquid components.

"Maximum theoretical volumetric capacitance" is the volumetric capacitance of carbon as calculated as the F/g divided by the total volume which is the sum of carbon skeletal volume (generally assumed to be 0.439 cm3/g) and the total pore volume as measured by nitrogen sorption. Unless otherwise specified, electrochemical data presented herein (including the maximum theoretical volumetric capacitance) are based on carbon electrode comprised of 92% active carbon, 5% conductivity enhancer and 3% binder at a current density of 0.5 Amp/g employing an electrolyte comprising tetraethylammonium tetrafluoroborane in acetonitrile.

A. Preparation of Polymer Gels and Carbon Materials

The structure, properties and methods for making various carbon materials and polymer gels are described herein and in U.S. Pub. Nos. 2007/0113735; 2011/0028599; 2011/0002086; 2011/0223494; 2011/0159375; 2012/0081838; 2012/0202033; 2013/0004841; 2013/0252082 and 2013/0280601, the full disclosures of which are hereby incorporated by reference in their entireties.

The disclosed preparation of carbon materials represents a number of advances over currently known methods for preparation of carbon materials. For example, tunable carbon materials have traditionally been made by producing carbon materials from synthetic polymers produced in presence of one or more solvent (i.e., sol-gel polymers). The solvent-containing polymer must then be dried to remove the solvents, and the dried polymer gel is subsequently pyrolyzed and/or activated into carbon materials. Such procedures suffer from a number of drawbacks.

First, the removal of solvent is a cost- and time-intensive process. The current art teaches that rapid freezing and removal of frozen solvent via sublimation under vacuum is a preferred mode to provide tunability of pore structure. This rapid freeing and drying requires very low temperature and very low vacuum, which in turn require a large amount of energy. The drying process can take from hours to days to complete.

Second, the solvent does not become incorporated into the carbon material, and therefore lowers the yield of carbon per unit mass of polymer gel processed. For example, the solvent can be present at a level of more than 30% of the total mass of polymer to be processed into carbon, for example more than 40% of the total mass of polymer to be processed. more than 50% of the total mass of polymer to be processed, more than 60% of the total mass of polymer to be processed, more than 70% of the total mass of polymer to be processed, more than 80% of the total mass of polymer to be processed, more than 90% of the total mass of polymer to be processed. Without being bound by theory, a pyrolyzed carbon yield from a polymeric material can be about 50%. Accordingly, the ratio of pyrolyzed carbon produced per unit mass of polymer processed can be greater than about 3, greater than about 4, greater than about 5, greater than about 7, greater than about 10, greater than about 20, greater than about 200. The pyrolyzed carbon can be activated, and the ratio of activated carbon to polymer processed is higher than the ratio of pyrolyzed carbon to polymer processed, depending on the level of activation desired. Without being bound by theory, a activated carbon yield from a pyrolyzed carbon material can be about 50%. Accordingly, the ratio of activated carbon produced per unit mass of polymer processed can be greater than about 6, greater than about 8, greater than about 10, greater than about 14, greater than about 20, greater than about 40, greater than about 400.

Even owing the disadvantages above, production of carbon from sol gel polymer networks is attractive because the employment of the solvent allows modulation of concentration of various components (polymer precursors, acids, bases, co-solvents and the like) which is taught in the prior art to provide modulation of pore structure in the dried polymer, pyrolyzed polymer, and/or pyrolyzed and activated polymer.

The current art therefore teaches away from conducting polymerization in the absence of solvent to produce carbon with tunable structures. Unexpectedly, the current invention demonstrates tunability of pore structures in carbons derived from polymers produced in absence of solvent.

1. Preparation of Polymer Gels

As noted above, one embodiment of the present disclosure is a method for preparing carbon materials following a polymerization process in the absence of solvent. In one embodiment, the method comprises heating polymer gel particles that were formed in absence of solvent to obtain a carbon material, wherein the polymer has been prepared by a process comprising:

a) blending a mixture of solid and/or liquid polymer precursors; and b) aging the mixture at a temperature and for a time sufficient to produce a solvent-free polymer network; and c) pyrolysis or pyrolysis and activation of the solvent-free polymer network to produce tunable carbon In some embodiments, the solvent can be present at a level of less than 80% of the total mass of polymer to be processed into carbon, for example less than 70% of the total mass of polymer to be processed, less than 60% of the total mass of polymer to be processed, less than 50% of the total mass of polymer to be processed, less than 40% of the total mass of polymer to be processed, less than 30% of the total mass of polymer to be processed, less than 20% of the total mass of polymer to be processed, less than 10% of the total mass of polymer to be processed, less than 1% of the total mass of polymer to be processed, less than 0.1% of the total mass of polymer to be processed, less than 0.01% of the total mass of polymer to be processed. Without being bound by theory, a pyrolyzed carbon yield from a polymeric material can be about 50%. Accordingly, the ratio of pyrolyzed carbon produced per unit mass of polymer processed can be less than about 10, less than about 7, less than about 5, less than about 4, less than about 3, less than about 2.5, less than about 2.1. In some embodiments, the ratio of pyrolyzed carbon produced per unit mass of polymer processed is about 2. In some embodiments, the ratio of pyrolyzed carbon produced per unit mass of polymer processed is less than 2.

The pyrolyzed carbon can be activated, and the ratio of activated carbon to polymer processed is higher than the ratio of pyrolyzed carbon to polymer processed, depending on the level of activation desired. Without being bound by theory, a activated carbon yield from a pyrolyzed carbon material can be about 50%. Accordingly, the ratio of activated carbon produced per unit mass of polymer processed can be less than about 14, less than about 10, less than about 8, less than about 6, less than about 5, less than about 4.5, less than about 4.1. In some embodiments, the ratio of activated carbon produced per unit mass of polymer processed is about 4 or lower.

The structure of the polymer precursors is not particularly limited, provided that the polymer precursor is capable of reacting with another polymer precursor or with a second polymer precursor to form a polymer. Polymer precursors include amine-containing compounds, alcohol-containing compounds and carbonyl-containing compounds, for example in some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

In one embodiment, the method comprises use of a first and second polymer precursor, and in some embodiments the first or second polymer precursor is a carbonyl containing compound and the other of the first or second polymer precursor is an alcohol containing compound. In some embodiments, a first polymer precursor is a phenolic compound and a second polymer precursor is an aldehyde compound (e.g., formaldehyde). In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol, and the aldehyde compound is formaldehyde. In some embodiments, the polymer precursors are alcohols and carbonyl compounds (e.g., resorcinol and aldehyde) and they are present in a ratio of about 0.5:1.0, respectively.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Other suitable compounds in this regard are bisphenols, for instance, bisphenol A. Mixtures of two or more polyhydroxy benzenes can also be used. Phenol (monohydroxy benzene) can also be used. Representative polyhydroxy compounds include sugars, such as glucose, sucrose, fructose, chitin and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species. The relative amounts of alcohol-containing species (e.g., alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

In other embodiments, the polymer precursor is a urea or an amine containing compound. For example, in some embodiments the polymer precursor is urea, melamine, hexamethylenetetramine or combination thereof. Other embodiments include polymer precursors selected from isocyanates or other activated carbonyl compounds such as acid halides and the like.

Some embodiments of the disclosed methods include preparation of solvent-free polymer gels (and carbon materials) comprising electrochemical modifiers. Such electrochemical modifiers include, but are not limited to nitrogen, silicon, and sulfur. In other embodiments, the electrochemical modifier comprises fluorine, iron, tin, silicon, nickel, aluminum, zinc, or manganese. The electrochemical modifier can be included in the preparation procedure at any step. For example, in some the electrochemical modifier is admixed with the mixture, the polymer phase or the continuous phase.

In certain embodiments, the electrochemical modifier is introduced into an already formed polymer by a solvent-free process. For example, in certain embodiments a polymer gel in particulate form is blended with a nitrogen containing compound also in particulate form, and the mixture blended under a temperature sufficient to achieve molecular mobility, and hence non-covalent and/or covalent incorporation between the electrochemical modifier and the polymer gel. In certain embodiments, the electrochemical modifier is a nitrogen containing compound, for example, but not limited to, urea or melamine. In certain embodiments, the mixture of polymer gel particles and nitrogen containing compound particles can be held at a temperature at or above the glass transition temperature of polymer gel particles, or the nitrogen containing compound particles, or at a temperature that is at or above the glass transition temperature of both species of particles. In certain embodiments, the mixture of polymer gel particles and nitrogen containing compound particles can be held at a temperature at or above the melting temperature of polymer gel particles, or the nitrogen containing compound particles, or at a temperature that is at or above the melting temperature of both species of particles.

In certain embodiments, the electrochemical modifier is introduced into an already formed dried polymer by a solvent-free process. For example, in certain embodiments a dried polymer gel in particulate form is blended with a nitrogen containing compound also in particulate form, and the mixture blended under a temperature sufficient to achieve molecular mobility, and hence non-covalent and/or covalent incorporation between the electrochemical modifier and the dried polymer gel. In certain embodiments, the electrochemical modifier is a nitrogen containing compound, for example, but not limited to, urea or melamine. In certain embodiments, the mixture of dried polymer gel particles and nitrogen containing compound particles can be held at a temperature at or above the glass transition temperature of dried polymer gel particles, or the nitrogen containing compound particles, or at a temperature that is at or above the glass transition temperature of both species of particles. In certain embodiments, the mixture of dried polymer gel particles and nitrogen containing compound particles can be held at a temperature at or above the melting temperature of dried polymer gel particles, or the nitrogen containing compound particles, or at a temperature that is at or above the melting temperature of both species of particles.

In some embodiments, the gel polymerization process is performed under catalytic conditions. Accordingly, in some embodiments, the method comprises admixing a catalyst with the solvent-free mixture. In some embodiments, the catalyst is a solid at room temperature and pressure.

In some embodiments, the catalyst is a liquid at room temperature and pressure. In some embodiments, the catalyst is a liquid at room temperature and pressure that does not provide dissolution of one or more of the other polymer precursors.

In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to polymer precursor (e.g., phenolic compound) may have an effect on the final properties of the polymer gel as well as the final properties of the carbon materials. Thus, in some embodiments such catalysts are used in the range of molar ratios of 5:1 to 2000:1 polymer precursor:catalyst. In some embodiments, such catalysts can be used in the range of molar ratios of 10:1 to 400:1 polymer precursor:catalyst. For example in other embodiments, such catalysts can be used in the range of molar ratios of 5:1 to 100:1 polymer precursor:catalyst. For example, in some embodiments the molar ratio of catalyst to polymer precursor is about 400:1. In other embodiments the molar ratio of catalyst to polymer precursor is about 100:1. In other embodiments the molar ratio of catalyst to polymer precursor is about 50:1. In other embodiments the molar ratio of catalyst to polymer precursor is about 10:1. In certain of the foregoing embodiments, the polymer precursor is a phenolic compound such as resorcinol or phenol.

In the specific embodiment wherein one of the polymer precursors is resorcinol and another polymer precursor is formaldehyde, the resorcinol to catalyst ratio can be varied to obtain the desired properties of the resultant polymer gel and carbon materials. In some embodiments of the methods described herein, the molar ratio of resorcinol to catalyst is from about 5:1 to about 2000:1 or the molar ratio of resorcinol to catalyst is from about 10:1 to about 400:1. In further embodiments, the molar ratio of resorcinol to catalyst is from about 5:1 to about 100:1. In further embodiments, the molar ratio of resorcinol to catalyst is from about 25:1 to about 50:1. In further embodiments, the molar ratio of resorcinol to catalyst is from about 100:1 to about 5:1.

In certain embodiments, the precursors employed in the solvent free process comprise a compound comprising phenolic species and a compound comprising aldehyde species. In some embodiments, where the precursors employed in the solvent free process comprise a compound comprising phenolic species and a compound comprising aldehyde species, the mol ratio of phenol groups present to aldehdye group present can be varied, for example from 0.001:1 to 1000:1, for example from 0.01:1 to 100:1, for example from 0.02:1 to 50:1, from 0.05 to 20:1, for example from 0.1 to 10:1, for example from 0.2:1 to 5:1, for example from 0.25:1 to 4:1, for example from 0.3:1 to 3:1, for example from, 0.5:1 to 2:1. In some embodiments, the mol ratio of phenol groups present to aldehdye group is 0.2:1 to 0.8:1, for example 0.3:1 to 0.7:1, for example from 0.4:1 to 0.6:1.

In certain related embodiments, the precursors employed in the solvent free process comprise a compound comprising phenolic species and a compound that degrades under the process conditions to evolve aldehyde species. In some embodiments, where the precursors employed in the solvent free process comprise a compound comprising phenolic species and a compound that degrades to yield aldehyde species, the mol ratio of phenol groups present to aldehdye group evolved can be varied, for example from 0.001:1 to 1000:1, for example from 0.01:1 to 100:1, for example from 0.02:1 to 50:1, from 0.05 to 20:1, for example from 0.1 to 10:1, for example from 0.2:1 to 5:1, for example from 0.25:1 to 4:1, for example from 0.3:1 to 3:1, for example from, 0.5:1 to 2:1. In some embodiments, the mol ratio of phenol groups present to aldehdye group evolved is 0.2:1 to 0.8:1, for example 0.3:1 to 0.7:1, for example from 0.4:1 to 0.6:1.

In still other embodiments, the method comprises admixing an acid with the solvent-free mixture. In certain embodiments, the acid is a solid at room temperature and pressure. In some embodiments, the acid is a liquid at room temperature and pressure. In some embodiments, the acid is a liquid at room temperature and pressure that does not provide dissolution of one or more of the other polymer precursors.

The acid may be selected from any number of acids suitable for the polymerization process. For example, in some embodiments the acid is acetic acid and in other embodiments the acid is oxalic acid. In further embodiments, the acid is mixed with the first or second solvent in a ratio of acid to solvent of 99:1, 90:10, 75:25, 50:50, 25:75, 20:80, 10:90 or 1:90. In other embodiments, the acid is acetic acid and the first or second solvent is water. In other embodiments, acidity is provided by adding a solid acid.

The total content of acid in the mixture can be varied to alter the properties of the final product. In some embodiments, the acid is present from about 1% to about 50% by weight of mixture. In other embodiments, the acid is present from about 5% to about 25%. In other embodiments, the acid is present from about 10% to about 20%, for example about 10%, about 15% or about 20%.

In certain embodiments, the polymer precursor components are blended together and subsequently held for a time and at a temperature sufficient to achieve polymerization. One or more of the polymer precursor components can have particle size less than about 20 mm in size, for example less than 10 mm, for example less than 7 mm, for example, less than 5 mm, for example less than 2 mm, for example less than 1 mm, for example less than 100 microns, for example less than 10 microns. In some embodiments, the particle size of one or more of the polymer precursor components is reduced during the blending process.

The blending of one or more polymer precursor components in the absence of solvent can be accomplished by methods described in the art, for example ball milling, jet milling, Fritsch milling, planetary mixing, and other mixing methodologies for mixing or blending solid particles while controlling the process conditions (e.g., temperature). The mixing or blending process can be accomplish before, during, and/or after (or combinations thereof) incubation at the reaction temperature.

Reaction parameters include aging the blended mixture at a temperature and for a time sufficient for the one or more polymer precursors to react with each other and form a polymer. In this respect, suitable aging temperature ranges from about room temperature to temperatures at or near the melting point of one or more of the polymer precursors. In some embodiments, suitable aging temperature ranges from about room temperature to temperatures at or near the glass transition temperature of one or more of the polymer precursors, for example about 10° C. below the glass transition temperature of one or more of the polymer precursors. For example, in some embodiments the solvent free mixture is aged at temperatures from about 20° C. to about 600° C., for example about 20° C. to about 500° C., for example about 20° C. to about 400° C., for example about 20° C. to about 300° C., for example about 20° C. to about 200° C. In certain embodiments, the solvent free mixture is aged at temperatures from about 50 to about 250° C.

The reaction duration is generally sufficient to allow the polymer precursors to react and form a polymer, for example the mixture may be aged anywhere from 1 hour to 48 hours, or more or less depending on the desired result. Typical embodiments include aging for a period of time ranging from about 2 hours to about 48 hours, for example in some embodiments aging comprises about 12 hours and in other embodiments aging comprises about 4-8 hours (e.g., about 6 hours).

In some embodiments, the particle size distribution of the polymer particles exhibit a polydispersity index (Dv,90-Dv,10)/Dv,50, wherein Dv,10, Dv,50 and Dv,90 are the particle size at 10%, 50% and 90%, respectively of the particle size distribution by volume) less than 1,000, for example less than 100, for example less than 10, for example less than 5, for example less than 3, for example less than 2, for example less than 1.5, for example less than 1. In some embodiments, introduction of aqueous phase to organic phase can be staged such that two or more populations of polymer particle size distribution may be achieved. For example, the final polymer particle distribution achieved may consist of two or more modes, where the ratio between the highest and lowest node is about 1000 or lower, for example about 100 or lower, for example about 50 or lower, for example about 10 or lower, for example about 5 or lower, for example about 2 or lower.

2. Pyrolysis and Activation of Polymer Gels

The polymer gels described above, can be further processed to obtain carbon materials. Such processing includes, for example, pyrolysis and/or activation. Generally, in the pyrolysis process, dried polymer gels are weighed and placed in a rotary kiln. The temperature ramp is set at 5° C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, pyrolysis dwell time (the period of time during which the sample is at the desired temperature) is from about 0 minutes to about 120 minutes, from about 20 minutes to about 150 minutes, from about 30 minutes to about 100 minutes, from about 50 minutes to about 60 minutes or from about 55 minutes to about 60 minutes.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, the pyrolysis dwell temperature ranges from about 500° C. to 2400° C. In some embodiments, the pyrolysis dwell temperature ranges from about 600° C. to 1800° C. In other embodiments the pyrolysis dwell temperature ranges from about 700° C. to about 1200° C. In other embodiments the pyrolysis dwell temperature ranges from about 850° C. to about 1050° C. In other embodiments the pyrolysis dwell temperature ranges from about 800° C. to about 900° C. In some embodiments, the pyrolysis dwell temperature is about 600° C. or 900° C. In some other specific embodiments, the pyrolysis dwell temperature ranges from about 550° C. to about 900° C.

In some embodiments, the pyrolysis dwell temperature is varied during the course of pyrolysis. In one embodiment, the pyrolysis is carried out in a rotary kiln with separate, distinct heating zones. The temperature for each zone is sequentially decreased from the entrance to the exit end of the rotary kiln tube. In one embodiment, the pyrolysis is carried out in a rotary kiln with separate distinct heating zones, and the temperature for each zone is sequentially increased from entrance to exit end of the rotary kiln tube.

Activation time and activation temperature both have a large impact on the performance of the resulting activated carbon material, as well as the manufacturing cost thereof.

Increasing the activation temperature and the activation dwell time results in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This is a result of the activation gas diffusion limited reaction that occurs at higher temperatures and reaction kinetic driven reactions that occur at lower temperature. Higher activation percentage often increases performance of the final activated carbon, but it also increases cost by reducing overall yield. Improving the level of activation corresponds to achieving a higher performance product at a lower cost.

Pyrolyzed polymer gels may be activated by contacting the pyrolyzed polymer gel with an activating agent. Many gases are suitable for activating, for example gases which contain oxygen. Non-limiting examples of activating gases include carbon dioxide, carbon monoxide, steam, oxygen and combinations thereof. Activating agents may also include corrosive chemicals such as acids, bases or salts (e.g., phosphoric acid, acetic acid, citric acid, formic acid, oxalic acid, uric acid, lactic acid, potassium hydroxide, sodium hydroxide, zinc chloride, etc.). Other activating agents are known to those skilled in the art.

In some embodiments, the activation time is between 1 minute and 48 hours. In other embodiments, the activation time is between 10 minute and 24 hours. In other embodiments, the activation time is between 60 minutes and 24 hours. In other embodiments, the activation time is between 2 hour and 24 hours. In further embodiments, the activation time is between 12 hours and 24 hours. In certain other embodiments, the activation time is between 30 min and 8 hours. In some further embodiments, the activation time is between 3 hour and 6 hours.

Pyrolyzed polymer gels may be activated using any number of suitable apparatuses known to those skilled in the art, for example, fluidized beds, rotary kilns, elevator kilns, roller hearth kilns, pusher kilns, etc. In one embodiment of the activation process, samples are weighed and placed in a rotary kiln, for which the automated gas control manifold is set to ramp at a 20° C. per minute rate. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from 800° C. to 1300° C. In another embodiment, activation temperatures may range from 800° C. to 1050° C. In another embodiment, activation temperatures may range from about 850° C. to about 950° C. In another embodiment, the activation temperature is about 900° C. In some embodiments, the carbon materials are activated to achieve a specific surface area ranging from 1700 to 1900 $m^2/g$. One skilled in the art will recognize that other activation temperatures, either lower or higher, may be employed.

The degree of activation is measured in terms of the mass percent of the pyrolyzed dried polymer gel that is lost during the activation step. In one embodiment of the methods described herein, activating comprises a degree of activation from 5% to 90%; or a degree of activation from 10% to 80%; in some cases activating comprises a degree of activation from 40% to 70%, or a degree of activation from 45% to 65%.

B. Properties of Polymer Gels

One embodiment of the present disclosure provides a polymer gel prepared by any of the methods disclosure herein. The polymer gels produced by the disclosed methods are unique in many respects. In some embodiments, the method produces polymer gels having monodisperse or near monodisperse particle size distributions. As discussed above, the particle size of the polymer gels (and carbon materials) can be controlled by a number of process parameters, including the dry blending apparatus and blending conditions. For example, in some embodiments the present disclosure provides a polymer gel having a particle size distribution such that $(Dv,90-Dv,10)/Dv,50$ is less than 3, wherein $Dv,10$, $Dv,50$ and $Dv,90$ are the particle size at 10%, 50% and 90%, respectively of the particle size distribution by volume. In some embodiments, $(Dv,90-Dv,10)/Dv,50$ is less than 2 and in other embodiments $(Dv90-Dv10)/Dv50$ is less than 1.

The specific surface area of the polymer gels as determined by BET analysis ranges from about 1 $m^2/g$ to about 1000 $m^2/g$. In some embodiments, the specific surface area ranges from about 1 $m^2/g$ to about 100 $m^2/g$. In other embodiments, the specific surface area ranges from about 300 $m^2/g$ to about 700 $m^2/g$. In some other embodiments, the specific surface area ranges from about 300 $m^2/g$ to about 400 $m^2/g$. In some other embodiments, the specific surface area ranges from about 400 $m^2/g$ to about 500 $m^2/g$. In some other embodiments, the specific surface area ranges from about 500 $m^2/g$ to about 600 $m^2/g$. In some other embodiments, the specific surface area ranges from about 600 $m^2/g$ to about 700 $m^2/g$.

The total pore volume of the polymer gels ranges from about 0.01 cc/g to about 1.5 cc/g. For example, in some embodiments the total pore volume ranges from about 0.1 cc/g to about 0.9 cc/g. In other embodiments the total pore volume ranges from about 0.2 cc/g to about 0.8 cc/g. In other embodiments the total pore volume ranges from about 0.3 cc/g to about 0.6 cc/g. In other embodiments the total pore volume ranges from about 0.6 cc/g to about 0.9 cc/g.

In other embodiments, the polymer gel comprises a total of less than 500 ppm of all other elements having atomic numbers ranging from 11 to 92. For example, in some other embodiments the polymer gel comprises less than 200 ppm, less than 100 ppm, less than 50 ppm, less than 25 ppm, less than 10 ppm, less than 5 ppm or less than 1 ppm of all other elements having atomic numbers ranging from 11 to 92. In some embodiments, the electrochemical modifier content and impurity content of the polymer gels can be determined by proton induced x-ray emission (PIXE) analysis.

In some embodiments, the polymer gel is a dried polymer gel, for example, a polymer cryogel. In other embodiments, the dried polymer gel is a polymer xerogel or a polymer aerogel. In some embodiments, the polymer precursors are selected from aliphatic and aromatic alcohols, aliphatic and aromatic amines and carbonyl-containing compounds. For example, the polymer precursors may be selected from an alcohol, a phenol, a polyalcohol, a sugar, an alkyl amine, an aromatic amine, an aldehyde, a ketone, a carboxylic acid, an ester, a urea, an acid halide and an isocyanate. In some specific embodiments, the polymer gels are prepared from phenolic compounds and aldehyde compounds, for example, in one embodiment, the polymer gels can be produced from resorcinol and formaldehyde. In some embodiments, acidity can be provided by dissolution of a solid acid compound, by employing an acid as the reaction solvent or by employing a mixed solvent system where one of the solvents is an acid.

Some embodiments of the disclosed process comprise polymerization to form a polymer gel in the presence of a basic volatile catalyst. Accordingly, in some embodiments, the polymer gel comprises one or more salts, for example, in some embodiments the one or more salts are basic volatile salts. Examples of basic volatile salts include, but are not limited to, ammonium carbonate, ammonium bicarbonate, ammonium acetate, ammonium hydroxide, and combinations thereof. Accordingly, in some embodiments, the present disclosure provides a polymer gel comprising ammonium carbonate, ammonium bicarbonate, ammonium acetate, ammonium hydroxide, or combinations thereof. In further embodiments, the polymer gel comprises ammonium carbonate. In other further embodiments, the polymer gel comprises ammonium acetate.

The disclosed methods are useful for preparation polymer gels having high purity as determined by PIXE analysis and/or ash content. As described herein, any intentionally added electrochemical modifier is not considered an impurity and thus excluded from the specifically described PIXE and ash content values. In some embodiments, the polymer gels comprise low ash content which may contribute to the low ash content of a carbon material prepared therefrom. Thus, in some embodiments, the ash content of the polymer gel ranges from 0.1% to 0.001%. In other embodiments, the ash content of the polymer gel is less than 0.1%, less than 0.08%, less than 0.05%, less than 0.03%, less than 0.025%, less than 0.01%, less than 0.0075%, less than 0.005% or less than 0.001%.

In other embodiments, the polymer gel has a total PIXE impurity content of less than 500 ppm and an ash content of less than 0.08%. In a further embodiment, the polymer gel has a total PIXE impurity content of less than 300 ppm and an ash content of less than 0.05%. In another further embodiment, the polymer gel has a total PIXE impurity content of less than 200 ppm and an ash content of less than 0.02%. In another further embodiment, the polymer gel has a total PIXE impurity content of less than 200 ppm and an ash content of less than 0.01%.

Polymer gels comprising impurities generally yield carbon materials which also comprise impurities, and thus potentially undesired electrochemical properties. Accordingly, one aspect of the present disclosure is a polymer gel prepared via the disclosed methods and having low levels of residual undesired impurities. The amount of individual PIXE impurities present in the polymer gel can be determined by proton induced x-ray emission. In some embodiments, the level of sodium present in the polymer gel is less than 1000 ppm, less than 500 ppm, less than 100 ppm, less than 50 ppm, less than 10 ppm, or less than 1 ppm. In some embodiments, the level of magnesium present in the polymer gel is less than 1000 ppm, less than 100 ppm, less than 50 ppm, less than 10 ppm, or less than 1 ppm. As noted above, in some embodiments other impurities such as hydrogen, oxygen and/or nitrogen may be present in levels ranging from less than 10% to less than 0.01%.

In some specific embodiments, the polymer gel comprises less than 100 ppm sodium, less than 300 ppm silicon, less than 50 ppm sulfur, less than 100 ppm calcium, less than 20 ppm iron, less than 10 ppm nickel, less than 40 ppm copper, less than 5 ppm chromium and less than 5 ppm zinc. In other specific embodiments, the polymer gel comprises less than 50 ppm sodium, less than 100 ppm silicon, less than 30 ppm sulfur, less than 50 ppm calcium, less than 10 ppm iron, less than 5 ppm nickel, less than 20 ppm copper, less than 2 ppm chromium and less than 2 ppm zinc.

In other specific embodiments, the polymer gel comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the polymer gel comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed method yields a polymer gel comprising various specific surface areas depending on the exact reaction parameters. Without being bound by theory, it is believed that the surface area of the polymer gel contributes, at least in part, to the surface area properties of the carbon materials. The surface area can be measured using the BET technique well-known to those of skill in the art. In one embodiment of any of the aspects disclosed herein the polymer gel comprises a BET specific surface area of at least 0.01 $m^2/g$, at least 1 $m^2/g$, at least 10 $m^2/g$, at least 50 $m^2/g$, at least 100 $m^2/g$, at least 250 $m^2/g$, at least 400 $m^2/g$, at least 500 $m^2/g$, at least 600 $m^2/g$, at least 700 $m^2/g$, at least 800 $m^2/g$, or at least 900 $m^2/g$, or at least 1000 $m^2/g$, or at least 1100 $m^2/g$.

In one embodiment, the polymer gel comprises a BET specific surface area of 100 $m^2/g$ to 1000 $m^2/g$. Alternatively, the polymer gel comprises a BET specific surface area of between 150 $m^2/g$ and 900 $m^2/g$. Alternatively, the polymer gel comprises a BET specific surface area of between 400 $m^2/g$ and 800 $m^2/g$.

In one embodiment, the polymer gel comprises a tap density of from 0.10 g/cc to 1 g/cc. In another embodiment, the polymer gel comprises a tap density of from 0.10 g/cc to 0.6 g/cc. In one embodiment, the polymer gel comprises a tap density of from 0.3 g/cc to 0.6 g/cc. In one embodiment of the present disclosure, the polymer gel comprises a BET specific surface area of at least 150 $m^2/g$ and a tap density of less than 0.60 g/cc. Alternately, the polymer gel comprises a BET specific surface area of at least 250 $m^2/g$ and a tap density of less than 0.4 g/cc. In another embodiment, the polymer gel comprises a BET specific surface area of at least 500 $m^2/g$ and a tap density of less than 0.30 g/cc.

In one embodiment, the polymer gel comprises a fractional pore volume of pores at or below 500 angstroms that comprises at least 25% of the total pore volume, 50% of the total pore volume, at least 75% of the total pore volume, at least 90% of the total pore volume or at least 99% of the total pore volume. In another embodiment, the polymer gel comprises a fractional pore volume of pores at or below 20 nm that comprises at least 50% of the total pore volume, at least 75% of the total pore volume, at least 90% of the total pore volume or at least 99% of the total pore volume.

In some embodiments, the amount of nitrogen adsorbed per mass of polymer gel at 0.05 relative pressure is at least 10% of the total nitrogen adsorbed up to 0.99 relative pressure or at least 20% of the total nitrogen adsorbed up to 0.99 relative pressure. In another embodiment, the amount of nitrogen adsorbed per mass of polymer gel at 0.05 relative pressure is between 10% and 50% of the total nitrogen adsorbed up to 0.99 relative pressure, is between 20% and 60% of the total nitrogen adsorbed up to 0.99 relative pressure or is between 20% and 30% of the total nitrogen adsorbed up to 0.99 relative pressure.

In one embodiment, the polymer gel comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the polymer gel comprises a fractional pore surface area of pores at or below 20 nm that comprises at least 50% of the total pore surface area, at least 75% of the total pore surface area, at least 90% of the total pore surface or at least 99% of the total pore surface area.

As described in more detail above, methods for preparing the disclosed carbon materials may include pyrolysis of a polymer gel. In some embodiments, the pyrolyzed polymer gels have a surface area from about 1 to about 1200 $m^2/g$. In other embodiments, the pyrolyzed polymer gels have a surface area from about 1 to about 100 $m^2/g$. In other embodiments, the pyrolyzed polymer gels have a surface area from about 500 to about 800 $m^2/g$. In other embodiments, the pyrolyzed polymer gels have a surface area from about 500 to about 700 $m^2/g$.

In other embodiments, the pyrolyzed polymer gels have a tap density from about 0.1 to about 1.0 g/cc. In other embodiments, the pyrolyzed polymer gels have a tap density from about 0.3 to about 0.6 g/cc. In other embodiments, the pyrolyzed polymer gels have a tap density from about 0.3 to about 0.5 g/cc.

In some embodiments, the polymer gels exhibit a mean particle diameter ranging from about 4 μm to about 4 mm. In other embodiments, the mean particle diameter ranges from about 10 μm to about 1 mm. Yet in other embodiments, the mean particle diameter ranges from about 20 μm to about 500 μm. Still in other embodiments, the mean particle diameter ranges from about 500 μm to about 4 mm. Yet still in other embodiments, the mean particle diameter ranges from about 2 μm to about 300 μm.

In still other embodiments, the polymer gels comprise a monodisperse, or near monodisperse particle size distribution. For example, in some embodiments the polymer gels have a particle size distribution such that $(Dv,90-Dv,10)/Dv,50$ is less than 3, wherein $Dv,10$, $Dv,50$ and $Dv,90$ are the particle size at 10%, 50% and 90%, respectively of the particle size distribution by volume. In further embodiments, $(Dv,90-Dv,10)/Dv,50$ is less than 2 or even less than 1. In still other embodiments, $(Dv,90-Dv,10)/Dv,50$ is less than 1,000, less than 100, less than 10, less than 5, less than 3, less than 2, less than 1.5 or even less than 1.

Since the polymer gels may comprise electrochemical modifiers, the elemental content of the gels may vary. In some embodiments, the polymer gels comprise greater than about 100 ppm of an electrochemical modifier. In certain embodiments, the electrochemical modifier is selected from nitrogen, iron, tin, silicon, nickel, aluminum and manganese. In some embodiments, the electrochemical modifier is silicon and in other embodiments the electrochemical modifier is nitrogen.

The amount of electrochemical modifier in the polymer gels is controlled to a level desirable for the final carbon material. Accordingly, in some embodiments, the polymer gel comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier. For example, in some embodiments, the polymer gels comprise between 0.5% and 99.5% carbon and between 0.5% and 99.5% electrochemical modifier. The percent of the electrochemical modifier is calculated on weight percent basis (wt %).

C. Properties of Carbon Materials

One embodiment of the present disclosure provides a carbon material prepared by any of the methods disclosed herein. The pore size distribution of the carbon materials may contribute to the superior performance of electrical devices comprising the carbon materials relative to devices comprising other known carbon materials. For example, in some embodiments, the carbon material comprises an optimized blend of both micropores and mesopores and may also comprise low surface functionality upon pyrolysis and/or activation. In other embodiments, the carbon material comprises a total of less than 500 ppm of all elements having atomic numbers ranging from 11 to 92, as measured by proton induced x-ray emission. The high purity and optimized micropore and/or mesopore distribution make the carbon materials ideal for use in electrical storage and distribution devices, for example ultracapacitors.

As noted above, activated carbon particles are widely employed as an energy storage material. In this regard, a critically important characteristic is high power density, which is possible with electrodes that have low ionic resistance that yield high frequency response. It is important to achieve a low ionic resistance, for instance in situations with device ability to respond to cyclic performance is a constraint. The disclosed methods are useful for preparing carbon material that solves the problem of how to optimize an electrode formulation and maximize the power performance of electrical energy storage and distribution devices. Devices comprising the carbon materials exhibit long-term stability, fast response time and high pulse power performance.

In some embodiments, the disclosed methods produce carbon materials comprising micropore and/or mesopore structure, which is typically described in terms of fraction (percent) of total pore volume residing in either micropores or mesopores or both. Accordingly, in some embodiments the pore structure of the carbon materials comprises from 20% to 90% micropores. In other embodiments, the pore structure of the carbon materials comprises from 30% to 70% micropores. In other embodiments, the pore structure of the carbon materials comprises from 40% to 60% micropores. In other embodiments, the pore structure of the carbon materials comprises from 40% to 50% micropores. In other embodiments, the pore structure of the carbon materials comprises from 43% to 47% micropores. In certain embodiments, the pore structure of the carbon materials comprises about 45% micropores.

The mesoporosity of the carbon materials may contribute to high ion mobility and low resistance. In some embodiments, the pore structure of the carbon materials comprises from 20% to 80% mesopores. In other embodiments, the pore structure of the carbon materials comprises from 30% to 70% mesopores. In other embodiments, the pore structure of the carbon materials comprises from 40% to 60% mesopores. In other embodiments, the pore structure of the carbon materials comprises from 50% to 60% mesopores. In other embodiments, the pore structure of the carbon materials comprises from 53% to 57% mesopores. In other embodiments, the pore structure of the carbon materials comprises about 55% mesopores.

An optimized blend of micropores and mesopores within the carbon materials may contribute to the enhanced electrochemical performance of the same. Thus, in some embodiments the pore structure of the carbon materials comprises from 20% to 80% micropores and from 20% to 80% mesopores. In other embodiments, the pore structure of the carbon materials comprises from 30% to 70% micropores and from 30% to 70% mesopores. In other embodiments, the pore structure of the carbon materials comprises from 40% to 60% micropores and from 40% to 60% mesopores. In other embodiments, the pore structure of the carbon materials comprises from 40% to 50% micropores and from 50% to 60% mesopores. In other embodiments, the pore structure of the carbon materials comprises from 43% to 47% micropores and from 53% to 57% mesopores. In other embodiments, the pore structure of the carbon materials comprises about 45% micropores and about 55% mesopores.

In other variations, the carbon materials do not have a substantial volume of pores greater than 20 nm. For example, in certain embodiments the carbon materials comprise less than 25%, less than 20%, less than 15%, less than 10%, less than 5%, less than 2.5% or even less than 1% of the total pore volume in pores greater than 20 nm.

In other variations, the carbon materials do not have a substantial volume of macropores (i.e., pores greater than 50 nm). For example, in certain embodiments the carbon materials comprise less than 25%, less than 20%, less than 15%, less than 10%, less than 5%, less than 2.5%, less than 1%, or even less than 0.1% of the total pore volume in macropores.

The porosity of the carbon materials contributes to their enhanced electrochemical performance. Accordingly, in one embodiment the carbon material comprises a pore volume residing in pores less than 20 angstroms of at least 1.8 cc/g, at least 1.2, at least 0.6, at least 0.30 cc/g, at least 0.25 cc/g, at least 0.20 cc/g or at least 0.15 cc/g. In other embodiments, the carbon material comprises a pore volume residing in pores greater than 20 angstroms of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.50 cc/g, at least 0.4 cc/g, at least 0.2 cc/g or at least 0.1 cc/g.

In other embodiments, the carbon material comprises a pore volume of at least 7.00 cc/g, at least 5.00 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, at least 1.80 cc/g, 1.70 cc/g, 1.60 cc/g, 1.50 cc/g, at least 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g or at least 0.1 cc/g for pores ranging from 20 angstroms to 500 angstroms.

In other embodiments, the carbon material comprises a pore volume of at least at least 7.00 cc/g, at least 5.00 cc/g, 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.50 cc/g, at least 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g or at least 0.1 cc/g for pores ranging from 20 angstroms to 300 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 1000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 2000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 5000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 1 micron.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 2 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 3 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 4 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 5 microns.

In yet other embodiments, the carbon materials comprise a total pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.60 cc/g, at least 0.55 cc/g, at least 0.50 cc/g, at least 0.45 cc/g, at least 0.40 cc/g, at least 0.35 cc/g, at least 0.30 cc/g, at least 0.25 cc/g, at least 0.20 cc/g or at least 0.10 cc/g.

In yet other embodiments, the carbon materials comprise a pore volume residing in pores of less than 20 angstroms of at least 0.2 cc/g and a pore volume residing in pores of between 20 and 300 angstroms of at least 0.8 cc/g. In yet other embodiments, the carbon materials comprise a pore volume residing in pores of less than 20 angstroms of at least 0.5 cc/g and a pore volume residing in pores of between 20 and 300 angstroms of at least 0.5 cc/g. In yet other embodiments, the carbon materials comprise a pore volume residing in pores of less than 20 angstroms of at least 0.6 cc/g and a pore volume residing in pores of between 20 and 300 angstroms of at least 2.4 cc/g. In yet other embodiments, the carbon materials comprise a pore volume residing in pores of less than 20 angstroms of at least 1.5 cc/g and a pore volume residing in pores of between 20 and 300 angstroms of at least 1.5 cc/g.

In some embodiments, the pores of the carbon material comprise a peak pore volume ranging from 2 nm to 10 nm. In other embodiments, the peak pore volume ranges from 10 nm to 20 nm. Yet in other embodiments, the peak pore volume ranges from 20 nm to 30 nm. Still in other embodiments, the peak pore volume ranges from 30 nm to 40 nm. Yet still in other embodiments, the peak pore volume ranges from 40 nm to 50 nm. In other embodiments, the peak pore volume ranges from 50 nm to 100 nm.

In certain embodiments a mesoporous carbon material having low pore volume in the micropore region (e.g., less than 60%, less than 50%, less than 40%, less than 30%, less than 20% microporosity) is prepared by the disclosed methods. For example, the mesoporous carbon can be a polymer gel that has been pyrolyzed, but not activated. In some embodiments, the pyrolyzed mesoporous carbon comprises a specific surface area of at least 400 m$^2$/g, at least 500 m$^2$/g, at least 600 m$^2$/g, at least 675 m$^2$/g or at least 750 m$^2$/g. In other embodiments, the mesoporous carbon material comprises a total pore volume of at least 0.50 cc/g, at least 0.60 cc/g, at least 0.70 cc/g, at least 0.80 cc/g or at least 0.90 cc/g. In yet other embodiments, the mesoporous carbon material comprises a tap density of at least 0.30 g/cc, at least 0.35 g/cc, at least 0.40 g/cc, at least 0.45 g/cc, at least 0.50 g/cc or at least 0.55 g/cc.

In other embodiments, the carbon materials comprise a total pore volume ranging greater than or equal to 0.1 cc/g, and in other embodiments the carbon materials comprise a total pore volume less than or equal to 0.6 cc/g. In other embodiments, the carbon materials comprise a total pore volume ranging from about 0.1 cc/g to about 0.6 cc/g. In some other embodiments, the total pore volume of the carbon materials ranges from about 0.1 cc/g to about 0.2 cc/g. In some other embodiments, the total pore volume of the carbon materials ranges from about 0.2 cc/g to about 0.3 cc/g. In some other embodiments, the total pore volume of the carbon materials ranges from about 0.3 cc/g to about 0.4 cc/g. In some other embodiments, the total pore volume of the carbon materials ranges from about 0.4 cc/g to about 0.5 cc/g. In some other embodiments, the total pore volume of the carbon materials ranges from about 0.5 cc/g to about 0.6 cc/g.

The carbon material comprises low total PIXE impurities. Thus, in some embodiments the total PIXE impurity content of all other PIXE elements in the carbon material (as measured by proton induced x-ray emission) is less than 1000 ppm. In other embodiments, the total PIXE impurity content of all other PIXE elements in the carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm. In further embodiments of the foregoing, the carbon material is a pyrolyzed dried polymer gel, a pyrolyzed polymer cryogel, a pyrolyzed polymer xerogel, a pyrolyzed polymer aerogel, an activated dried polymer gel, an activated polymer cryogel, an activated polymer xerogel or an activated polymer aerogel.

In addition to low content of undesired PIXE impurities, the disclosed carbon materials may comprise high total carbon content. In addition to carbon, the carbon material may also comprise oxygen, hydrogen, nitrogen and the electrochemical modifier. In some embodiments, the material comprises at least 75% carbon, 80% carbon, 85% carbon, at least 90% carbon, at least 95% carbon, at least 96% carbon, at least 97% carbon, at least 98% carbon or at least 99% carbon on a weight/weight basis. In some other embodiments, the carbon material comprises less than 10% oxygen, less than 5% oxygen, less than 3.0% oxygen, less than 2.5% oxygen, less than 1% oxygen or less than 0.5% oxygen on a weight/weight basis. In other embodiments, the carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

In other embodiments, the carbon content is greater than 98 wt. % as measured by CHNO analysis. In another embodiment, the carbon content ranges from 50 to 98 wt. % of the total mass. In yet other embodiments, the carbon content ranges 90 to 98 wt. % of the total mass. In yet other embodiments, the carbon content ranges from 80 to 90 wt. % of the total mass. In yet other embodiments, the carbon content ranges from 70 to 80 wt. % of the total mass. In yet other embodiments, the carbon content ranges from 60 to 70 wt. % of the total mass.

In another embodiment, the nitrogen content ranges from 0 to 30 wt. % as measured by CHNO analysis. In another embodiment, the nitrogen content ranges from 1 to 10 wt %, for example from 5 to 10 wt % of the total mass. In yet other embodiments, the nitrogen content ranges from 10 to 20 wt. % of the total mass. In yet other embodiments, the nitrogen content ranges from 20 to 30 wt. % of the total mass. In another embodiment, the nitrogen content is greater than 30 wt. %.

The carbon and nitrogen content may also be measured as a ratio of C:N. In one embodiment, the C:N ratio ranges from 1:0.001 to 1:1. In another embodiment, the C:N ratio ranges from 1:0.001 to 0.01. In yet another embodiment, the C:N ratio ranges from 1:0.01 to 1:1. In yet another embodiment, the content of nitrogen exceeds the content of carbon.

The carbon materials may also comprise an electrochemical modifier (i.e., a dopant) selected to optimize the electrochemical performance of the carbon materials. The electrochemical modifier may be added during the polymerization step as described above. For example, the electrochemical modifier may added to the above described mixture, continuous phase or polymer phase, or included within the polymerization process in any other manner.

The electrochemical modifier may be incorporated within the pore structure and/or on the surface of the carbon material or incorporated in any number of other ways. For example, in some embodiments, the carbon materials comprise a coating of the electrochemical modifier (e.g., $Al_2O_3$) on the surface of the carbon materials. In some embodiments, the carbon materials comprise greater than about 100 ppm of an electrochemical modifier. In certain embodiments, the electrochemical modifier is selected from iron, tin, silicon, nickel, aluminum and manganese. In some embodiments, the electrochemical modifier is silicon and in other embodiments the electrochemical modifier is nitrogen.

In certain embodiments the electrochemical modifier comprises an element with the ability to lithiate from 3 to 0 V versus lithium metal (e.g. silicon, tin, sulfur). In other embodiments, the electrochemical modifier comprises metal oxides with the ability to lithiate from 3 to 0 V versus lithium metal (e.g. iron oxide, molybdenum oxide, titanium oxide). In still other embodiments, the electrochemical modifier comprises elements which do not lithiate from 3 to 0 V versus lithium metal (e.g. aluminum, manganese, nickel, metal-phosphates). In yet other embodiments, the electrochemical modifier comprises a non-metal element (e.g. fluorine, nitrogen, hydrogen). In still other embodiments, the electrochemical modifier comprises any of the foregoing electrochemical modifiers or any combination thereof (e.g. tin-silicon, nickel-titanium oxide).

The electrochemical modifier may be provided in any number of forms. For example, in some embodiments the electrochemical modifier comprises a salt. In other embodiments, the electrochemical modifier comprises one or more elements in elemental form, for example elemental iron, tin, silicon, nickel or manganese. In other embodiments, the electrochemical modifier comprises one or more elements in oxidized form, for example iron oxides, tin oxides, silicon oxides, nickel oxides, aluminum oxides or manganese oxides.

In other embodiments, the electrochemical modifier comprises iron. In other embodiments, the electrochemical modifier comprises tin. In other embodiments, the electrochemical modifier comprises silicon. In some other embodiments, the electrochemical modifier comprises nickel. In yet other embodiments, the electrochemical modifier comprises aluminum. In yet other embodiments, the electrochemical modifier comprises manganese. In yet other embodiments, the electrochemical modifier comprises $Al_2O_3$.

The electrochemical properties of the carbon materials can be modified, at least in part, by the amount of the electrochemical modifier in the carbon material. Accordingly, in some embodiments, the carbon material comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier. For example, in some embodiments the carbon materials comprise between 0.5% and 99.5% carbon and between 0.5% and 99.5% electrochemical modifier. The percent of the electrochemical modifier is calculated on weight percent basis (wt %). In some other more specific embodiments, the electrochemical modifier is selected from iron, tin, silicon, nickel and manganese.

The total ash content of the carbon material may, in some instances, have an effect on the electrochemical performance of the carbon material. Accordingly, in some embodiments, the ash content of the carbon material ranges from 0.1% to 0.001% weight percent ash, for example in some specific embodiments the ash content of the carbon material is less than 0.1%, less than 0.08%, less than 0.05%, less than 0.03%, than 0.025%, less than 0.01%, less than 0.0075%, less than 0.005% or less than 0.001%.

In other embodiments, the carbon material comprises a total PIXE impurity content of less than 500 ppm and an ash content of less than 0.08%. In further embodiments, the carbon material comprises a total PIXE impurity content of less than 300 ppm and an ash content of less than 0.05%. In other further embodiments, the carbon material comprises a total PIXE impurity content of less than 200 ppm and an ash content of less than 0.05%. In other further embodiments, the carbon material comprises a total PIXE impurity content of less than 200 ppm and an ash content of less than 0.025%. In other further embodiments, the carbon material comprises a total PIXE impurity content of less than 100 ppm and an ash content of less than 0.02%. In other further embodiments, the carbon material comprises a total PIXE impurity content of less than 50 ppm and an ash content of less than 0.01%.

The amount of individual PIXE impurities present in the disclosed carbon materials can be determined by proton induced x-ray emission. Individual PIXE impurities may contribute in different ways to the overall electrochemical performance of the disclosed carbon materials. Thus, in some embodiments, the level of sodium present in the carbon material is less than 1000 ppm, less than 500 ppm, less than 100 ppm, less than 50 ppm, less than 10 ppm, or less than 1 ppm. As noted above, in some embodiments other impurities such as hydrogen, oxygen and/or nitrogen may be present in levels ranging from less than 10% to less than 0.01%.

In some embodiments, the carbon material comprises undesired PIXE impurities near or below the detection limit of the proton induced x-ray emission analysis. For example, in some embodiments the carbon material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the carbon material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the carbon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed carbon materials may also comprise a high surface area. While not wishing to be bound by theory, it is thought that the high surface area may contribute, at least in part, to their superior electrochemical performance. Accordingly, in some embodiments, the carbon material comprises a BET specific surface area of at least 100 m$^2$/g, at least 300 m$^2$/g, at least 500 m$^2$/g, at least 1000 m$^2$/g, at least 1500 m$^2$/g, at least 2000 m$^2$/g, at least 2400 m$^2$/g, at least 2500 m$^2$/g, at least 2750 m$^2$/g or at least 3000 m$^2$/g. In other embodiments, the BET specific surface area ranges from about 100 m$^2$/g to about 3000 m$^2$/g, for example from about 500 m$^2$/g to about 1000 m$^2$/g, from about 1000 m$^2$/g to about 1500 m$^2$/g, from about 1500 m$^2$/g to about 2000 m$^2$/g, from about 2000 m$^2$/g to about 2500 m$^2$/g or from about 2500 m$^2$/g to about 3000 m$^2$/g. For example, in some embodiments of the foregoing, the carbon material is activated.

In some specific embodiments the surface area ranges from about 50 m$^2$/g to about 1200 m$^2$/g for example from about 50 m$^2$/g to about 400 m$^2$/g. In other particular embodiments, the surface area ranges from about 200 m$^2$/g to about 300 m$^2$/g for example the surface area may be about 250 m$^2$/g.

In another embodiment, the carbon material comprises a tap density between 0.1 and 1.0 g/cc, between 0.2 and 0.8 g/cc, between 0.3 and 0.5 g/cc or between 0.4 and 0.5 g/cc. In another embodiment, the carbon material has a total pore volume of at least 0.1 cm$^3$/g, at least 0.2 cm$^3$/g, at least 0.3 cm$^3$/g, at least 0.4 cm$^3$/g, at least 0.5 cm$^3$/g, at least 0.7 cm$^3$/g, at least 0.75 cm$^3$/g, at least 0.9 cm$^3$/g, at least 1.0 cm$^3$/g, at least 1.1 cm$^3$/g, at least 1.2 cm$^3$/g, at least 1.3 cm$^3$/g, at least 1.4 cm$^3$/g, at least 1.5 cm$^3$/g or at least 1.6 cm$^3$/g.

The pore size distribution of the disclosed carbon materials is one parameter that may have an effect on the electrochemical performance of the carbon materials. For example, the carbon materials may comprise mesopores with a short effective length (i.e., less than 10 nm, less than 5, nm or less than 3 nm as measured by TEM) which decreases ion diffusion distance and may be useful to enhance ion transport and maximize power. Accordingly, in one embodiment, the carbon material comprises a fractional pore volume of pores at or below 100 nm that comprises at least 50% of the total pore volume, at least 75% of the total pore volume, at least 90% of the total pore volume or at least 99% of the total pore volume. In other embodiments, the carbon material comprises a fractional pore volume of pores at or below 20 nm that comprises at least 50% of the total pore volume, at least 75% of the total pore volume, at least 90% of the total pore volume or at least 99% of the total pore volume.

In another embodiment, the carbon material comprises a fractional pore surface area of pores between 20 and 300 angstroms that comprises at least 40% of the total pore surface area, at least 50% of the total pore surface area, at least 70% of the total pore surface area or at least 80% of the total pore surface area. In another embodiment, the carbon material comprises a fractional pore surface area of pores at or below 20 nm that comprises at least 20% of the total pore surface area, at least 30% of the total pore surface area, at least 40% of the total pore surface area or at least 50% of the total pore surface area.

In another embodiment, the carbon material comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the carbon material comprises a fractional pore surface area of pores at or below 20 nm that comprises at least 50% of the total pore surface area, at least 75% of the total pore surface area, at least 90% of the total pore surface area or at least 99% of the total pore surface area.

In another embodiment, the carbon material comprises pores predominantly in the range of 1000 angstroms or lower, for example 100 angstroms or lower, for example 50 angstroms or lower. Alternatively, the carbon material comprises micropores in the range of 0-20 angstroms and mesopores in the range of 20-300 angstroms. The ratio of pore volume or pore surface in the micropore range compared to the mesopore range can be in the range of 95:5 to 5:95. Alternatively, the ratio of pore volume or pore surface in the micropore range compared to the mesopore range can be in the range of 20:80 to 60:40.

In other embodiments, the carbon materials are mesoporous and comprise monodisperse mesopores. As used herein, the term "monodisperse" when used in reference to a pore size refers generally to a span (further defined as (Dv,90-Dv,10)/Dv, 50 where Dv,10, Dv,50 and Dv,90 refer to the pore size at 10%, 50% and 90% of the distribution by volume of about 3 or less, typically about 2 or less, often about 1.5 or less.

Yet in other embodiments, the carbons materials comprise a pore volume of at least 1 cc/g, at least 2 cc/g, at least 3 cc/g, at least 4 cc/g or at least 7 cc/g. In one particular embodiment, the carbon materials comprise a pore volume of from 1 cc/g to 7 cc/g.

In other embodiments, the carbon materials comprise at least 50% of the total pore volume residing in pores with a diameter ranging from 50 Å to 5000 Å. In some instances, the carbon materials comprise at least 50% of the total pore volume residing in pores with a diameter ranging from 50 Å to 500 Å. Still in other instances, the carbon materials comprise at least 50% of the total pore volume residing in pores with a diameter ranging from 500 Å to 1000 Å. Yet in other instances, the carbon materials comprise at least 50% of the total pore volume residing in pores with a diameter ranging from 1000 Å to 5000 Å.

In some embodiments, the mean particle diameter for the carbon materials ranges from 1 to 1000 microns. In other embodiments the mean particle diameter for the carbon materials ranges from 1 to 100 microns. Still in other embodiments the mean particle diameter for the carbon materials ranges from 1 to 50 microns. Yet in other embodiments, the mean particle diameter for the carbon materials ranges from 5 to 15 microns or from 1 to 5 microns. Still in other embodiments, the mean particle diameter for the carbon materials is about 10 microns. Still in other embodiments, the mean particle diameter for the carbon materials is less than 4, is less than 3, is less than 2, is less than 1 microns.

In some embodiments, the carbon materials exhibit a mean particle diameter ranging from 1 nm to 10 nm. In other embodiments, the mean particle diameter ranges from 10 nm to 20 nm. Yet in other embodiments, the mean particle diameter ranges from 20 nm to 30 nm. Still in other embodiments, the mean particle diameter ranges from 30 nm to 40 nm. Yet still in other embodiments, the mean particle diameter ranges from 40 nm to 50 nm. In other embodiments, the mean particle diameter ranges from 50 nm to 100 nm.

In some embodiments, the mean particle diameter for the carbons ranges from 1 to 1000 microns. In other embodiments the mean particle diameter for the carbon ranges from 1 to 100 microns. Still in other embodiments the mean particle diameter for the carbon ranges from 5 to 50 microns. Yet in other embodiments, the mean particle diameter for the carbon ranges from 5 to 15 microns. Still in other embodiments, the mean particle diameter for the carbon is about 10 microns.

In some embodiments, the carbon materials exhibit a mean particle diameter ranging from 1 micron to 5 microns. In other embodiments, the mean particle diameter ranges from 5 microns to 10 microns. In yet other embodiments, the mean particle diameter ranges from 10 nm to 20 microns. Still in other embodiments, the mean particle diameter ranges from 20 nm to 30 microns. Yet still in other embodiments, the mean particle diameter ranges from 30 microns to 40 microns. Yet still in other embodiments, the mean particle diameter ranges from 40 microns to 50 microns. In other embodiments, the mean particle diameter ranges from 50 microns to 100 microns. In other embodiments, the mean particle diameter ranges in the submicron range <1 micron.

In still other embodiments, the carbon materials comprise a monodisperse, or near monodisperse particle size distribution. For example, in some embodiments the carbon material has a particle size distribution such that (Dv,90-Dv,10)/Dv,50 is less than 3, wherein Dv,10, Dv,50 and Dv,90 are the particle size at 10%, 50% and 90%, respectively of the particle size distribution by volume. In further embodiments, (Dv,90-Dv,10)/Dv,50 is less than 2 or even less than 1. In still other embodiments, (Dv,90-Dv,10)/Dv,50 is less than 1,000, less than 100, less than 10, less than 5, less than 3, less than 2, less than 1.5 or less than 1.

In yet other embodiments, the carbon materials comprise carbon particles having a substantially spherical geometry. Such geometry may improve the performance of any number of electrical devices comprising the carbon materials since the geometry is known to affect particle packing (and thus energy density). In some embodiments, carbon material comprises a plurality of carbon particles, wherein greater than 90% of the carbon particles have a spherical geometry. For example, in some embodiments, greater than 95% of the carbon particles have a spherical geometry.

D. Characterization of Polymer Gels and Carbon Materials

The structural properties of the final carbon material and intermediate polymer gels may be measured using Nitrogen sorption at 77K, a method known to those of skill in the art. The final performance and characteristics of the finished carbon material is important, but the intermediate products (both dried polymer gel and pyrolyzed, but not activated, polymer gel), can also be evaluated, particularly from a quality control standpoint, as known to those of skill in the art. The Micromeretics ASAP 2020 is used to perform detailed micropore and mesopore analysis, which reveals a pore size distribution from 0.35 nm to 50 nm in some embodiments. The system produces a nitrogen isotherm starting at a pressure of $10^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

The impurity content of the carbon materials can be determined by any number of analytical techniques known to those of skill in the art. One particular analytical method useful within the context of the present disclosure is proton induced x-ray emission (PIXE). This technique is capable of measuring the concentration of elements having atomic numbers ranging from 11 to 92 at low ppm levels. Accordingly, in one embodiment the concentration of impurities present in the carbon materials is determined by PIXE analysis.

E. Devices Comprising the Carbon Materials

The disclosed carbon materials can be used as electrode material in any number of electrical energy storage and distribution devices. Useful devices in this regard include, but are not limited to, the devices described below and in in co-pending U.S. application Ser. Nos. 12/748,219; 12/897,969; 12/829,282; 13/046,572; 12/965,709; 13/336,975; and 61/585,611, each of which are hereby incorporated by reference in their entireties.

1 EDLCs

The disclosed carbon materials can be used as electrode material in any number of electrical energy storage and distribution devices. One such device is an ultracapacitor. Ultracapacitors comprising carbon materials are described in detail in co-owned U.S. Pat. No. 7,835,136 which is hereby incorporated in its entirety.

EDLCs use electrodes immersed in an electrolyte solution as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow through the electrolyte between the electrodes in both directions thus forming double layers of charges at the interfaces between the electrodes and the electrolyte.

When electric potential is applied between a pair of electrodes of an EDLC, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the EDLCS through orientation and alignment of molecules of the electrolytic solution under influence of the electric field induced by the potential. This mode of energy storage, however, is secondary.

EDLCS comprising the disclosed carbon material can be employed in various electronic devices where high power is desired. Accordingly, in one embodiment an electrode comprising the carbon materials is provided. In another embodiment, the electrode comprises activated carbon material. In a further embodiment, an ultracapacitor comprising an electrode comprising the carbon materials is provided. In a further embodiment of the foregoing, the ultrapure synthetic carbon material comprises an optimized balance of micropores and mesopores and described above.

The disclosed carbon materials find utility in any number of electronic devices, for example wireless consumer and commercial devices such as digital still cameras, notebook PCs, medical devices, location tracking devices, automotive devices, compact flash devices, mobiles phones, PCMCIA cards, handheld devices, and digital music players. Ultracapacitors are also employed in heavy equipment such as: excavators and other earth moving equipment, forklifts, garbage trucks, cranes for ports and construction and transportation systems such as buses, automobiles and trains.

In one embodiment, the present disclosure is directed to a device comprising the carbon materials described herein, wherein the device is an electric double layer capacitor (EDLC) device comprising:
 a) a positive electrode and a negative electrode wherein each of the positive and the negative electrodes comprise the carbon material;
 b) an inert porous separator; and
 c) an electrolyte;
 wherein the positive electrode and the negative electrode are separated by the inert porous separator.

In one embodiment, an ultracapacitor device comprising the carbon material comprises a gravimetric power of at least 5 W/g, at least 10 W/g, at least 15 W/g, at least 20 W/g, at least 25 W/g, at least 30 W/g, at least 35 W/g, at least 50 W/g. In another embodiment, an ultracapacitor device comprising the carbon material comprises a volumetric power of at least 2 W/g, at least 4 W/cc, at least 5 W/cc, at least 10 W/cc, at least 15 W/cc or at least 20 W/cc. In another embodiment, an ultracapacitor device comprising the carbon material carbon material comprises a gravimetric energy of at least 2.5 Wh/kg, at least 5.0 Wh/kg, at least 7.5 Wh/kg, at least 10 Wh/kg, at least 12.5 Wh/kg, at least 15.0 Wh/kg, at least 17.5. Wh/kg, at least 20.0 Wh/kg, at least 22.5 Wh/kg or at least 25.0 Wh/kg. In another embodiment, an ultracapacitor device comprising the carbon material comprises a volumetric energy of at least 1.5 Wh/liter, at least 3.0 Wh/liter, at least 5.0 Wh/liter, at least 7.5 Wh/liter, at least 10.0 Wh/liter, at least 12.5 Wh/liter, at least 15 Wh/liter, at least 17.5 Wh/liter or at least 20.0 Wh/liter.

In some embodiments of the foregoing, the gravimetric power, volumetric power, gravimetric energy and volumetric energy of an ultracapacitor device comprising the carbon material are measured by constant current discharge from 2.7 V to 1.89 V employing a 1.0 M solution of tetraethyl-ammonium-tetrafluroroborate in acetonitrile (1.0 M TEATFB in AN) electrolyte and a 0.5 second time constant.

In one embodiment, an ultracapacitor device comprising the carbon material comprises a gravimetric power of at least 10 W/g, a volumetric power of at least 5 W/cc, a gravimetric capacitance of at least 100 F/g (@0.5 A/g) and a volumetric capacitance of at least 10 F/cc (@0.5 A/g). In one embodiment, the aforementioned ultracapacitor device is a coin cell double layer ultracapacitor comprising the carbon material, a conductivity enhancer, a binder, an electrolyte solvent, and an electrolyte salt. In further embodiments, the aforementioned conductivity enhancer is a carbon black and/or other conductivity enhancer known in the art. In further embodiments, the aforementioned binder is Teflon and or other binder known in the art. In further aforementioned embodiments, the electrolyte solvent is acetonitrile or propylene carbonate, or other electrolyte solvent(s) known in the art. In further aforementioned embodiments, the electrolyte salt is tetraethylaminotetrafluroborate or triethylmethyl aminotetrafluroborate or other electrolyte salt known in the art, or liquid electrolyte known in the art.

In one embodiment, an ultracapacitor device comprising the carbon material comprises a gravimetric power of at least 15 W/g, a volumetric power of at least 10 W/cc, a gravimetric capacitance of at least 110 F/g (@0.5 A/g) and a volumetric capacitance of at least 15 F/cc (@0.5 A/g). In one embodiment, the aforementioned ultracapacitor device is a coin cell double layer ultracapacitor comprising the carbon material, a conductivity enhancer, a binder, an electrolyte solvent, and an electrolyte salt. In further embodiments, the aforementioned conductivity enhancer is a carbon black and/or other conductivity enhancer known in the art. In further embodiments, the aforementioned binder is Teflon and or other binder known in the art. In further aforementioned embodiments, the electrolyte solvent is acetonitrile or propylene carbonate, or other electrolyte solvent(s) known in the art. In further aforementioned embodiments, the electrolyte salt is tetraethylaminotetrafluroborate or triethylmethyl aminotetrafluroborate or other electrolyte salt known in the art, or liquid electrolyte known in the art.

In one embodiment, an ultracapacitor device comprising the carbon material comprises a gravimetric capacitance of at least 90 F/g, at least 95 F/g, at least 100 F/g, at least 105 F/g, at least 110 F/g, at least 115 F/g, at least 120 F/g, at least 125 F/g, or at least 130 F/g. In another embodiment, an ultracapacitor device comprising the carbon material comprises a volumetric capacitance of at least 5 F/cc, at least 10 F/cc, at least 15 F/cc, at least 20 F/cc, at least 25 F/cc, or at least 30 F/cc. In some embodiments of the foregoing, the gravimetric capacitance and volumetric capacitance are measured by constant current discharge from 2.7 V to 0.1 V with a 5-second time constant and employing a 1.8 M solution of tetraethylammonium-tetrafluroroborate in acetonitrile (1.8 M TEATFB in AN) electrolyte and a current density of 0.5 A/g, 1.0 A/g, 4.0 A/g or 8.0 A/g.

In one embodiment, the present disclosure provides ultracapacitors comprising a carbon material as disclosed herein, wherein the percent decrease in original capacitance (i.e., capacitance before being subjected to voltage hold) of the ultracapacitor comprising the carbon material after a voltage hold period is less than the percent decrease in original capacitance of an ultracapacitor comprising known carbon materials. In one embodiment, the percent of original capacitance remaining for an ultracapacitor comprising the carbon material after a voltage hold at 2.7 V for 24 hours at 65° C. is at least 90%, at least 80%, at least 70%, at least 60%, at least 50%, at least 40%, at least 30% at least 20% or at least 10%. In further embodiments of the foregoing, the percent of original capacitance remaining after the voltage hold period is measured at a current density of 0.5 A/g, 1 A/g, 4 A/g or 8 A/g.

In another embodiment, the present disclosure provides ultracapacitors comprising a carbon material as disclosed herein, wherein the percent decrease in original capacitance of the ultracapacitor comprising the carbon material after repeated voltage cycling is less than the percent decrease in original capacitance of an ultracapacitor comprising known carbon materials subjected to the same conditions. For example, in one embodiment, the percent of original capacitance remaining for an ultracapacitor comprising the carbon material is more than the percent of original capacitance remaining for an ultracapacitor comprising known carbon materials after 1000, 2000, 4000, 6000, 8000, or 1000 voltage cycling events comprising cycling between 2 V and 1V at a current density of 4 A/g. In another embodiment, the percent of original capacitance remaining for an ultracapacitor comprising the carbon material after 1000, 2000, 4000, 6000, 8000, or 1000 voltage cycling events comprising cycling between 2 V and 1V at a current density of 4 A/g, is at least 90%, at least 80%, at least 70%, at least 60%, at least 50%, at least 40%, at least 30% at least 20% or at least 10%.

As noted above, the carbon material can be incorporated into ultracapacitor devices. In some embodiments, the carbon material is milled to an average particle size of about 10 microns using a jetmill according to the art. While not wishing to be bound by theory, it is believed that this fine particle size enhances particle-to-particle conductivity, as well as enabling the production of very thin sheet electrodes. The jetmill essentially grinds the carbon against itself by spinning it inside a disc shaped chamber propelled by high-pressure nitrogen. As the larger particles are fed in, the centrifugal force pushes them to the outside of the chamber; as they grind against each other, the particles migrate towards the center where they eventually exit the grinding chamber once they have reached the appropriate dimensions.

In further embodiments, after jet milling the carbon is blended with a fibrous Teflon binder (3% by weight) to hold the particles together in a sheet. The carbon Teflon mixture is kneaded until a uniform consistency is reached. Then the mixture is rolled into sheets using a high-pressure roller-former that results in a final thickness of 50 microns. These electrodes are punched into discs and heated to 195° C. under a dry argon atmosphere to remove water and/or other airborne contaminants. The electrodes are weighed and their dimensions measured using calipers.

The carbon electrodes of the EDLCs are wetted with an appropriate electrolyte solution. Examples of solvents for use in electrolyte solutions for use in the devices of the present application include but are not limited to propylene carbonate, ethylene carbonate, butylene carbonate, dimethyl carbonate, methyl ethyl carbonate, diethyl carbonate, sulfolane, methylsulfolane and acetonitrile. Such solvents are generally mixed with solute, including, tetralkylammonium salts such as TEATFB (tetraethylammonium tetrafluoroborate); TEMATFB (tri-ethyl, methylammonium tetrafluoroborate); EMITFB (1-ethyl-3-methylimidazolium tetrafluoroborate), tetramethylammonium or triethylammonium based salts. Further the electrolyte can be a water based acid or base electrolyte such as mild sulfuric acid or potassium hydroxide. In some embodiments, the electrodes are wetted with a 1.0 M solution of tetraethylammonium-tetrafluoroborate in acetonitrile (1.0 M TEATFB in AN) electrolyte. In other embodiments, the electrodes are wetted with a 1.0 M solution of tetraethylammonium-tetrafluroroborate in propylene carbonate (1.0 M TEATFB in PC) electrolyte. These are common electrolytes used in both research and industry and are considered standards for assessing device performance. In other embodiments, the symmetric carbon-carbon (C—C) capacitors are assembled under an inert atmosphere, for example, in an Argon glove box, and a NKK porous membrane 30 micron thick serves as the separator. Once assembled, the samples may be soaked in the electrolyte for about 20 minutes or more depending on the porosity of the sample.

In some embodiments, the capacitance and power output are measured using cyclic voltammetry (CV), chronopotentiometry (CP) and impedance spectroscopy at various voltages (ranging from 1.0-2.5 V maximum voltage) and current levels (from 1-10 mA) on a Biologic VMP3 electrochemical workstation. In this embodiment, the capacitance may be calculated from the discharge curve of the potentiogram using the formula:

$$C = \frac{I \times \Delta t}{\Delta V} \qquad \text{Equation 1}$$

where I is the current (A) and $\Delta V$ is the voltage drop, $\Delta t$ is the time difference. Because in this embodiment the test capacitor is a symmetric carbon-carbon (C—C) electrode, the specific capacitance is determined from:

$$C_s = 2C/m_e \qquad \text{Equation 2}$$

where $m_e$ is the mass of a single electrode. The specific energy and power may be determined using:

$$E_s = \frac{1}{4} \frac{CV_{max}^2}{m_e} \qquad \text{Equation 3}$$

$$P_s = E_s/4\,ESR \qquad \text{Equation 4}$$

where C is the measured capacitance $V_{max}$ is the maximum test voltage and ESR is the equivalent series resistance obtained from the voltage drop at the beginning of the discharge. ESR can alternately be derived from impedance spectroscopy.

2. Batteries

The disclosed carbon materials also find utility as electrodes in any number of types of batteries. For example, one embodiment is directed to an electrical energy storage device comprising:

a) at least one anode comprising a carbon material;
b) at least cathode comprising a metal oxide; and
c) an electrolyte comprising lithium ions;
wherein the carbon material is any of the carbon materials described herein.

Another embodiment is directed to a metal air battery, for example lithium air batteries. Lithium air batteries generally comprise an electrolyte interposed between positive electrode and negative electrodes. The positive electrode generally comprises a lithium compound such as lithium oxide or lithium peroxide and serves to oxidize or reduce oxygen. The negative electrode generally comprises a carbonaceous substance which absorbs and releases lithium ions. As with supercapacitors, batteries such as lithium air batteries which comprise the disclosed carbon materials are expected to be superior to batteries comprising known carbon materials. Accordingly, in one embodiment the present invention provides a metal air battery, for example a lithium air battery, comprising a carbon material as disclosed herein.

Any number of other batteries, for example, zinc-carbon batteries, lithium/carbon batteries, lead acid batteries and the like are also expected to perform better with the carbon materials described herein. One skilled in the art will recognize other specific types of carbon containing batteries which will benefit from the disclosed carbon materials. Accordingly, in another embodiment the present invention provides a battery, in particular a zinc/carbon, a lithium/carbon batteries or a lead acid battery comprising a carbon material as disclosed herein.

EXAMPLES

Example 1

Reaction Between Dried Resorcinol-Formaldehyde Polymer Gel and Urea at Different Mass Ratios at 95 C A monolithic, microporous dried polymer gel (formed from resorcinol, formaldehyde, and a volatile basic salt in the presence of a water acetic acid co-solvent system as described previously) ground into particles by mortar and pestle. Separately, solid urea was ground by mortar and pestle. The dried polymer gel particles and urea particles were then blended by mixing together in mortar and pestle at various ratios from 1:2 to 5:1 (polymer:urea, mass:mass). These solids blends were then incubated for 24 h at 95 C. The samples are described in Table 1.

TABLE 1

Description of samples for Example 1.

| Sample | Composition | Incubation |
|---|---|---|
| 1-1A | 1:2 Dried polymer gel:Urea | None |
| 1-1B | 1:2 Dried polymer gel:Urea | 24 h at 95 C. |
| 1-2A | 1:1 Dried polymer gel:Urea | None |
| 1-2B | 1:1 Dried polymer gel:Urea | 24 h at 95 C. |
| 1-3A | 2:1 Dried polymer gel:Urea | None |
| 1-3B | 2:1 Dried polymer gel:Urea | 24 h at 95 C. |
| 1-4A | 5:1 Dried polymer gel:Urea | None |
| 1-4B | 5:1 Dried polymer gel:Urea | 24 h at 95 C. |

Figure 2:
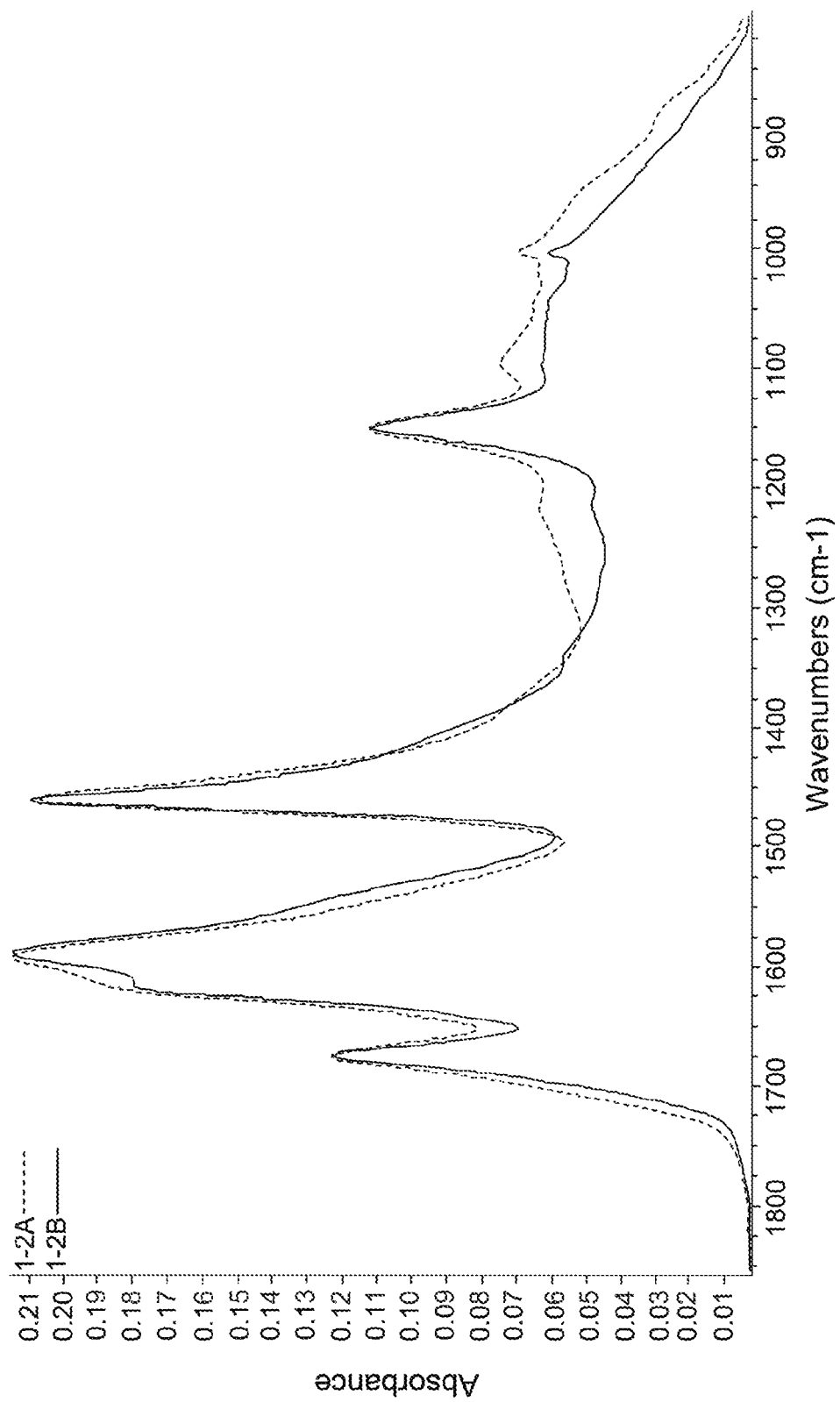
Figure 3:
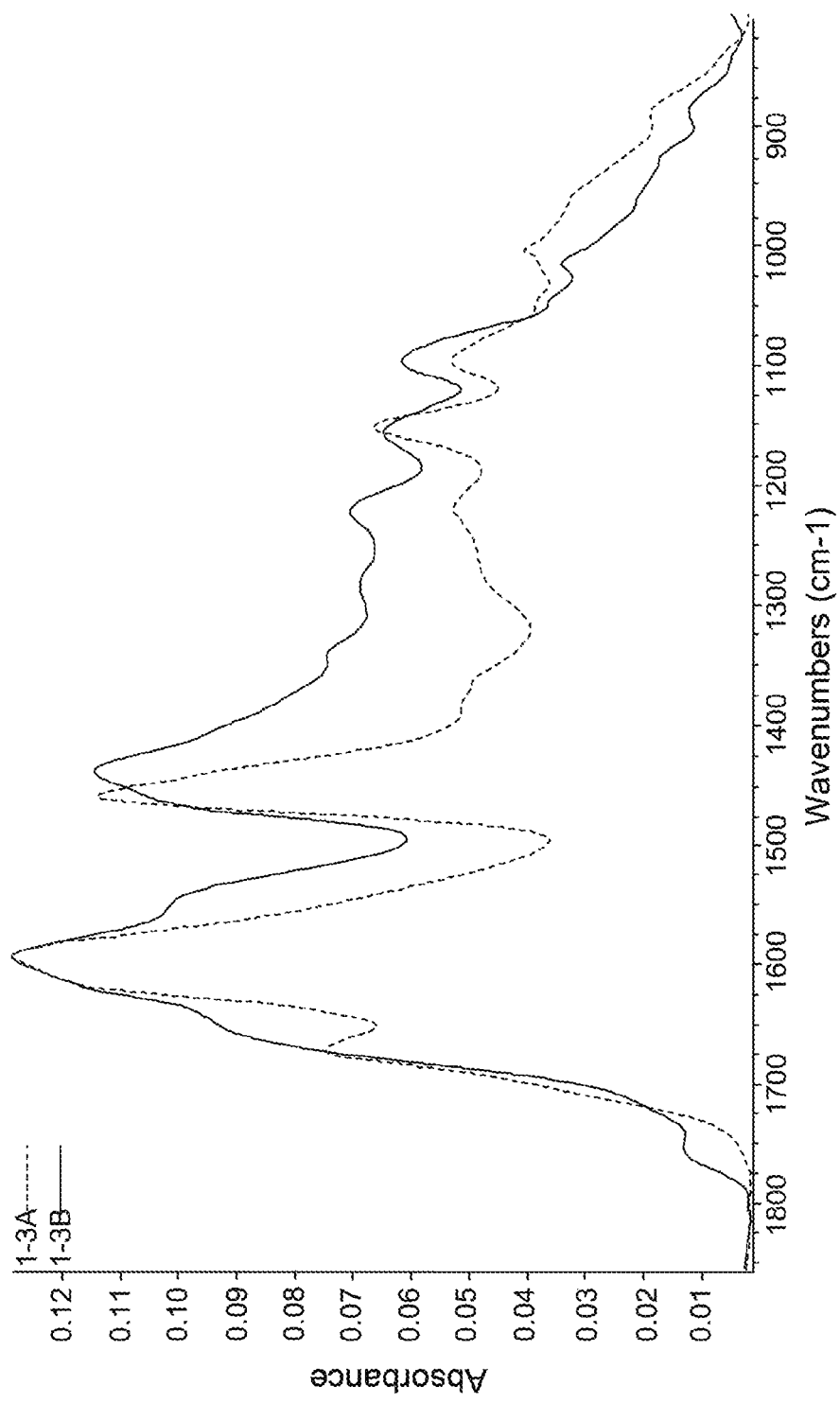
Figure 4:
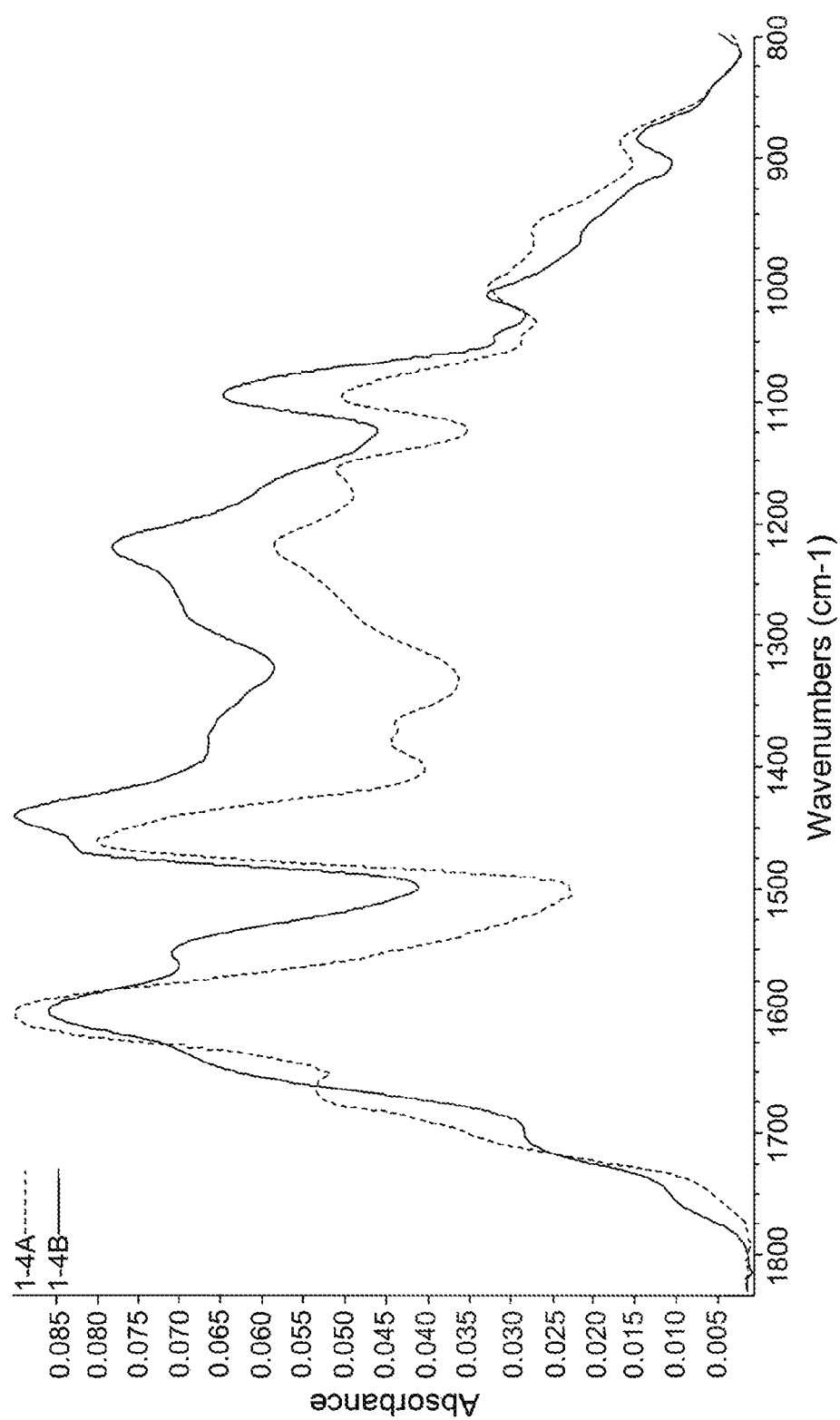

The FTIR in the region of −1800 cm-1 to 800 cm-1 wavenumbers in shown in FIG. 1 for the sample at t=0 and after t=24 h incubation at 95 C for the ratio of 1:2 dried polymer gel:urea. The spectra appear similar, indicating that the 1:2 ratio and temperature and time conditions were not sufficient enough to impart any chemical changes in the material. A similar conclusion can be drawn from the FTIR of the samples produced at the 1:1 ratio (FIG. 2). For the case of the 2:1 ratio (FIG. 3), there were differences noted in the FTIR spectrum. For example, there was additional absorbance in the area at about 1660 cm-1, at about 1550 to 1530 cm-1, and at about 1440 cm-1. Without being bound by theory, these difference in absorbance is due to chemical changes occurring resulting in new bonds formed or broken between the dried polymer gel and urea materials. For example, the 1660 cm-1 may be due to water evolution as product via condensation, and 1550 to 1530 cm-1, and 1440 cm-1 absorbance due to formation of C—N bonds, for example primary or secondary amine type. A similar observation was made for the 5:1 mass ratio of dried polymer gel:urea tested (FIG. 4). These data are consistent with a chemical process that requires a sufficient amount of one reactant (in this case, urea) to the other (in this case, dried polymer gel).

Example 2

Time Course of Reaction Between 2:1 Dried Resorcinol-Formaldehyde Polymer Gel:Urea at 95 C A monolithic, microporous dried polymer gel (formed from resorcinol, formaldehyde, and a volatile basic salt in the presence of a water acetic acid co-solvent system as described previously) was ground into particles by mortar and pestle. Separately, solid urea was ground by mortar and pestle. The dried polymer gel particles and urea particles were then blended at 2:1 polymer gel:urea by mixing together in mortar and pestle incubated for various times and FTIR data collected. The samples are described in Table 2.

TABLE 2

Description of samples for Example 2.

| Sample | Composition | Incubation |
|---|---|---|
| 2-1 | 2:1 Dried polymer gel:Urea | None |
| 2-2 | 2:1 Dried polymer gel:Urea | 3 h at 95 C. |
| 2-3 | 2:1 Dried polymer gel:Urea | 12 h at 95 C. |
| 2-4 | 2:1 Dried polymer gel:Urea | 72 h at 95 C. |

Figure 5:
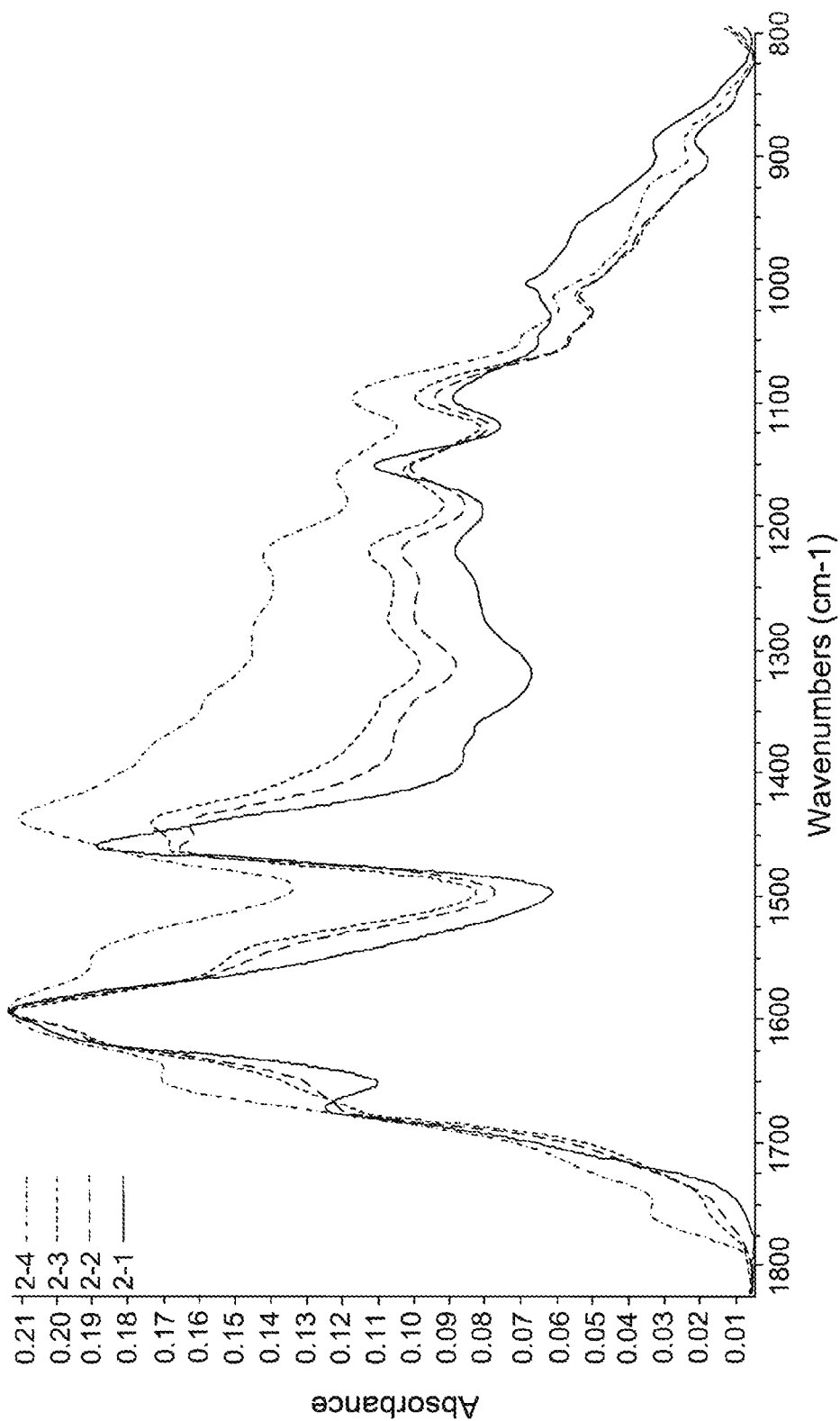

The FTIR in the region of −1800 cm-1 to 800 cm-1 wavenumbers in shows in FIG. 5. As can be seen, with increasing time there was increasing evidence for chemical change in the material, for example, with increasing time at 95 C there were additional absorbance in the area at about 1660 cm-1, at about 1550 to 1530 cm-1, and at about 1440 cm-1. These data are consistent with a chemical process occurring over time.

Example 3

Reaction Between Resorcinol-Formaldehyde Polymer Gel and Urea at Different Mass Ratios at 95 C A monolithic, microporous polymer gel (formed from resorcinol, formaldehyde, and a volatile basic salt in the presence of a water acetic acid co-solvent system as described previously) was ground into particles by mortar and pestle. Separately, solid urea was ground by mortar and pestle. The polymer gel particles and urea particles were then blended by mixing together in mortar and pestle at various ratios from 1:2 to 5:1 (polymer:urea, mass:mass). These solids blends were then incubated for 24 h at 95 C. The samples are described in Table 3.

TABLE 3

Description of samples for Example 1.

| Sample | Composition | Incubation |
|---|---|---|
| 3-1A | 1:2 Polymer gel:Urea | None |
| 3-1B | 1:2 Polymer gel:Urea | 16 h at 95 C. |
| 3-2A | 1:1 Polymer gel:Urea | None |
| 3-2B | 1:1 Polymer gel:Urea | 16 h at 95 C. |

Figure 6:
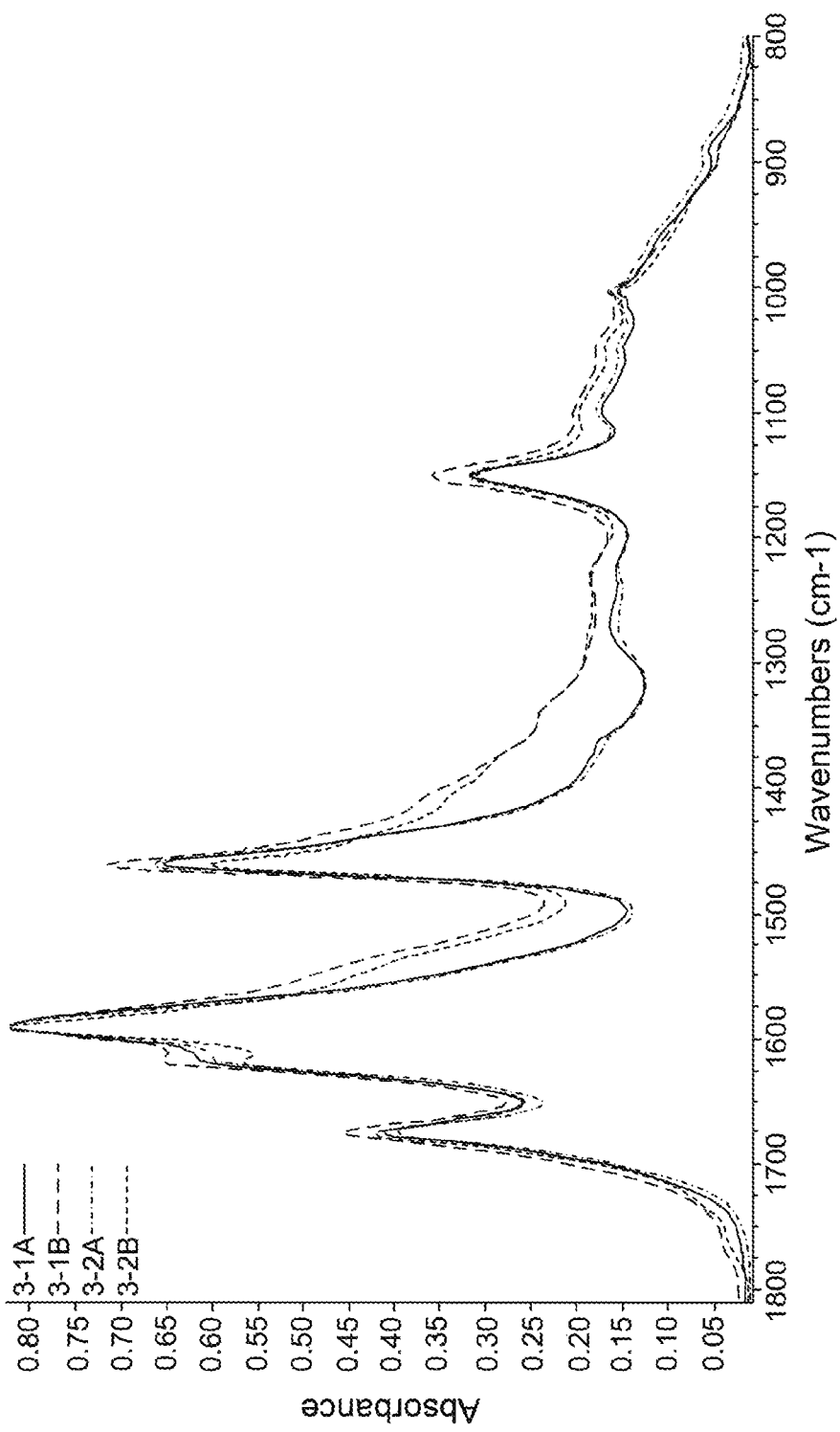

The FTIR in the region of −1800 cm-1 to 800 cm-1 wavenumbers in shown in FIG. 6. The spectra show that following the 16 h incubation at 95 C, there was come change observed in the FTIR spectra, for example an increase in absorbance in the area of about 1540 cm-1 and 1440 to 1400 cm-1. These findings are consistent with Example 1 and 2, and demonstrate that the both polymer gel (non-dried) and dried polymer gel are capable of reacting with the urea in the solid state. In this case there was no change observed in the region of about 1660 cm-1, however, this finding is expected since in this case, the non-dried polymer gel has a large water content, so any minor amounts of additional water generated in the system would not be expected to be detectable over the large amount already present.

Example 4

Pyrolysis of Solid-State Reacted Dried Polymer Gel:Urea and Electrochemical Characterization of Same The solid state reacted dried polymer gel:urea according to sample 2-4 (specifically 2:1 dried polymer gel:urea reacted for 72 h at 95 C) was pyrolyzed by heating to 1100 C and holding for 60 min under inert atmosphere (nitrogen flow). The resulting material (denoted sample 4-1) was characterized for nitrogen sorption. By this method, the specific surface area was 7.4 m2/g, and the total pore volume was not detectable.

Electrochemical characterization for capacity in the presence of LiPF6 electrolyte was carried out as follows. An organic slurry was created from a composition of 90:5:5 carbon:conductivity enhancer (Super P):poly(vinylidene fluoride) by suspension in 1-methyl-2-pyrrolidinone via mortar and pestle mixing. The suspension was coated onto a copper foil substrate via doctor blade, calendared and dried for 1.5 h at 195 C. This electrode was then assembled into a coin cell comprised of 316 L Stainless Steel case (CR2032 geometry) with the copper providing the anode, lithium metal as counter electrode (cathode), a separator (Celgard 2325) and with 1M LiPF6 in 1:1 w/w Ethylene carbonate/Diethyl carbonate as electrolyte. The electrochemical testing protocol was comprised of an asymmetric* constant current constant voltage 5 hour hold @ 0.005V, a voltage window of 2V-0.005V (vs. Li/Li+), and current density of 40 mA/g, and this cycle of charge and discharge was repeated for at least two cycles.

The capacity data are summarized in Table 4. As can be seen, sample 3-1 had about 65% first cycle efficiency with a capacity of about 360-370 mAh/g after several cycles.

TABLE 4

Capacity data for sample 4-1.

| Cycle | Extracted (mAh/g) | Inserted (mAh/g) | Efficiency (%) |
| --- | --- | --- | --- |
| 1 | 296 | 455 | 65 |
| 2 | 324 | 344 | 94 |
| 3 | 341 | 354 | 96 |
| 4 | 353 | 364 | 97 |

Example 5

Co-Pyrolysis of Dried Polymer Gel:Urea and Electrochemical Characterization of Same For this example, sample 5-1 was created by co-pyrolysis of a mixture of 1:1 dried microporous polymer gel (formed from resorcinol, formaldehyde, and a volatile basic salt in the presence of a water acetic acid co-solvent system as described previously):urea (w:w). The material was mixed via mortar and pestle and subsequently this mixture was pyrolyzed by heating to 1100 C at 10 C/min and held for 60 min under inert atmosphere (nitrogen flow). As a control, a second sample was generated that was pyrolyzed in the absence of any urea. The resulting materials were characterized for nitrogen sorption and also for electrochemical characterization employing the same methods as for Example 4. The data are summarized in Table 5. As can be seen, the co-pyrolysis in the presence of urea resulted in dramatic decrease in carbon surface area and increase in electrochemical performance in the LiPF6 electrolyte system.

TABLE 5

Characterization of Samples 5-1 and 5-2.

| | Specific | | Electrochemical Performance | | |
| --- | --- | --- | --- | --- | --- |
| Sample | Surface Area (m2/g) | Pore Volume (cm3/g) | Cycle | Extracted (mAh/g) | Inserted (mAh/g) | Efficiency (%) |
| 5-1 (co-pyrolyzed dried polymer:urea 1:1) | 263 | 0.14 | 1 | 385 | 590 | 65 |
| 5-2 (control) | 491 | 0.21 | 1 | 227 | 406 | 56 |

Example 6

Pyrolysis of Solid-State Reacted Dried Polymer Gel:Hexamethylenetetramine and Electrochemical Characterization of Same A solid state reaction was carried out as follows. Dried microporous polymer gel (formed from resorcinol, formaldehyde, and a volatile basic salt in the presence of a water acetic acid co-solvent system as described previously) was mixed via mortar and pestle with hexamethylenetetramine at a ratio of 1:1 dried polymer gel:hexamethylenetetramine (w:w) and incubated at 140 C for 96 h. The resulting material (denoted sample 6-1) was characterized for nitrogen sorption. By this method, the specific surface area was 0.13 m2/g, and the total pore volume was not detectable.

Electrochemical characterization for capacity in the presence of LiPF6 electrolyte was carried out per methods described in Examples 4 and 5. The capacity data are summarized in Table 6. As can be seen, sample 6-1 had about 69% first cycle efficiency with a capacity of about 360-370 mAh/g after several cycles.

TABLE 6

Capacity data for sample 6-1.

| Cycle | Extracted (mAh/g) | Inserted (mAh/g) | Efficiency (%) |
| --- | --- | --- | --- |
| 1 | 291 | 420 | 69 |
| 2 | 339 | 363 | 93 |
| 3 | 352 | 363 | 97 |
| 4 | 354 | 361 | 98 |

Example 7

Solid-State Reacted Pyrolyzed Carbon:Hexamethylenetetramine and Electrochemical Characterization of Same A solid state reaction was carried out as follows. Pyrolyzed mesoporous carbon (formed from pyrolysis of a polymer gel comprised of resorcinol, formaldehyde, and a volatile basic salt in the presence of a water acetic acid co-solvent system as described previously) was mixed via mortar and pestle with hexamethylenetetramine at a ratio of 1:1 pyrolyzed carbon:hexamethylenetetramine (w:w) and incubated at 140 C for 13 to 96 h. After the treatment with hexamethylenetetramine, the pyrolyzed carbon was re-pyrolyzed consistent with the above examples. The resulting material (denoted sample 6-1) was characterized for nitrogen sorption, and compared to a control (non hexamethylenetetramine treated). Electrochemical characterization for capacity in the presence of LiPF6 electrolyte was carried out per methods described above. The data are summarized in Table 7. As can be seen, the HMT treatment of pyrolyzed carbon allowed for high capacity in the resulting carbon up to 1300 mAh/g capacity on first cycle, with first cycle efficiency in the range of 50-55%.

TABLE 7

Characterization of Samples 7-1, 7-2, and 7-3.

| Sample | Specific Surface Area (m2/g) | Pore Volume (cm3/g) | Cycle | Extracted (mAh/g) | Inserted (mAh/g) | Efficiency (%) |
|---|---|---|---|---|---|---|
| 7-1 (13 h solid-state reacted) | ND | ND | 1 | 590 | 1101 | 54 |
| | | | 2 | 564 | 606 | 93 |
| 7-2 (72 h solid state reacted) | 588 | 0.62 | 1 | 655 | 1322 | 50 |
| | | | 2 | ND | 675 | ND |
| 7-3 (control) | 697 | 0.67 | ND | ND | ND | ND |

ND = not determined.

Example 8

Solid-State Reaction Between Various Compounds

Various compositions were produced using the following solid materials: bisphenol A as a polymer precursor, hexamethylenetetramine as the crosslinker, oxalic acid as an acid, and Tris(hydroxymethyl)aminomethane (Tris) as a base. The compositions can be described in terms of the molar ratios of the crosslinker to precursor, precursor to acid and precursor to base.

TABLE 8

Description of samples for Example 8.

| Sample | Crosslinker:Precursor (mol:mol) | Precursor:Acid (mol:mol) | Precursor:Base (mol:mol) | Incubation |
|---|---|---|---|---|
| 8-1A | 1.63 | ∞ (no acid) | ∞ (no base) | None |
| 8-1B | 1.63 | ∞ (no acid) | ∞ (no base) | 6 h at 130 C. |
| 8-2A | 1.63 | 1.00 | 5.00 | None |
| 8-2B | 1.63 | 1.00 | 5.00 | 6 h at 130 C. |
| 8-3A | 1.63 | 10.0 | 5.0 | None |
| 8-3B | 1.63 | 10.0 | 5.0 | 6 h at 130 C. |
| 8-4A | 1.63 | 100.0 | 5.0 | None |
| 8-4B | 1.63 | 100.0 | 5.0 | 6 h at 130 C. |
| 8-5A | 1.63 | 1.0 | 100.0 | None |
| 8-5B | 1.63 | 100.0 | 100.0 | 6 h at 130 C. |
| 8-6A | 1.63 | 100.0 | 100.0 | None |
| 8-6B | 1.63 | 100.0 | 100.0 | 6 h at 130 C. |
| 8-7A | 2.00 | 10.0 | 5.0 | None |
| 8-7B | 2.00 | 10.0 | 5.0 | 6 h at 130 C. |
| 8-8A | 0.81 | 10.0 | 5.0 | None |
| 8-8B | 0.81 | 10.0 | 5.0 | 6 h at 130 C. |

Figure 7:
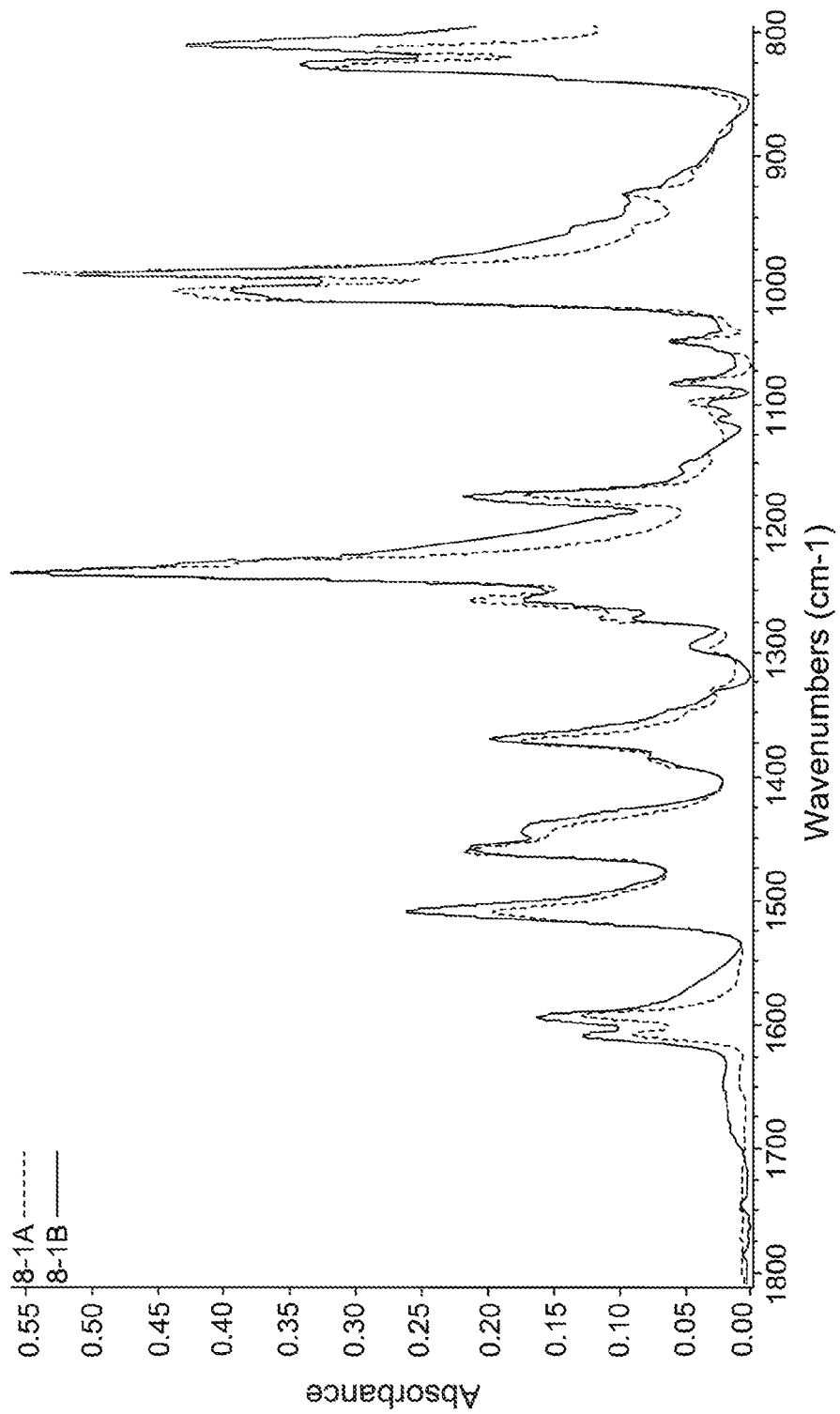

The FTIR spectra for samples 8-1A and 8-1B are depicted in FIG. 7. As can be seen, there was little to no change observed in the spectrum, indicating little or no change in chemical bonding in the material. Therefore, without being bounded by theory, it is concluded under these conditions that no polymerization (or other chemical process for that matter) had occurred.

Figure 8:
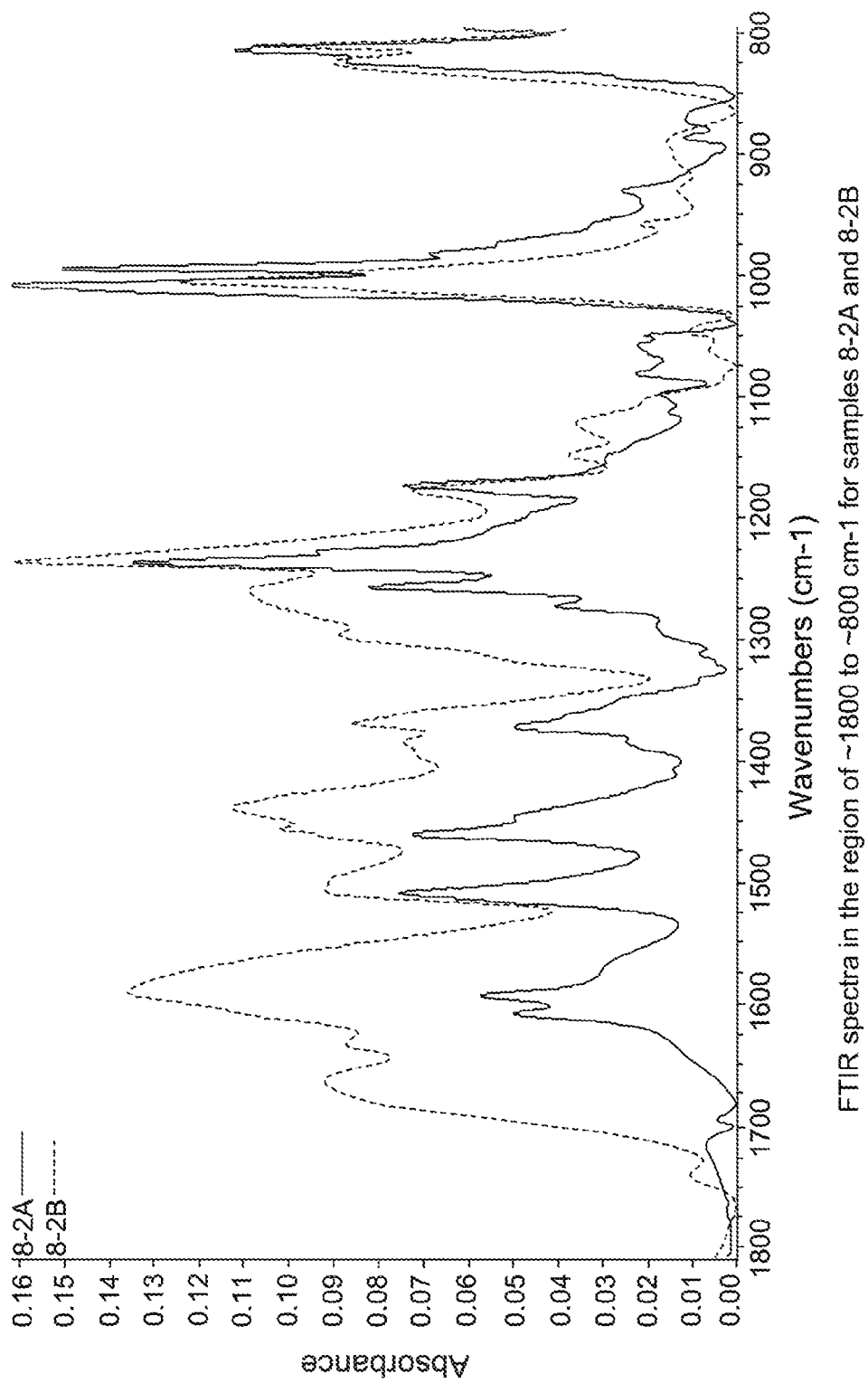
Figure 9:
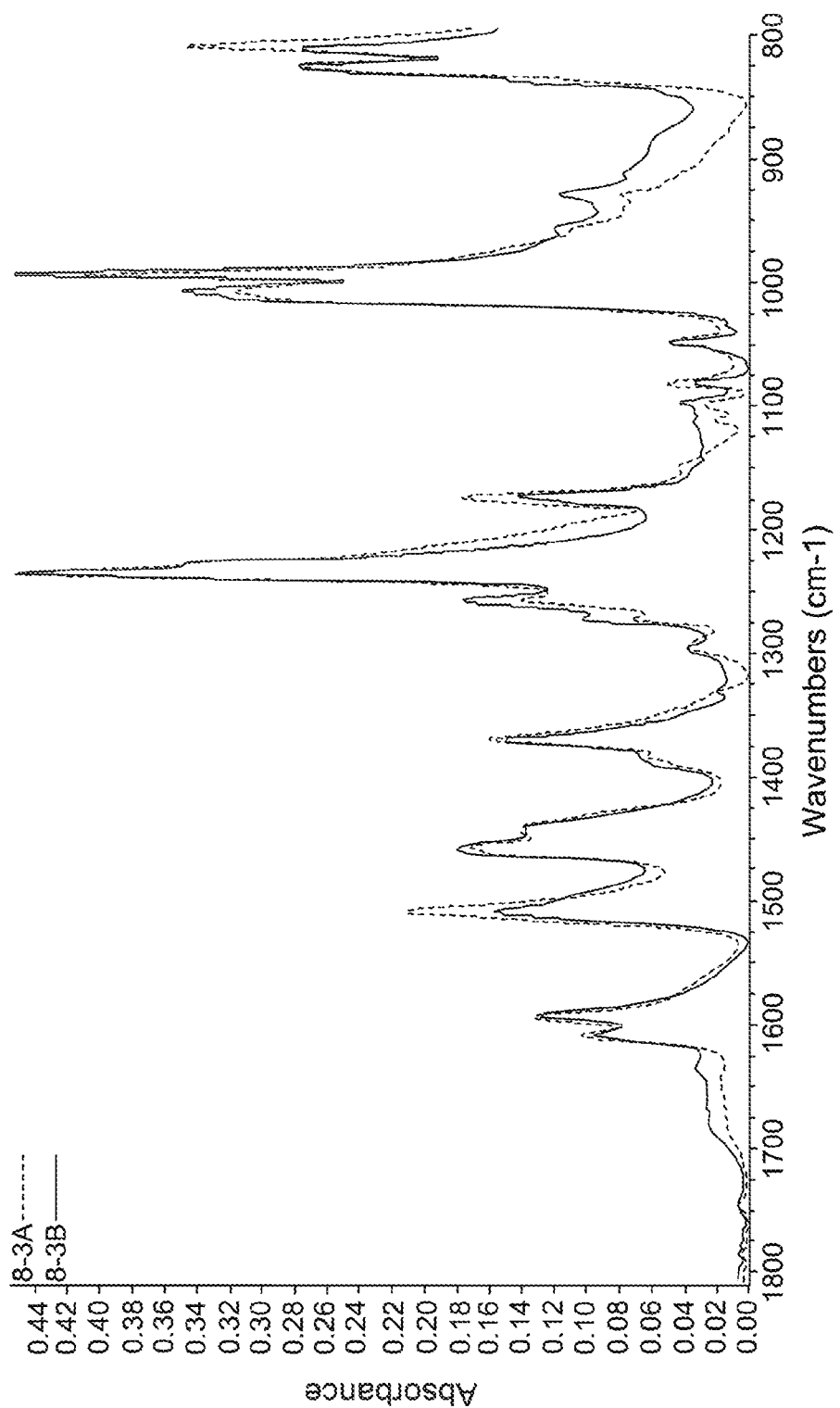
Figure 10:
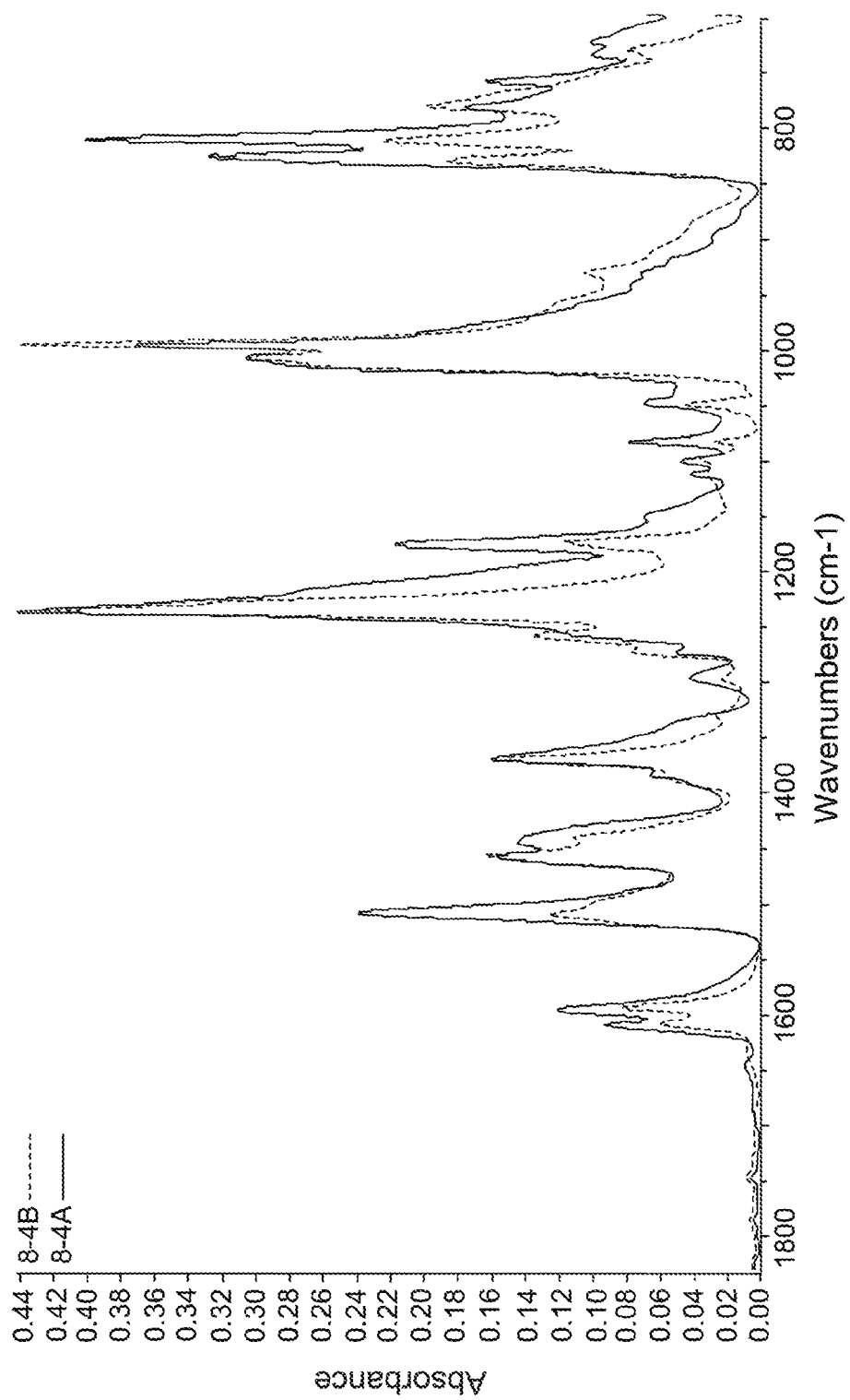
Figure 11:
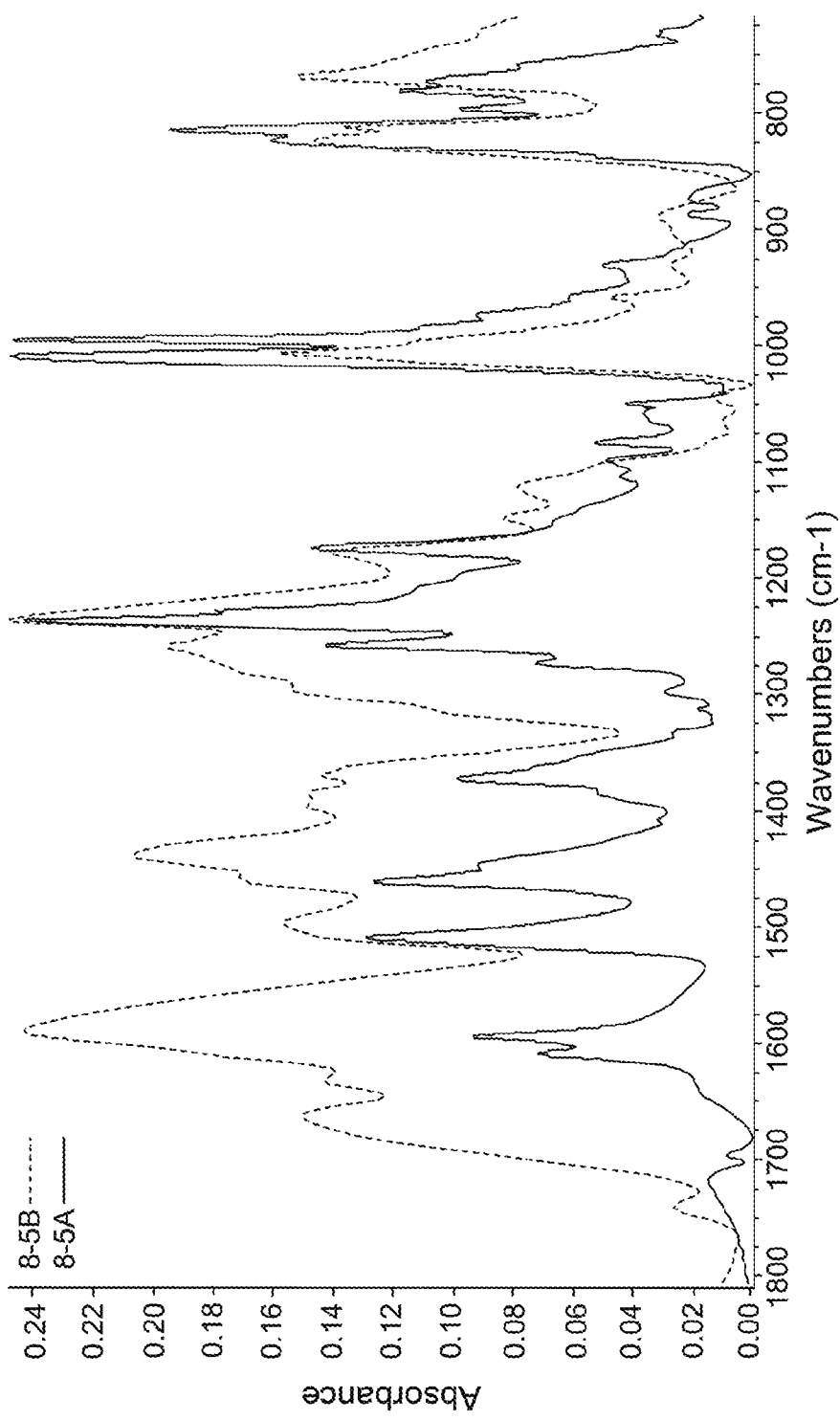
Figure 12:
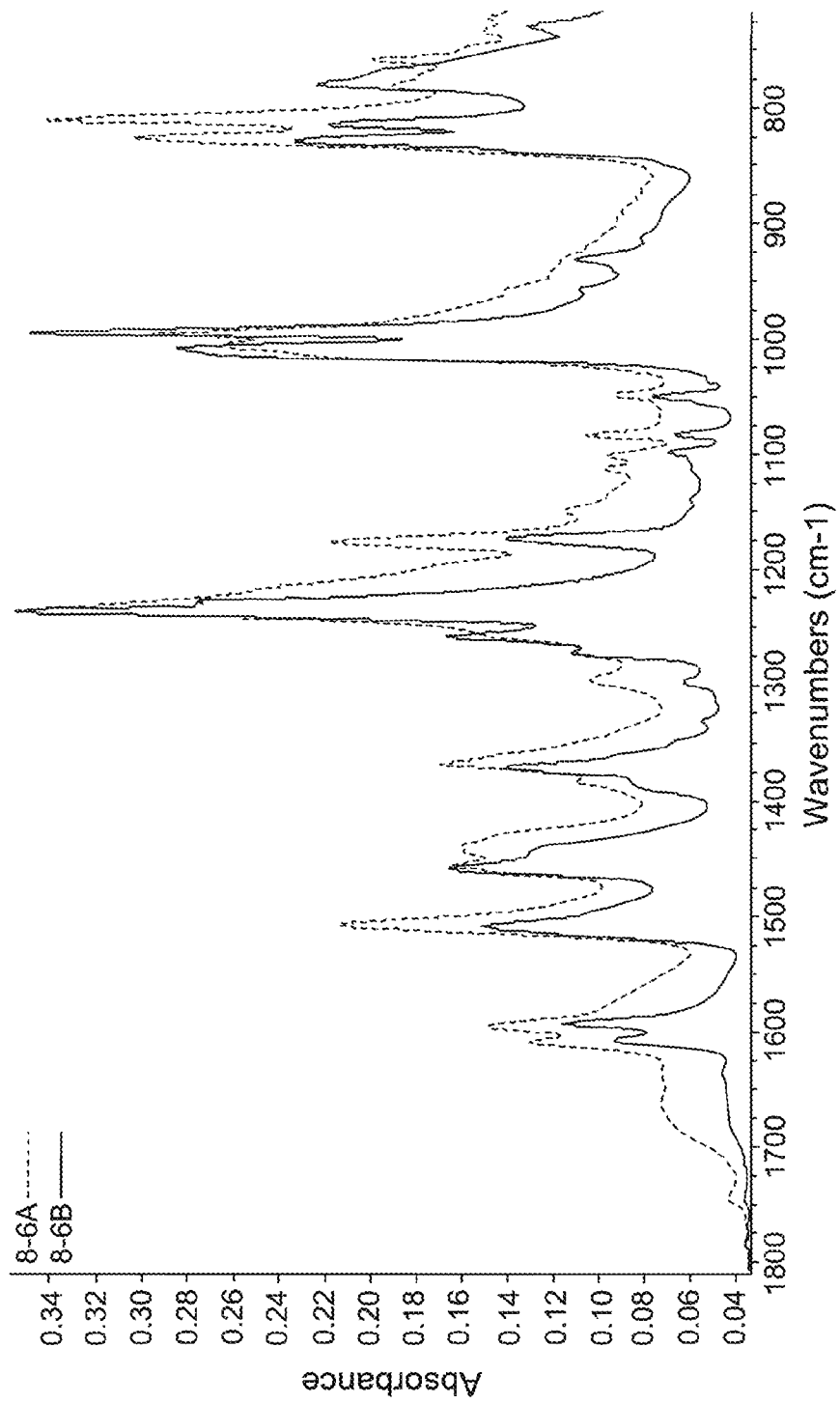
Figure 13:
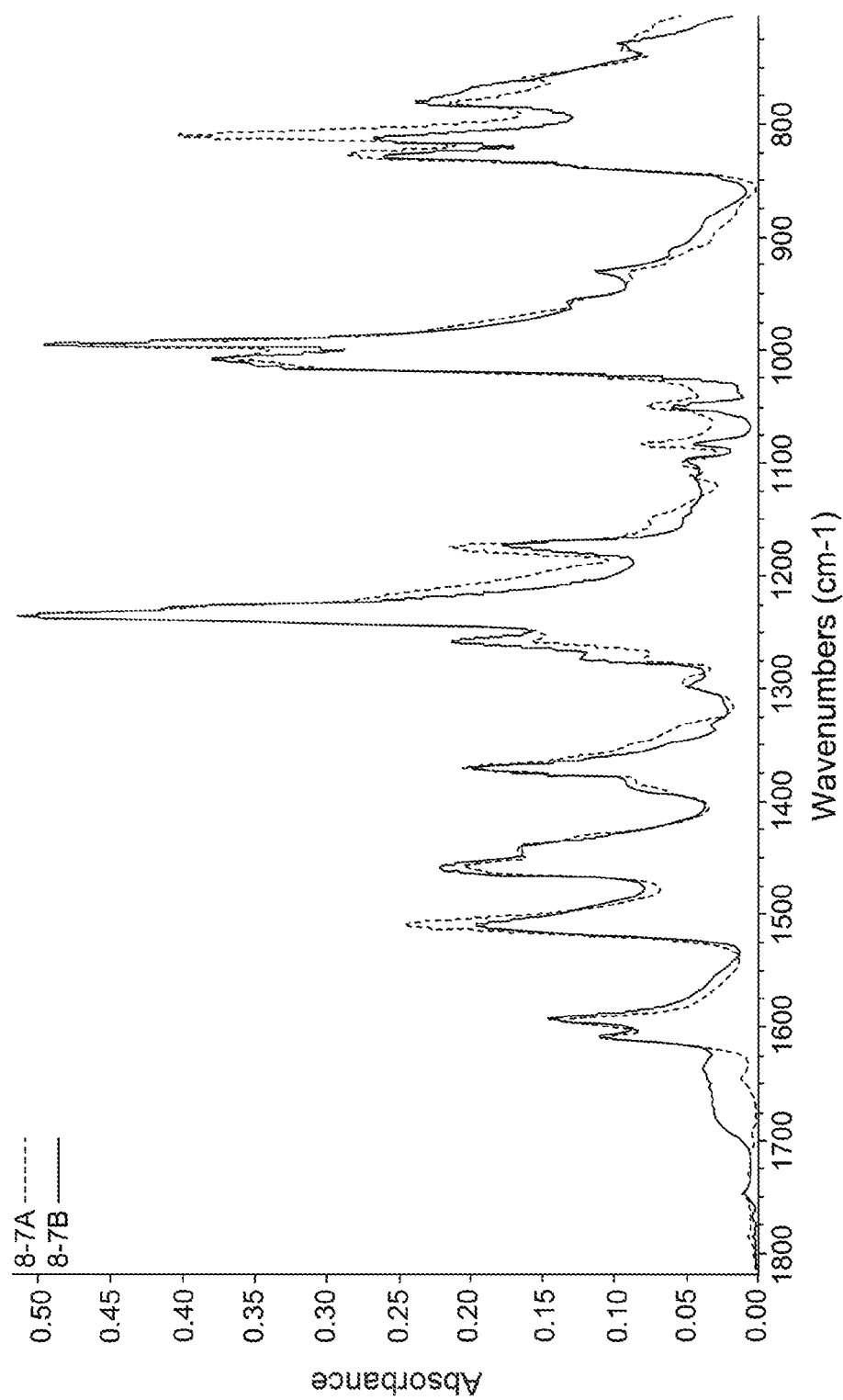
Figure 14:
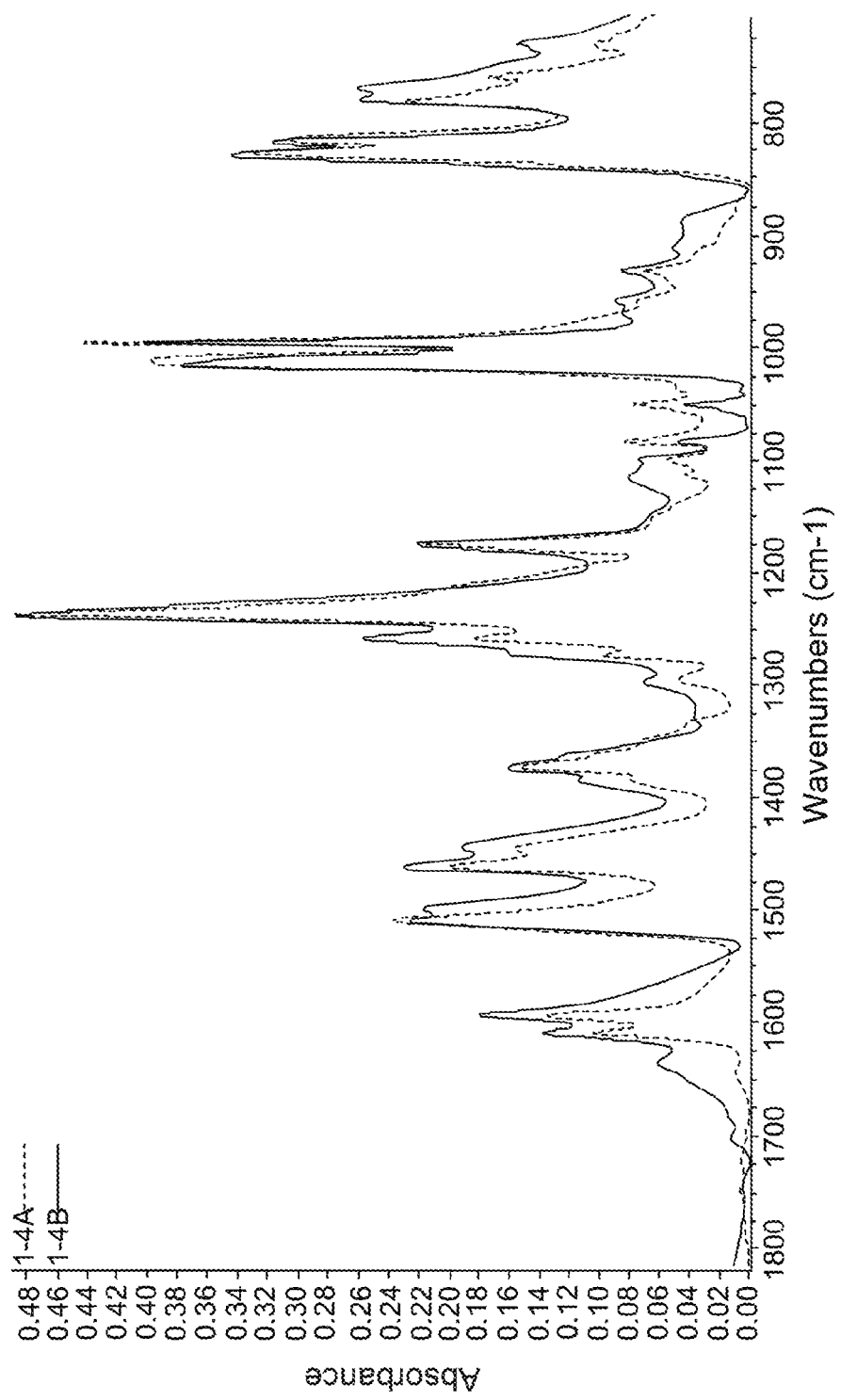

In contrast, the FTIR spectra for samples 8-2A and 8-2B (FIG. 8) show significant differences, indicating a change in chemical bonds that would be consistent with reaction (i.e., polymerization) between the various materials blended. For the various other cases, there were varying degrees of differences in FTIR spectra observed, indicating varying degrees of reaction occurring, demonstrating the ability to tune and control the reaction via judicious selection of the composition. For example, there was also significant chemical changes observed between sample 8-5A and 8-5B (FIG. 11), some minor changes observed between sample 8-6A and 8-6B (FIG. 12), and lesser to minimal changes observed between sample 8-3A and 8-3B (FIG. 9), between sample 8-4A and 8-4B (FIG. 10), between sample 8-7A and 8-7B (FIG. 13) and between sample 8-8A and 8-8B (FIG. 14).

Example 9

Pyrolysis of Samples Described in Example 8

The samples denoted with a "B" from the previous example (Example 8) were pyrolyzed at 900 C under nitrogen gas flow. In addition to pyrolysis by placing the material into a kiln at 900 C and holding for 60 min, and then removed, a second approach (denoted "Slow") was explored where the material was loaded into a tube furnace at room temperature and then heated to 900 at a ramping rate of typically 10 C/min, held for 60 min and then ramped back down to room temperature.

The resulting data for weight loss and nitrogen sorption are presented in Table 9.

TABLE 8

Description of samples for Example 9 and associated data.

| Sample | Description | Pyrolysis Yield (%) | Specific Surface Area (m2/g) | Pore Volume (cm3/g) |
|---|---|---|---|---|
| 9-1A | Pyrolyzed Sample 8-1B | 25 | 665 | 0.256 |
| 9-1B | "Slow" Pyrolyzed 8-1B | 0 | — | — |
| 9-2A | Pyrolyzed Sample 8-2A | 0 | — | — |
| 9-2B | Pyrolyzed Sample 8-2B | 11 | 748 | 0.300 |
| 9-2C | "Slow" Pyrolyzed 8-2B | 27 | <1 | <1 |
| 9-3 | Pyrolyzed Sample 8-3B | 25 | 572 | 0.225 |
| 9-4 | Pyrolyzed Sample 8-4B | 22 | 548 | 0.214 |
| 9-5A | Pyrolyzed Sample 8-5B | 13 | 968 | 0.388 |
| 9-5B | "Slow" Pyrolyzed 8-5B | 28 | <1 | <1 |
| 9-6 | Pyrolyzed Sample 8-6B | 26 | 570 | 0.222 |
| 9-7 | Pyrolyzed Sample 8-7B | 24 | 588 | 0.235 |
| 9-8 | Pyrolyzed Sample 8-8B | 29 | 545 | 0.215 |

For sample 9-1A, it was found the even though no chemical change was observed for the sample, pyrolysis resulted in a pyrolyzed carbon at 25% yield. This result is unexpected since the material was comprised of relatively low molecular weight species that would be expected to not survive the pyrolysis conditions. Without being bound by theory, the materials underwent chemical rearrangement (i.e., polymerization) during heating in the kiln. It is important to note that pyrolysis under "slow" conditions (Sample 9-1B) resulted in the expected zero yield (no pyrolyzed carbon obtained).

For sample 9-2A vs. 9-2B, it was observed that the sample that was not incubated at the previous condition of 6 h at 130 C did not yield any pyrolyzed carbon upon pyrolysis. Furthermore, when sample 8-2B was pyrolyzed under slow condition to yield sample 9-2C, a pyrolyzed carbon material was obtained, but had no surface area or pre volume detected by nitrogen sorption. A similar observation was made for sample 9-5B vs. 9-5A.

Figure 15A:
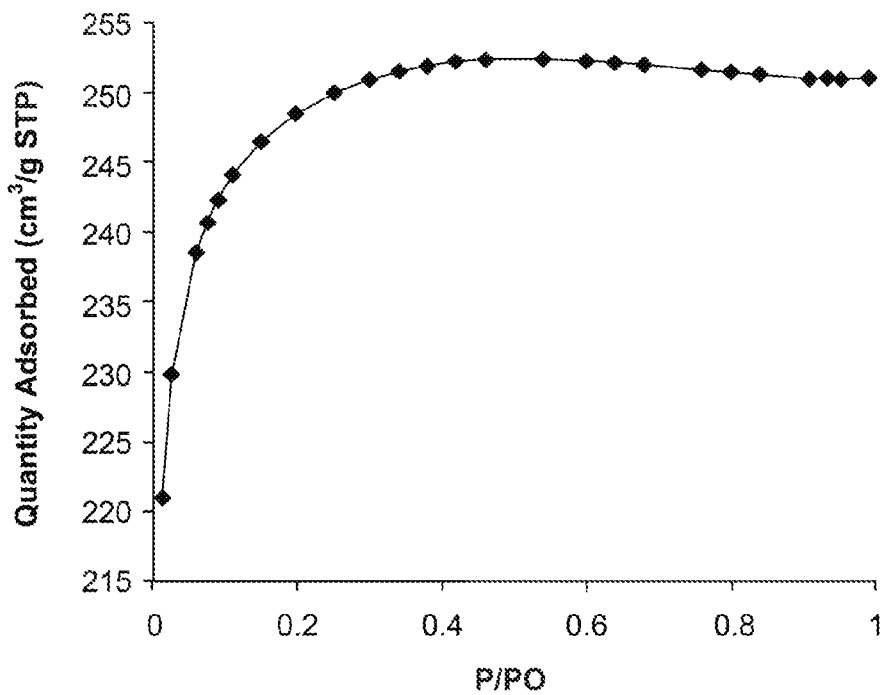
FIGS. 15A and 15B present incremental pore volume and pore width data, respectively.
Figure 15B:
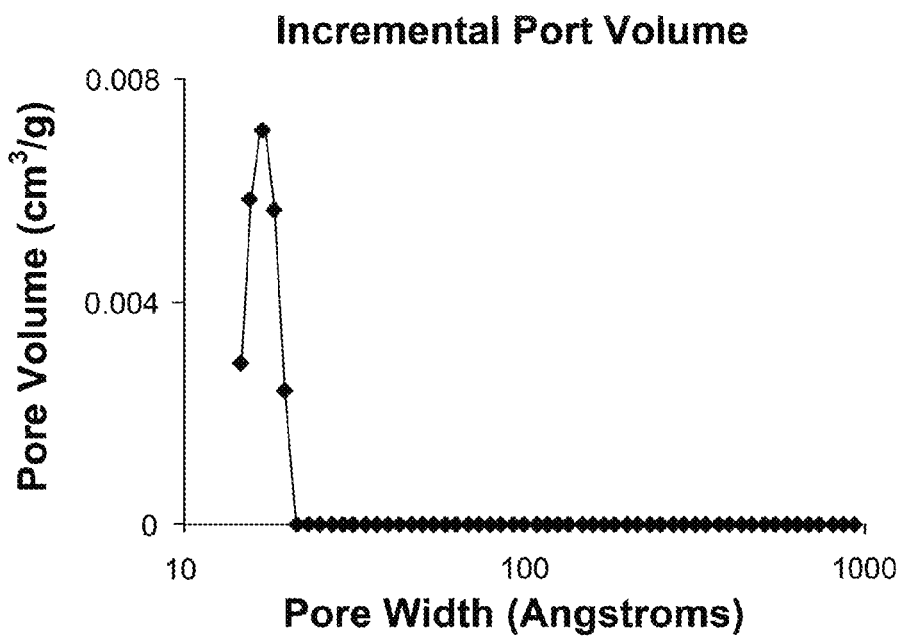

The pore distribution for the various samples appeared to be microporous in nature. An example pore distribution plot is show in FIG. 15 for sample 9-5A.

Example 10

Activation of Pyrolyzed Carbon Samples Described in Example 9 and Electrochemical Characterization Selected pyrolyzed carbon samples from Example 10 were activated at 900 C under carbon dioxide gas flow. The data are summarized in Table 9.

TABLE 9

Description of samples for Example 9 and associated data.

| Sample | Description | Activation Rate (%/min) | Specific Surface Area (m2/g) | Pore Volume (cm3/g) | Nitrogen sorbed $P_{95}/P_{05}$ |
|---|---|---|---|---|---|
| 10-1 | Activated Sample 9-1A | 0.119 | 1317 | 0.528 | 1.06 |
| 10-2 | Activated Sample 9-2B | 0.148 | 1588 | 0.652 | 1.11 |
| 10-3 | Activated Sample 9-5A | 0.161 | 1573 | 0.64 | 1.09 |
| 10-4 | Activated Sample 9-5B | 0.112 | 1114 | 0.44 | 1.04 |

Figure 16A:
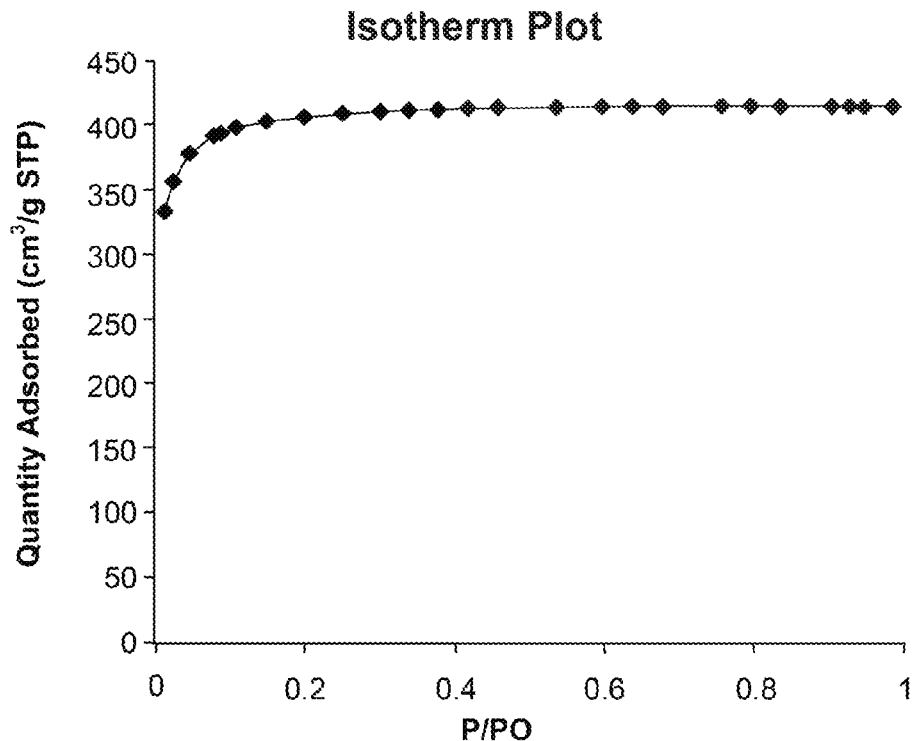
FIGS. 16A and 16B are plots showing incremental pore volume and pore width, respectively.
Figure 16B:
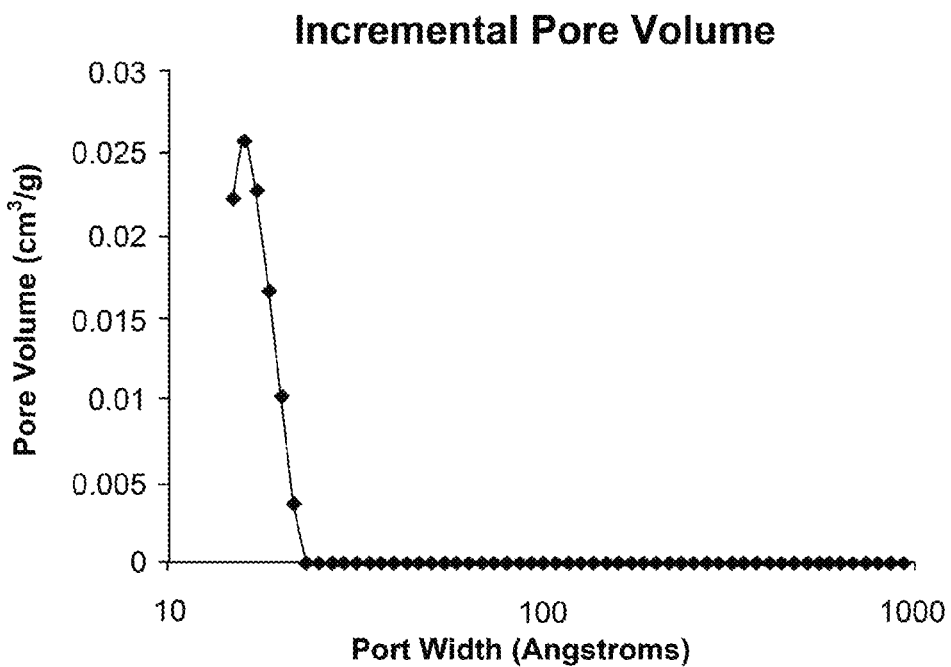

The pore distribution for the various samples appeared to be microporous in nature. An example pore distribution plot is show in FIG. 16 for sample 10-3.

Sample 10-3 was also examined for electrochemical performance, specifically, capacitance and performance in an EDLC and in an electrolyte system comprised of TEATFB in acetonitrile. The methods for electrode and ultracapacitor construction and electrochemical testing are consistent with methods described herein. This activated carbon was found to have a volumetric capacitance of 24.3 F/cc, a maximum theoretical volumetric capacitance of 27.2 F/cc, and a gravimetric capacitance of 118 F/g.

Example 11

Electrochemical Performance of Carbon Treated with Hexamethylenetetramine

A microporous activated carbon (sample 11-1) was obtained via pyrolysis and activation of a crushed polymer gel monolith, and jet milled (to Dv,50 of 7.15 um) as previously described. This carbon was then physically mixed via mortar and pestle with hexamethylenetetramine powder in a 1:1 (mass:mass) ratio, and the blended mixture was stored at 140 C for 96 H. Following this incubation, the HMT-treated carbon was held in the presence of an inert atmosphere (flowing nitrogen gas) and heated to 900 C and cooled back to room temperature. The resulting HMT-treated carbon is denoted 11-2. The physicochemical data for the two carbons are presented in Table 10 and electrochemical data shown in Table 11.

TABLE 10

Physicochemical data for carbons for Example 11.

| Sample | Description | Specific Surface Area (m2/g) | Pore Volume (cm3/g) | SSA/PV (GM) |
|---|---|---|---|---|
| 11-1 | Microporous activated carbon | 1709 | 0.730 | 23.4 |
| 11-2 | Microporous activated carbon treated with hexamethylenetetramine for 96 h at 140 C. | 1411 | 0.601 | 23.5 |
| 11-3 | Microporous activated carbon at lower activation level | 1450 | 0.603 | 24.0 |

TABLE 11

Electrochemical data for carbons for Example 11.

| Sample | Gravimetric Capacitance (F/g) | Maximum Theoretical Capacitance (F/cc) | Resistance (Ohm) | |
|---|---|---|---|---|
| | | | R1 | R2 |
| 11-1 | 112.8 | 24.2 | 3.19 | 3.15 |
| 11-2 | 103.1 | 24.8 | 4.05 | 3.54 |
| 11-3 | 105.9 | 25.4 | 6.93 | 3.84 |

As can be seen, the treatment with hexamethylenetetramine resulted in a decrease in carbon surface area, with a decrease in gravimetric capacitance. For comparison of electrochemical performance, another microporous activated carbon was examined (Sample 11-3), with a similar surface area to the hexamethylenetetramine treated carbon (sample 11-2). It can be seen, that the hexamethylenetetramine treated carbon exhibited a much lower resistance than the comparator at the similar surface area.

Example 12

Solid State Polymerization of Glucose

Figure 17:
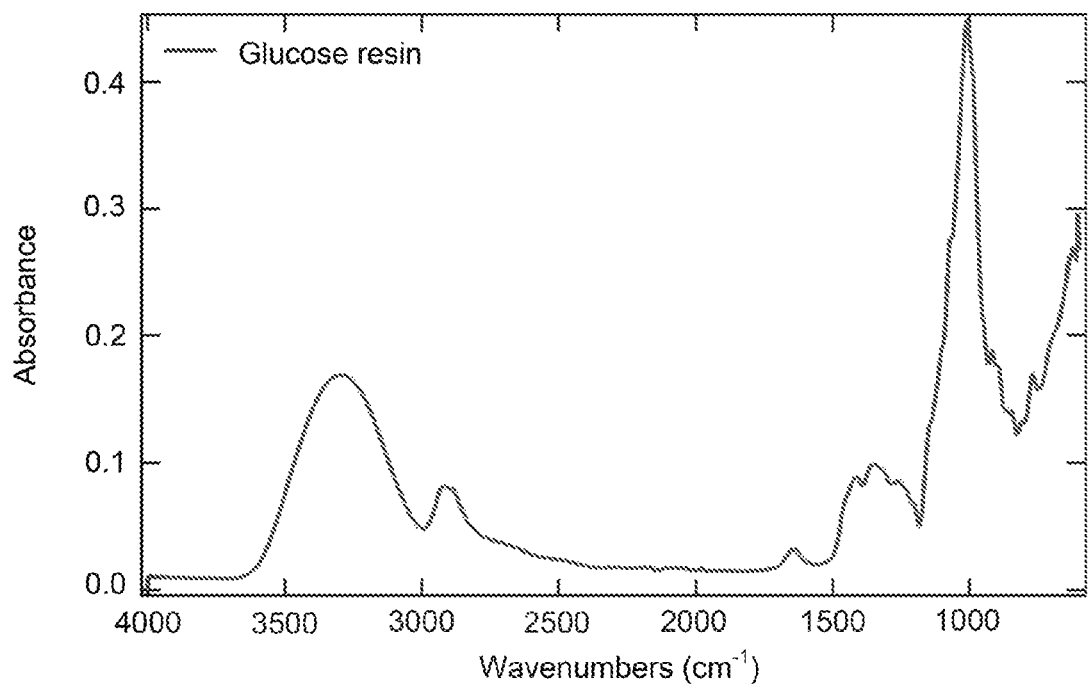
FIG. 17 is an FTIR spectrum of a glucose resin.
Figure 18:
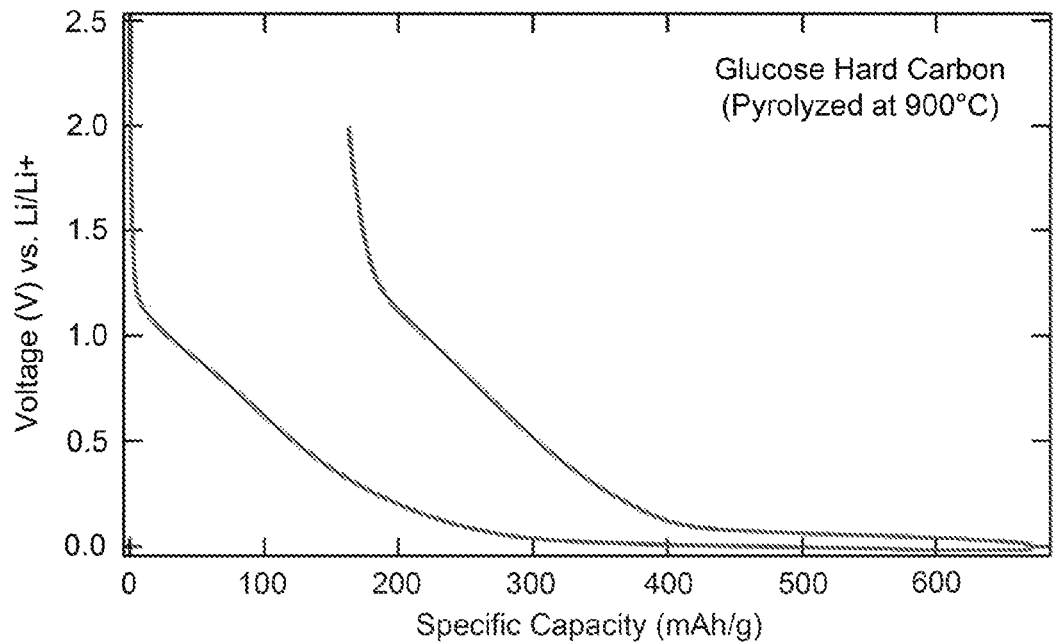
FIG. 18 shows a voltage profile of carbon produced from a glucose resin.

A mass of 10 grams of D-glucose powder was placed in an alumina crucible and heated in air in a convection oven at 140 C for 2 hours. During this time, the glucose melted, became golden in color, and solidified. The resulting resin was crushed and characterized via FT-IR (data shown in FIG. 17) and BET nitrogen adsorption (data shown in Table 12). Alternatively, the temperature can be increased or decreased to yield a higher or lower cross-linked resin, respectively. The resulting resin was pyrolyzed at 900 C for 1 h in a tube furnace under nitrogen flow. The resulting carbon was characterized via BET nitrogen adsorption (data shown in Table 12) and electrochemically tested in a coin cell vs. lithium metal with 1M LiPF6 in 1:1 w/w EC:DEC electrolyte via constant current discharge/charge cycling. The voltage profile is shown in FIG. 18.

TABLE 12

BET nitrogen adsorption data for glucose resin and carbon for Example 12.

| Phase | BET Specific Surface Area (m²/g) | BET Pore Volume (cm³/g) |
|---|---|---|
| Carbon | 39 | 0.008 |
| Resin | <1 | <1 |

Example 13

Solid State Polymerization of Fructose

Figure 19:
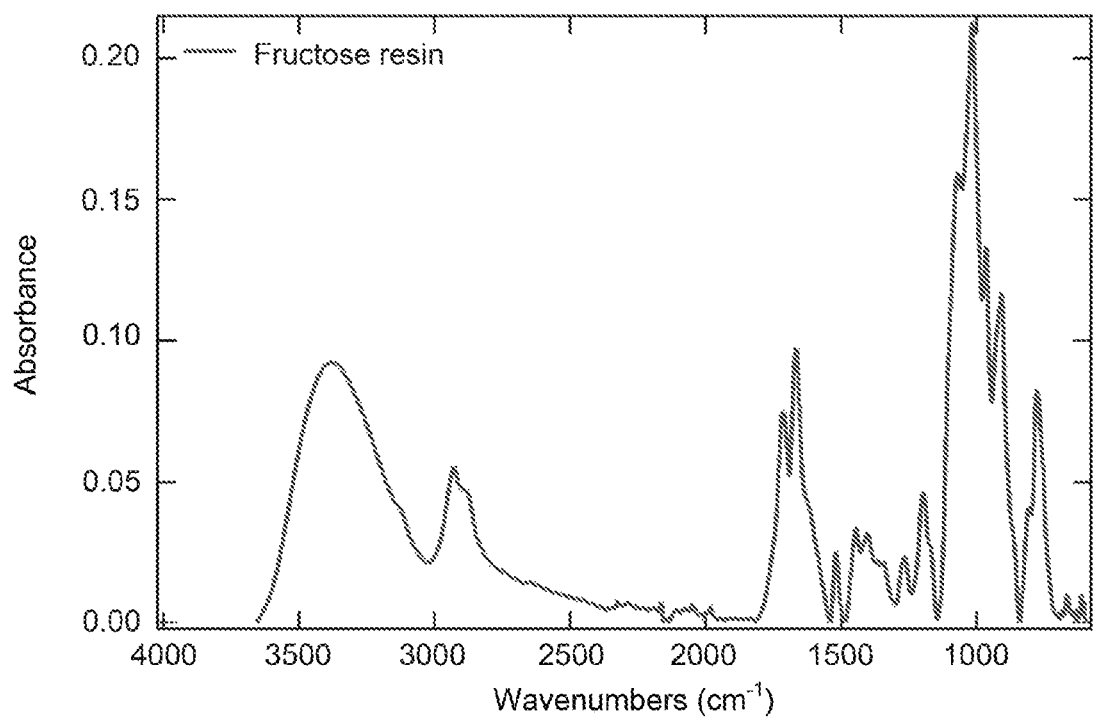
FIG. 19 is an FTIR spectrum of a fructose cured resin.
Figure 20:
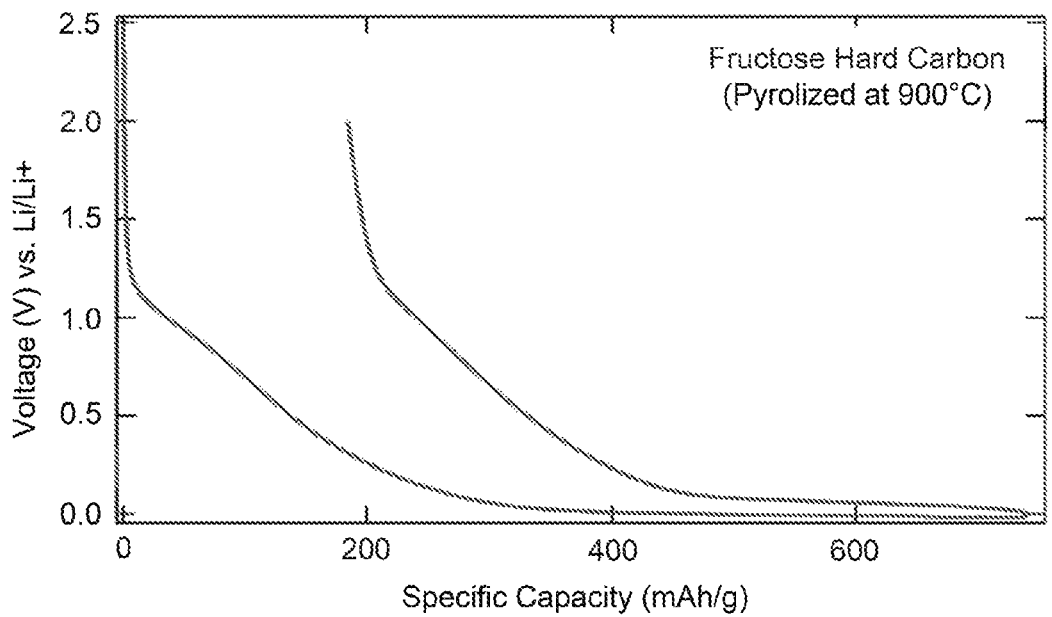
FIG. 20 present voltage profile data for carbon produced from fructose resin.

A mass of 10 grams of fructose powder was placed in an alumina crucible and heated in air in a convection oven at 140 C for 48 hours. During this time, the fructose melted, became brown in color, and solidified. The resulting resin was crushed and characterized via FT-IR (data shown in FIG. 19) and BET N2 adsorption (data shown in Table 13). Alternatively, the temperature can be increased or decreased to yield a higher or lower cross-linked resin, respectively. The resulting resin was pyrolyzed at 900 C for 1hr in a tube furnace under nitrogen flow. The resulting carbon was characterized via BET nitrogen adsorption (data shown in Table 13) and electrochemically tested in a coin cell vs. lithium metal with 1M LiPF6 in 1:1 w/w EC:DEC electrolyte via constant current discharge/charge cycling between −0.015V-2V (vs. Li/Li+). The voltage profile is shown in FIG. 20.

TABLE 13

BET nitrogen adsorption data for fructose resin and carbon for Example 13.

| Phase | BET Specific Surface Area (m²/g) | BET Pore Volume (cm³/g) |
|---|---|---|
| carbon | 333 | 0.163 |
| resin | <1 | <1 |

Example 14

Figure 21:
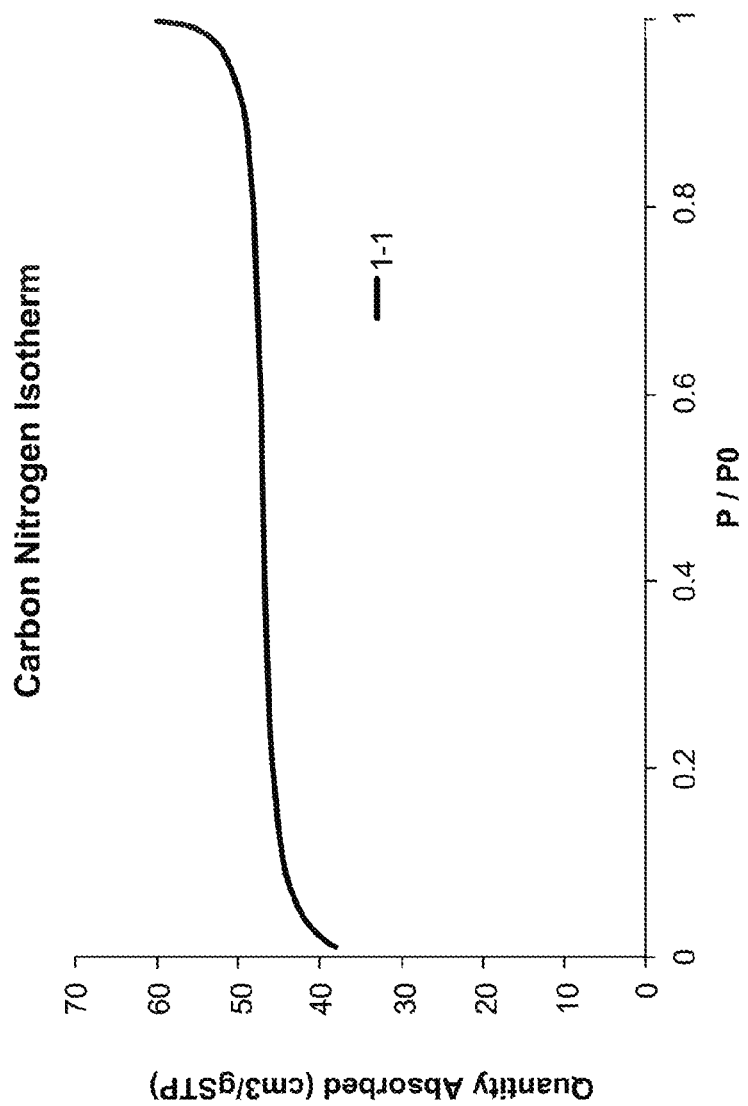
FIG. 21 is a plot of a nitrogen sorption isotherm.

Hard Carbon Anode-Solid State Reaction Examples for Melamine-Glucose-Ammonium Di-Hydrogen Phosphate Resin In a mortar and pestle, 3.1 grams of melamine was ground together with 2.2 grams of D-Glucose for 15 minutes. Next, 1.0 gram of Ammonium di-hydrogen Phosphate was added to the mixture and it was continually crushed and mixed for 20 minutes. The solid white mixture was then poured into a crucible and placed in a 120 C oven for 24 hours. The temperature was then increased to 140 C and the sample was held for 6 hours. The resulting resin was a brown solid mass. After the 140 C hold, the sample was pyrolyzed at 1050 C for 1 hour using a Thermo Scientific, Economy Solid Tube furnace. The resulting carbon was then tested for specific surface area and pore volume using a Micromeritics Tristar II BET system. Nitrogen isotherm, surface area, and pore volume data is shown in FIG. 21 and Table 14.

TABLE 14

BET nitrogen adsorption data for Example 14.

| Sample | SSA (m²/g) | PV (cm³/g) | Nitrogen sorbed $P_{95}/P_{05}$ | True Density (g/cm³) |
|---|---|---|---|---|
| 14-1 | 173 | 0.086 | 1.18 | 1.9582 |

Example 15

Hard Carbon Anode-Solid State Reaction Examples for Melamine-Glucose-Ammonium Di-Hydrogen Phosphate Resin In a mortar and pestle, 1.65 grams of melamine was ground together with 2.36 grams of D-Glucose for 15 minutes. Next, 2.0 gram of Ammonium di-hydrogen Phosphate was added to the mixture and it was continually crushed and mixed for 20 minutes. The solid white mixture was then poured into a crucible and placed in a 120 C oven for 24 hours. The temperature was then increased to 140 C and the sample was held for 6 hours. The resulting resin was a brown solid mass. After the 140 C hold, the sample was pyrolyzed at 1050 C for 1 hour using a Thermo Scientific, Economy Solid Tube furnace.

Example 16

Hard Carbon Anode-Solid State Reaction Examples for Melamine-Glucose-Ammonium Di-Hydrogen Phosphate Resin In a mortar and pestle, 1.26 grams of melamine was ground together with 1.80 grams of D-Glucose for 15 minutes. Next, 3.0 gram of Ammonium di-hydrogen Phosphate was added to the mixture and it was continually crushed and mixed for 20 minutes. The solid white mixture was then poured into a crucible and placed in a 120 C oven for 24 hours. The temperature was then increased to 140 C and the sample was held for 6 hours. The resulting resin was a brown solid mass. After the 140 C hold, the sample was pyrolyzed at 1050 C for 1 hour using a Thermo Scientific, Economy Solid Tube furnace.

Example 17

Figure 22:
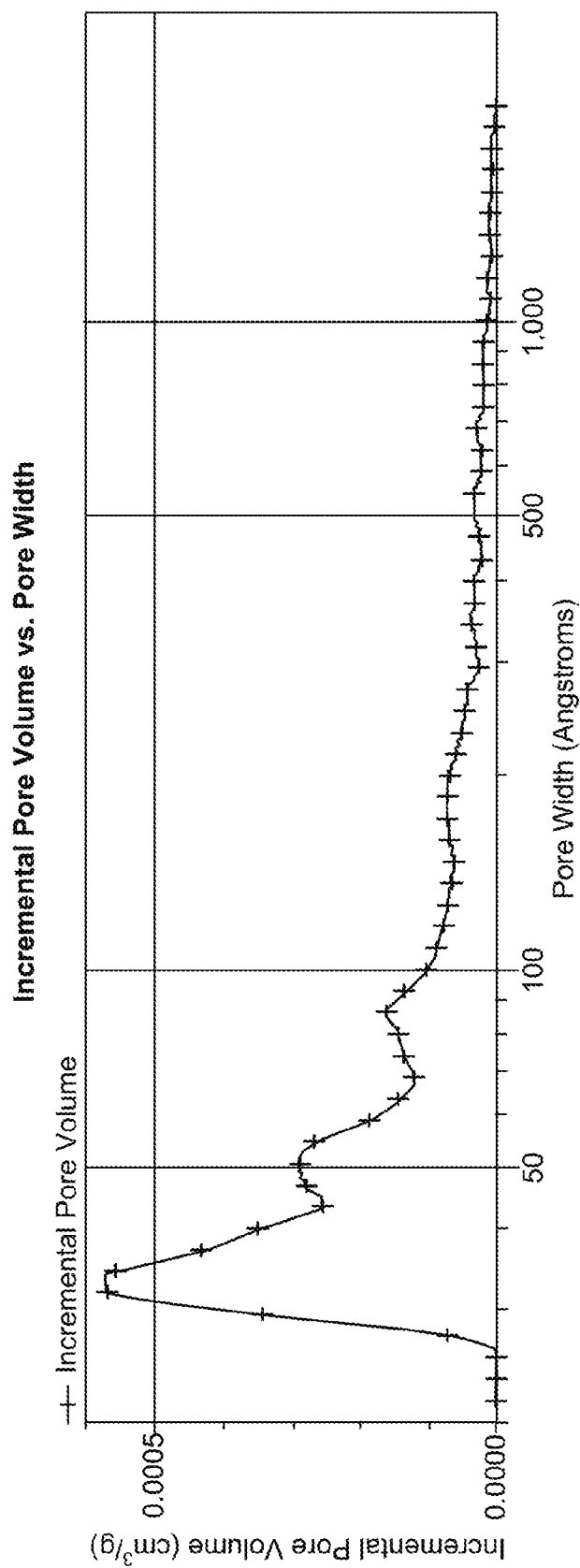
FIG. 22 presents a DFT pore volume distribution as calculated from a nitrogen sorption isotherm.

Solid State Reaction 2-Naphthol and Examples for Melamine-Glucose-Ammonium Di-Hydrogen Phosphate Resin In a mortar and pestle, a 1:1 mass ratio of 2-naphthol and hexamethylenetetramine was ground together and held at 130 C for about 12 h. The resulting material was "slow" pyrolyzed as described above. This resulted in a pyrolyzed carbon at 27% yield (sample 17-1). The single point surface area by nitrogen sorption was 1.5 m2/g. The pore distribution was found to include micro and mesopores (FIG. 22).

Example 18

Polymerization of Precursor Compounds in a Kiln

The monomer or precursor compounds to be polymerized in this example can be selected from the various species described herein. The particle size reduction of the various species can be accomplished as known in the art, for example (but not limited to) by ball milling, jet milling, grinding, sieving, and the like, and combination thereof. In certain embodiments the particle size of the materials is manipulated to control the polymerization by altering the relative amount of each material that is allowed to mix locally. After particle size reduction, an alternate catalyst can be combined, for example an acid or a base, or combinations thereof. The mixture can be loaded into a kiln, or other reactor capable of heating and/or mixing solids in at elevated temperature with controlled flow of gas. For instance, the power mixture can be loaded into a continuous throughput rotary kiln hopper. The kiln can be purged with nitrogen. When the kiln reaches steady state, the mixture can be introduced into the kiln at a predetermined rate. The first zone of the kiln can be set to 150 C (change to appropriate temperature as needed) and the feed rate, rotation and kiln angle set to allow the material to reside in the first hot zone for 30 minutes. While not wishing to be bound by theory it is expected that the material in the first hot zone is melted and then polymerized before passing into the second and third hot zone where pyrolysis occurs. The second zone of the kiln can be set to 500 C and the last zone set to 800 C. In certain embodiments the polymerization takes place in one kiln where temperatures appropriate for polymerization are used as set points (50 C-300 C) and pyrolysis takes place in a second kiln where temperature appropriate for pyrolysis are used as set points (300 C-1100 C). More the two, for example 3 or 4 or 5 or more different heating zones can be employed. Different reaction gases can be introduced into each zone. The exiting pyrolyzed material can be collected in a hopper. In various embodiments of this example, the particles size (Dv,50) can range from 1 um to 10 cm, for example 1 um to 2 cm, for example from 1 um to 50 um, for example from 100 um to 2 mm. In various embodiments, alternate milling techniques can include Frisch mill, Jet mill, ball mill, roller mill, fluidized jet mill.

Example 19

Preparation of Polymers from a Precursor System Comprised of BPA and HMT at Various Ratios, and Production and Characterization of Carbon Produced from Same Various polymeric materials were produced by mixing solid bisphenol A (BPA) and solid hexamethylenetetramine (HMT) at various ratios, and incubating the solid, solvent-free mixture for various times (14 h to 16 h) and temperatures (130-140 C) as described in Table 15. The melting point of BPA is 158 C. These polymers were pyrolyzed and activated generally according to the procedures described herein. Properties of the resulting activated carbons are described in Table 16, including the conversion ratio, which is defined as the mass units of precursors required to achieve one mass unit of carbon, and the normalized conversion ratio, which the mass units of precursors required to achieve one mass unit of carbon normalized to a carbon surface area of 1700 m2/g. The carbons produced were highly microporous, as evidenced by the values of % micropores, % mesopores, and % macropores listed in Table 16. As can be seen, the lowest conversion factors, indicating the least amount of precursor material required to produce a given mass of carbon material occurs between about 2.5:1 to 0.166:1 HMT:BPA (mol:mol), preferably between about 1.63:1 to 0.668:1 HMT:BPA (mol:mol). Without being bound by theory, the HMT molecule provides 6 mol of formaldehyde (and 6 mol of ammonia) per mol whereas BPA has four primary potential cross-linking sites (and other minor potential crosslinking sites), providing a stoichiometry of 2:3, or 0.667 mol:mol.

TABLE 15

Description of various polymer samples produced according to Example 19.

| Sample | Ratio HMT:BPA (mol:mol) | Temperature (C.) | Time (h) | Oven yield (%) |
|---|---|---|---|---|
| 19-1 | 5:1 | 130 | 14 | 96 |
| 19-2 | 4:1 | 130 | 14 | 97 |
| 19-3 | 3:1 | 130 | 14 | 93 |
| 19-4 | 2.5:1 | 130 | 14 | 93 |
| 19-5 | 1.63:1 | 130 | 14 | 94 |
| 19-6 | 1:1 | 130 | 14 | 95 |
| 19-7 | 0.668:1 | 140 | 16 | 93 |
| 19-8 | 0.166:1 | 140 | 16 | 98 |
| 19-9 | 0.050:1 | 140 | 16 | 100 |

TABLE 16

Properties of various carbon samples produced according to Example 19.

| Carbon Sample | Surface Area (m2/g) | Pore Volume (cm3/g) | Micropores/ Mesopores/ Macropores (%/%/%) | Conversion Ratio | Normalized Conversion Ratio |
|---|---|---|---|---|---|
| 19-1 | 1847 | 0.77 | 97.8/2.2/0 | 7.1 | 6.7 |
| 19-2 | 1819 | 0.756 | 98.2/1.8/0 | 8.8 | 8.4 |
| 19-3 | 1600 | 0.661 | 100/0/0 | 6.5 | 6.9 |
| 19-4 | 1673 | 0.692 | 100/0/0 | 5.6 | 5.6 |
| 19-5 | 1645 | 0.681 | 99.9/0.1/0 | 6.0 | 6.1 |
| 19-6 | 1692 | 0.700 | 99.7/0.3/0 | 5.8 | 5.8 |
| 19-7 | 1494 | 0.618 | 100/0/0 | 8.9 | 5.1 |
| 19-8 | 1048 | 0.436 | 100/0/0 | 4.4 | 5.7 |
| 19-9 | 864 | 0.35 | 100/0/0 | 4.7 | 11.0 |

Example 20

Figure 23:
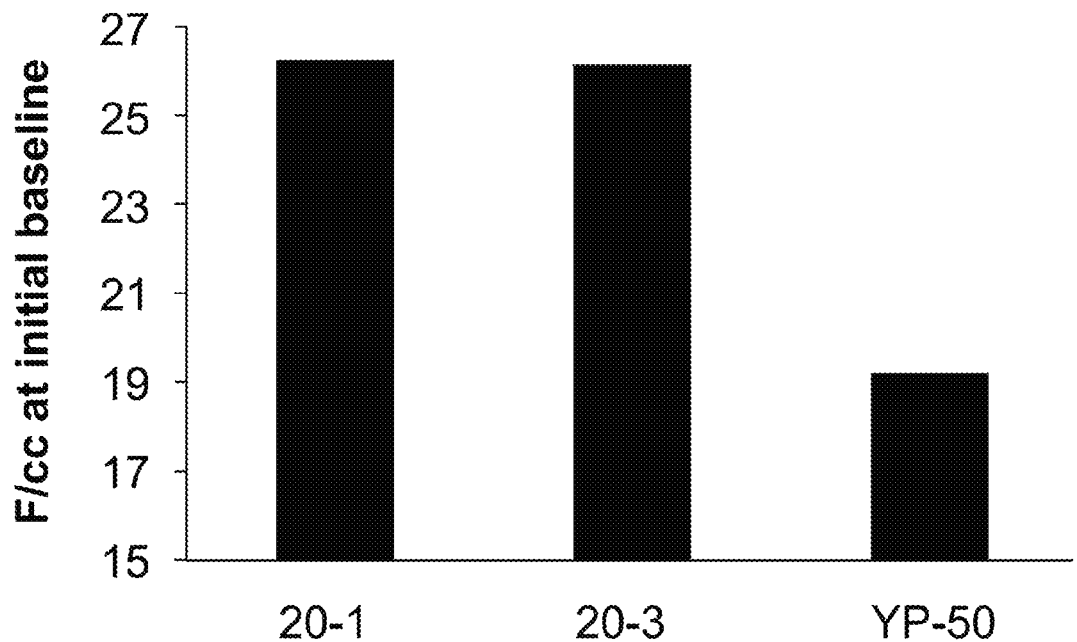
FIG. 23 depicts volumetric capacitance of carbon samples 20-1, 20-3 and control carbon (YP-50) at baseline.
Figure 24:
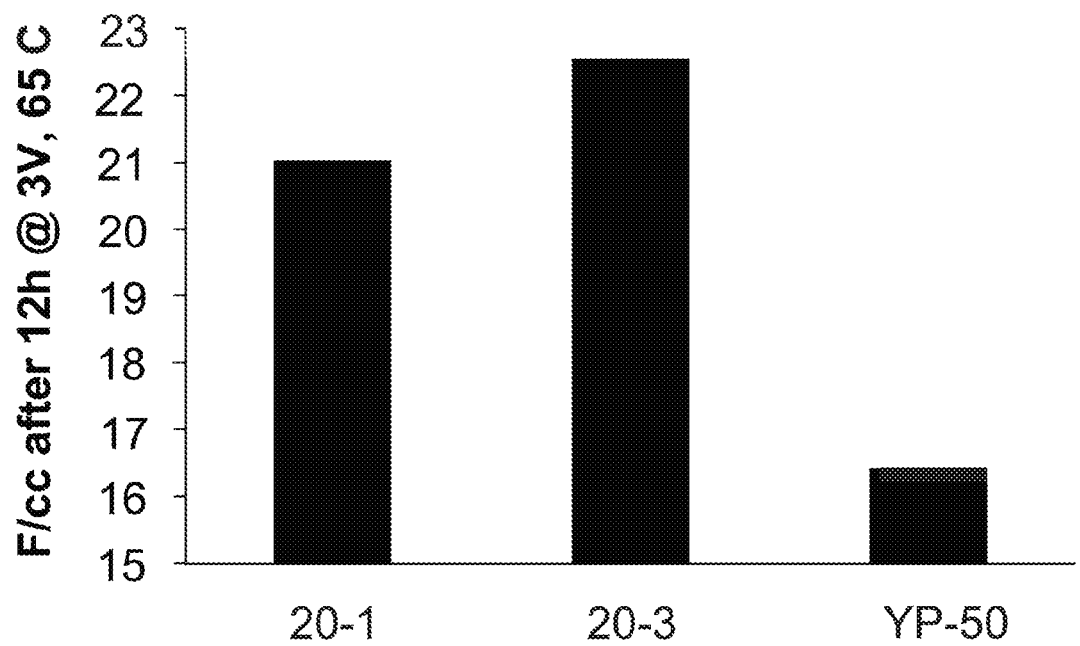
FIG. 24 depicts volumetric capacitance of carbon samples 20-1, 20-3 and control carbon (YP-50) after 3V voltage hold for 12 h at 65 C.

Preparation of Polymers from a Precursor System Comprised of BPA, HMT and Oxalic Acid, and Production and Characterization of Carbon Produced from Same Various polymeric materials were produced by mixing solid bisphenol A (BPA), solid hexamethylenetetramine (HMT), and solid oxalic acid (either dihydrate or anhydrous form) and incubating the solid, solvent-free mixture for 7 h at 130 C; the ratio of precursors is described in Table 17. The melting point of oxalic acid is 101-102 C. These polymers were pyrolyzed and activated generally according to the procedures described herein. Properties of the resulting activated carbons are described in Table 18. The carbons produced were highly microporous, as evidenced by the values of % micropores, % mesopores, and % macropores listed in Table 18. The conversion factors (as defined above) were 5.7, 7.2, and 6.3 for carbon samples 20-1, 20-2, and 20-3, respectively. Carbon samples 20-1 and 20-3 were examined for their electrochemical properties in an EDLC generally employing the procedures described herein. The measured volumetric capacitances were 26.3 F/cc and 26.2 F/cc for carbon samples 20-1 and 20-3, respectively. electrochemical properties in an EDLC generally employing the procedures described herein. The measured gravimetric capacitances were 116.0 F/g and 26.2 F/cc for carbon samples 20-1 and 20-3, respectively. For comparison, a commercial carbon, YP-50, was also tested and as can be seen the initial volumetric capacitance of carbon samples 20-1 and 20-3 were far greater (FIG. 23). This superiority in volumetric capacitance was also maintained after a stress test of the capacitors by a 3 V voltage hold for 12 hours at 65 C (see FIG. 24). It was noted that the sample produced from the precursor system comprising HMT, BPA and oxalic acid (20-3), exhibited 86.3% retention of F/g compared to the sample produced from the precursor system comprising HMT and BPA (20-1), which exhibited 80.1% F/g retention. These data demonstrate how the invention herein is capable of achieving extraordinarily high volumetric capacitance for carbon at baseline and also after stress testing at 3V and elevated temperature in the EDLC based on the TEATFB/acetonitrile system.

TABLE 17

Description of various polymer samples produced according to Example 20.

| Sample | Composition |
|---|---|
| 20-1 | 1.64:1 HMT:BPA (mol:mol) |
| 20-2 | 1.64:1:1 HMT:BPA:oxalic acid dihydrate (mol:mol:mol) |
| 20-3 | 1.64:1:1 HMT:BPA:oxalic acid anhydrous (mol:mol:mol) |

TABLE 18

Properties of various carbon samples produced according to Example 20.

| Carbon Sample | Surface Area (m2/g) | Pore Volume (cm3/g) | Micropores/ Mesopores/ Macropores (%/%/%) | F/g | F/cc | Max Th F/cc |
|---|---|---|---|---|---|---|
| 20-1 | 1281 | 0.552 | 96.3/1.7/2.0 | 116.0 | 26.3 | 29.4 |
| 20-2 | 1658 | 0.684 | 99.0/1.0/0 | 122.3 | 24.6 | 27.2 |
| 20-3 | 1416 | 0.584 | 100/0/0 | 119.2 | 26.2 | 29.1 |

Example 21

Electrochemical Characterization of Various Carbons

Figure 25:
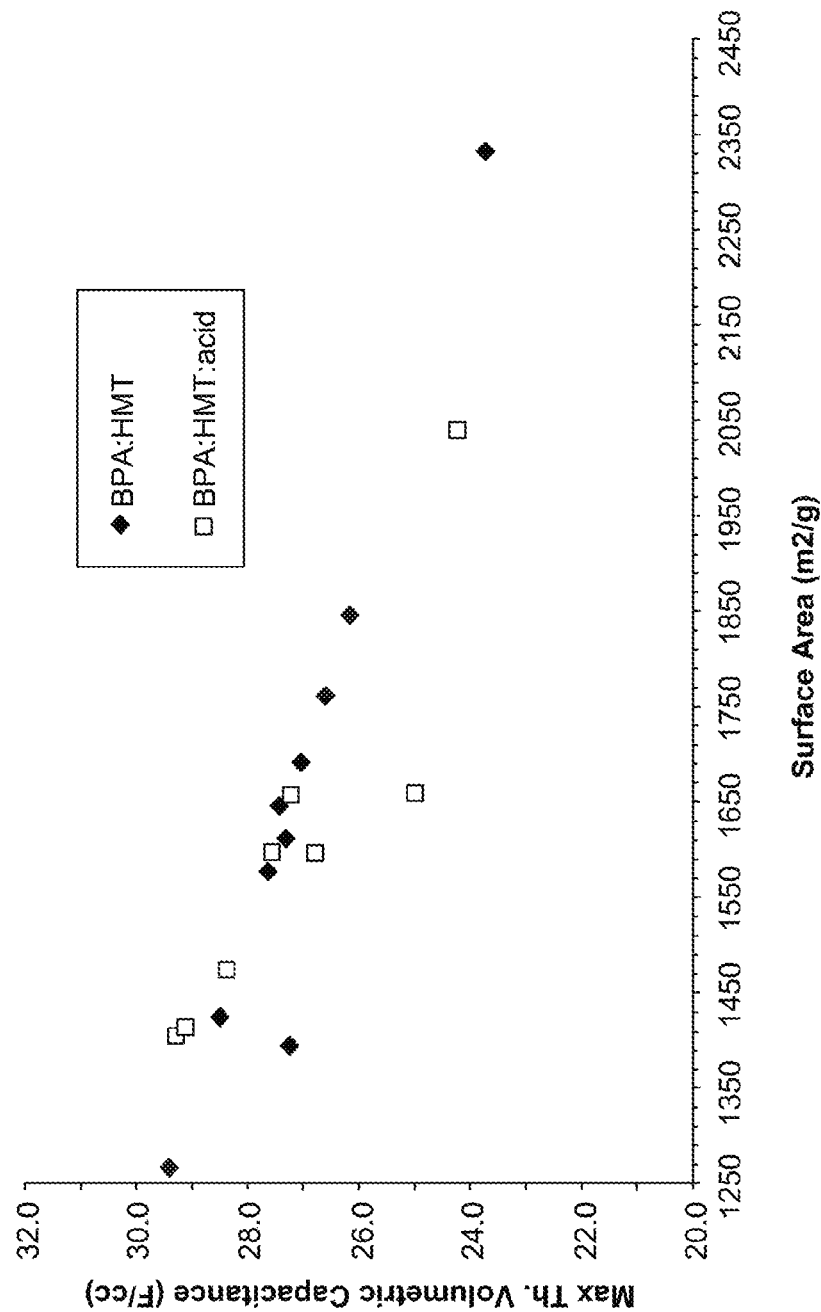
FIG. 25 depicts maximum theoretical volumetric capacitance for various carbons produced via solvent-free process as a function of surface area.
Figure 26:
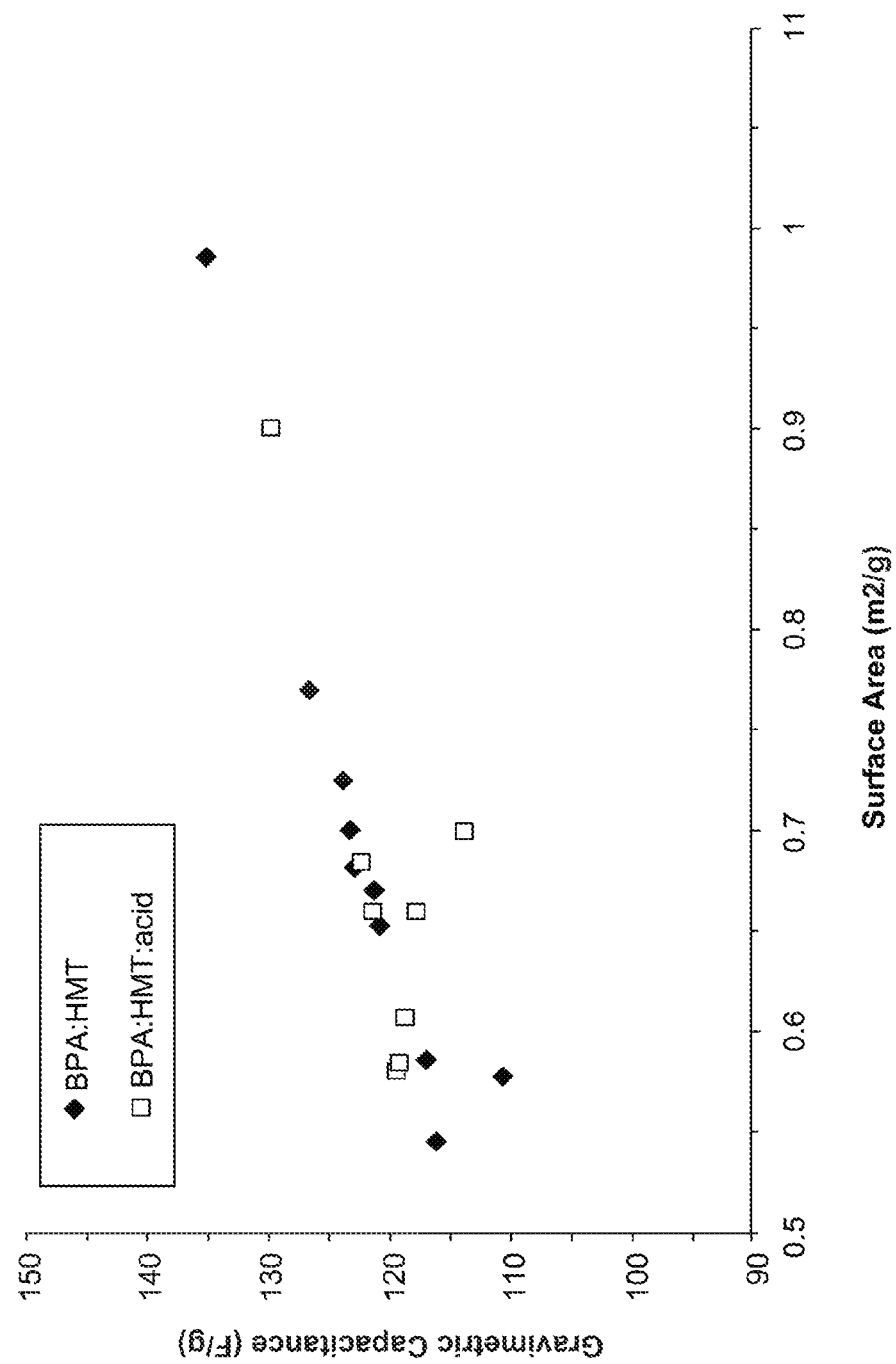
FIG. 26 depicts gravimetric capacitance for various carbons produced via solvent-free process as a function of total pore volume.

A variety of carbon samples were produced from either a binary precursor system comprised of BPA and HMT or a ternary precursor system comprised of BPA, HMT, and oxalic acid. A plot of the maximum theoretical F/cc as a function of carbon surface area is presented in FIG. 25. As can be seen, there was a trend for increasing maximum theoretical volumetric capacitance with decreasing surface area. A plot of the F/g as a function of carbon total pore volume is presented in FIG. 26. As can be seen, there was a trend for increasing gravimetric capacitance with increasing pore volume.

Example 22

Preparation of Carbon Materials Employing Solvent-Free Process

A monolithic, microporous polymer was formed using powder precursor materials. Exemplary raw materials in this regard are bisphenol A as monomer and hexamethylenetetramine as cross linking agent. The ratio of bisphenol A to hexamethylenetetramine was varied from 1:1 to 5:1. In certain instances, oxalic acid was added at a mol ratio of 1.63:1 hexamethylenetetramine:oxalic acid.

The powder mixtures were incubated at 140 C for varying time periods, for example overnight (corresponding to 18 hours). Over this period, the powders formed a polymer monolith. The polymer monolith was pyrolyzed and activated according to methods described elsewhere in the Specifications.

Example 23

Preparation of Activated Carbon from Monolithic Polymer Resin

In this example, a monolithic microporous dried polymer gel (formed from resorcinol, formaldehyde, and a volatile basic salt in the presence of a water acetic acid co-solvent system as described previously) is reacted in a hotbox oven set to 90° C. This is size reduced via a rock crusher and solvent removed using a lyophilization process.

A pyrolyzed carbon from this sample is fed into a rotary kiln system under inert atmosphere (nitrogen gas flow) at range of 600-800° C. This pyrolyzed carbon was fed into a fluidized bed reactor and heated under inert nitrogen atmosphere to 880° C. and then exposed to reactive carbon dioxide atmosphere. The carbon was cooled under nitrogen once the desired specific surface area was achieved.

The granular activated carbon was fed into an 8" Jet Mill and milled. The surface area was 1819 m2/g, the pore volume 0.763 cm3/g, the tap density was 0.66 g/cm3.

Example 24

Preparation of Activated Carbon with High Nitrogen Content

Solid state reacted materials using a nitrogen-containing cross-linker like Hexamethylenetetramine produce activated carbon materials in the 1-4% of total mass in the final carbon form.

Activated and pyrolyzed carbon materials are produced with even higher nitrogen contents by solid state reacting with nitrogen-containing chemicals such as urea and hexamethylenetetramine. Pyrolyzed and activated carbons described in Example 22 were mixed with a nitrogen-containing chemicals with a mortar and pestle in a 1:1 by mass ratio. This mixture was heated in an oven set to 130° C. for 12-24 hours. The resulting material was then treated in a tube furnace at 800° C. under inert atmosphere (nitrogen gas flow) for 60 minutes.

Example 25

Nitrogen Content of Various Carbon Compositions

A range of carbon materials produced from the range of chemistries as detailed in Example 22 and Example 23 were tested for Total Nitrogen Content on a Perkin Elmer CHN Analyzer Model 2400. The samples are described in Table 19.

TABLE 19

Description of various carbon samples of Example 25.

| Sample | Nitrogen Content (%) | Preparation Process |
|---|---|---|
| 25-1 | 8.1% | Carbon produced as described in Example 22, carbon further treated as described in example 24. |
| 25-2 | 3.6% | Carbon produced as described in Example 22 |
| 25-3 | 3.4% | Carbon produced as described in Example 22 |
| 25-4 | 1.3% | Carbon produced as described in Example 22 |
| 25-5 | 0.9% | Carbon produced as described in Example 23. |

This example illustrates the approach for solid state reaction of HMT or other nitrogenous solid compounds with a solid carbonaceous material to increase the nitrogen content of the carbonaceous materials. While not wishing to be bound by theory, it is believed that certain embodiments of carbon materials prepared according to this manner comprise substantially all, (e.g., greater than 90% and up to greater than 95%) of the absorbed nitrogen on the outer surface of the carbon particles where it is more accessible to electrolyte, rather than within the carbon particle where it would have substantially no contact with electrolyte. One skilled in the art can employ this approach for increasing nitrogen content of other carbonaceous materials, for example, other forms of carbon including, but not limited to, amorphous carbon, glassy carbon, hard carbon, graphite, graphene, other allotropes of carbon, and the like.

Example 26

Figure 27:
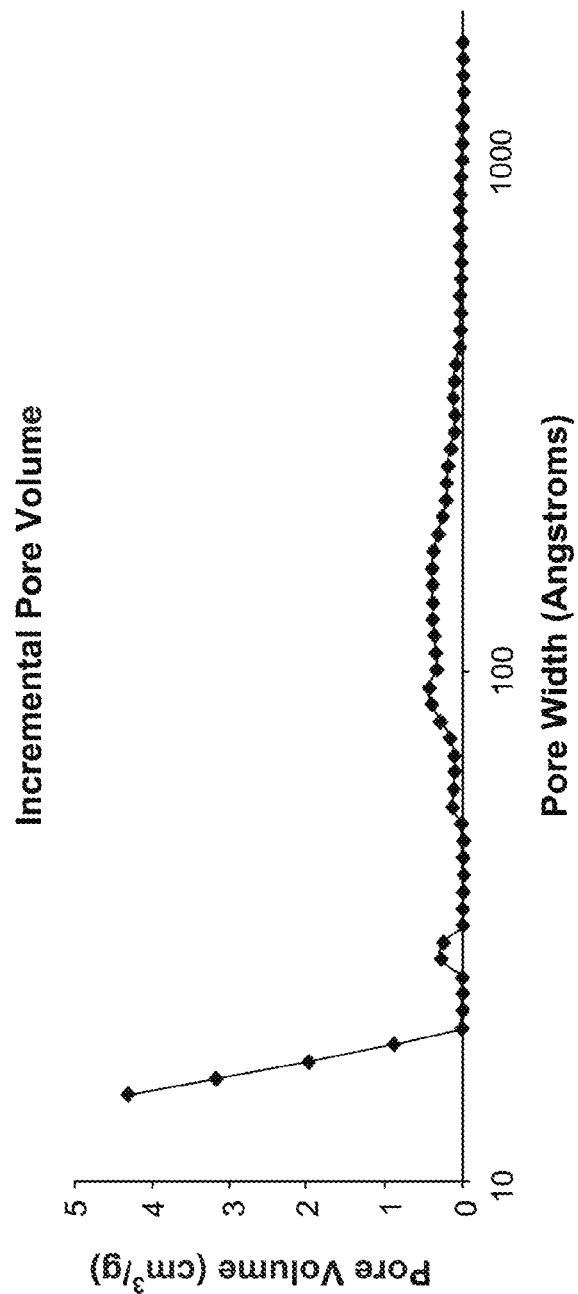
FIG. 27 depicts the DFT pore volume distribution for the carbon of Example 26.

Production of Carbon with Micro/Mesoporous Pore Structure Via Solvent-Free Processing A solid blend of 1:1:2 (mass:mass:mass) melamine:cyanuric acid:HMT was mixed via mortar and pestle and heated to 140 C for 6 h. This material was pyrolyzed employing the procedures described herein. The resulting carbon exhibited a surface area of 316 m2/g and a pore volume of 0.291 cm3/g. The pore volume distribution for the resulting carbon (FIG. 27) was comprised of 56.1% micropores, 34.5 mesopores and 9.3% macropores. This example illustrates that carbons with substantial fraction of pore volume in the mesopore region may be produced employing the solvent-free methodologies described herein.

Example 27

Figure 28:
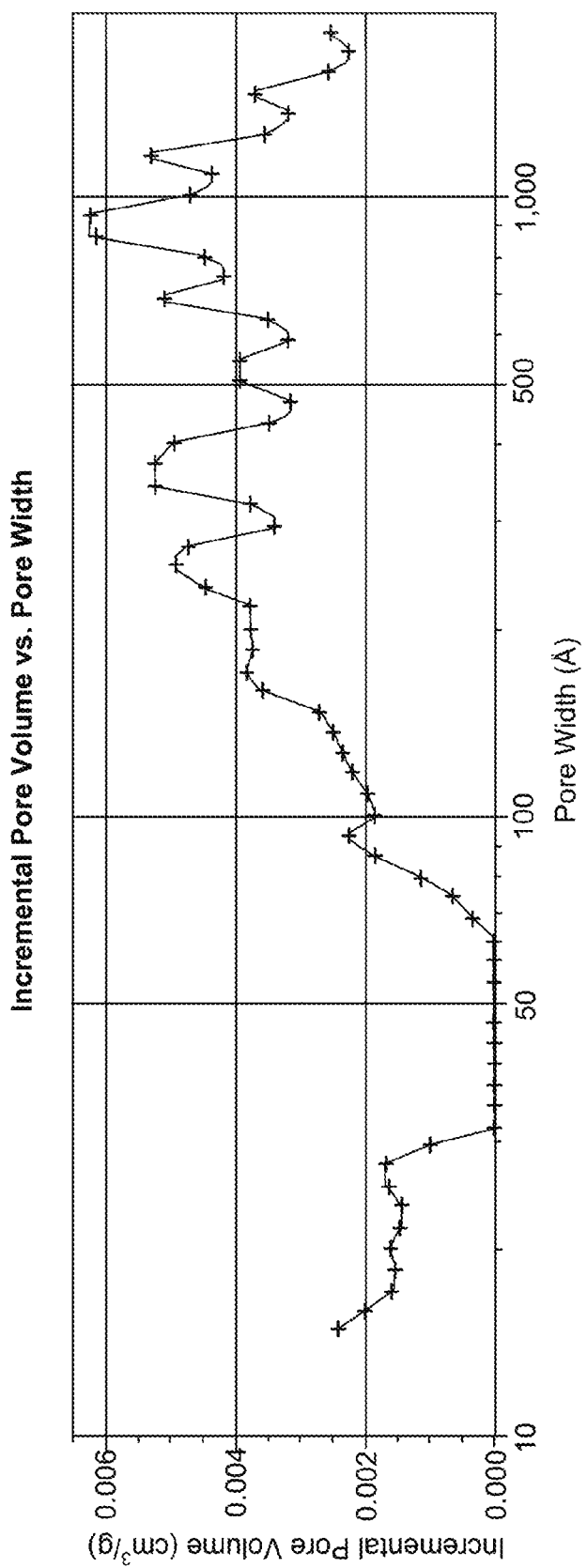
FIG. 28 depicts the DFT pore volume distribution for the carbon of Example 27.

Production of Carbon with Micro/Meso/Macroporous Pore Structure Via Solvent-Free Processing A solid blend of 1:1:1 (mass:mass:mass) cyanuric acid:HMT:urea was mixed via mortar and pestle and heated to 140 C overnight. This material was pyrolyzed employing the procedures described herein. The resulting carbon exhibited a surface area of 301 m2/g and a pore volume of 0.331 cm3/g. The pore volume distribution for the resulting carbon (FIG. 28) was comprised of 35.2% micropores, 2.9% mesopores and 61.9% macropores. This example illustrates that carbons with substantial fraction of pore volume in the macropore region may be produced employing the solvent-free methodologies described herein.

Example 28

One Step Preparation of Carbon from a Precursor System Comprised of BPA, HMT and Oxalic Acid, and Characterization of Same A solid blend of 2:1:1 (mass:mass:mass) BPA:HMT:oxalic acid dihydrate was mixed via shaking and placed into an alumina crucible. Sample 28-1 was produced by heating the crucible at 10 C per min to 900 C and held at 900 C for a dwell time of 360 min. A second sample (28-2) was produced by an analogous procedure except that the dwell time was 180 min, and then the sample was cooled to room temperature, and then heated a second time at 10 C per min to 900 C and held for a dwell time of an additional 180 min. Table 20 presents a summary of the carbon characterization. As can be seen, the single step, solvent-free process to create activated carbon from solid precursors was capable of producing highly microporous, high capacitance carbon at excellent yield.

TABLE 20

Properties of various carbon samples produced according to Example 28.

| Carbon Sample | Surface Area (m2/g) | Pore Volume (cm3/g) | Micropores/Mesopores/Macropores (%/%/%) | Conversion factor | Normalized conversion factor | F/g | F/cc | Max Th F/cc |
|---|---|---|---|---|---|---|---|---|
| 28-1 | 1563 | 0.644 | 100/0/0 | 7.9 | 8.5 | Not determined | | |
| 28-2 | 1474 | 0.607 | 100/0/0 | 6.8 | 7.6 | 118.8 | 25.7 | 28.4 |

One skilled in the art can envision other pyrolysis reactor configurations that may be suitable to practice the current invention, for example, but not limited to rotary kiln, microwave kiln, pusher-type kiln, elevator kiln, fluidized bed reactor, and the like.

Example 29

Electrochemical Performance of Carbon in Slurry-Based Electrode

Activated carbon (1800 m²/g surface area ad 0.77 cm3/g total pore volume) was produced from the ternary HMT:BPA:oxalic acid precursor system employing the solvent free process methodologies generally described via slurry-based method as known in the art employing an electrode formulation comprised of 90% active carbon, 5% conductivity enhancer, and 5% binder. The electrodes were assembled into an EDLC and electrochemical performance measured at a current density of 0.5 Amp/g employing an electrolyte comprising tetraethylammonium tetrafluoroborane in acetonitrile. The measured volumetric capacitance was 17.5 F/cc, the gravimetric capacitance was 120.8 F/g when normalized for the active carbon material, and the maximum theoretical volumetric capacitance was 25.0 F/cc as based on the pore volume of 0.77 cm3/g and the gravimetric capacitance normalized for active carbon material. Following an incubation of 12 h at 3 V and 65 C, the retention in the F/g was 89%. For comparison, a commercial carbon, YP-50 was measured under the same electrode processing and electrochemical conditions. The YP-50 sample exhibited 17.0 F/cc at baseline, and the F/g retention was only 80% after the same 12 h at 3V and 65 C condition. Therefore, carbon produced from HMT:BPA:oxaliac precursor system and solvent-free processing exhibit capacitance initially and a superior resistance to capacitance fade after the high voltage, high temperature exposure. Additionally, a cyclic voltammetry sweep was conducted as known in the art for the carbon of this example and the YP-50 commercial control carbon.

FIGS. 29A-D present results of the cyclic voltammetry In FIGS. 29A-D, "A" denotes the carbon of this example and "B" denotes YP-50. The Y axis presents current data in mA (−14 to 14 mA), while the X axis presents voltage data (either 0 to 2.7V or 0 to 3.0 V as described for each figure).

Figure 29A:
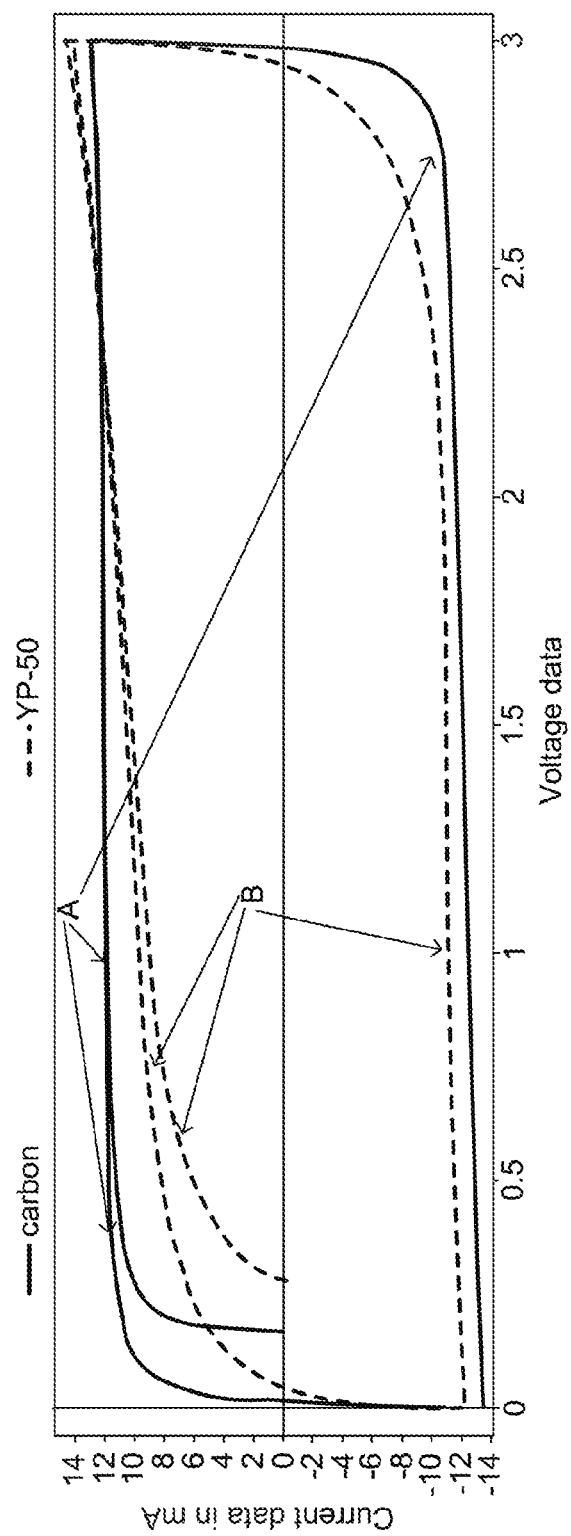
FIG. 29A-D depicts cyclic voltammetry data for an exemplary carbon according to an embodiment of the present invention and a commercially available carbon.
Figure 29B:
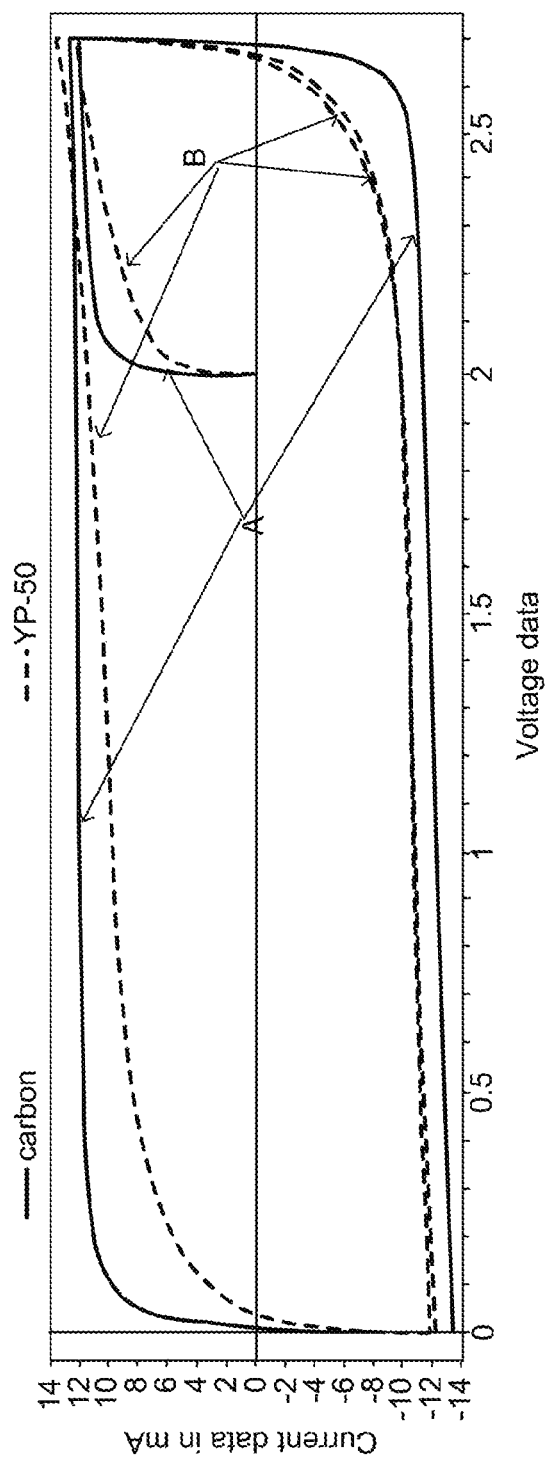
Figure 29C:
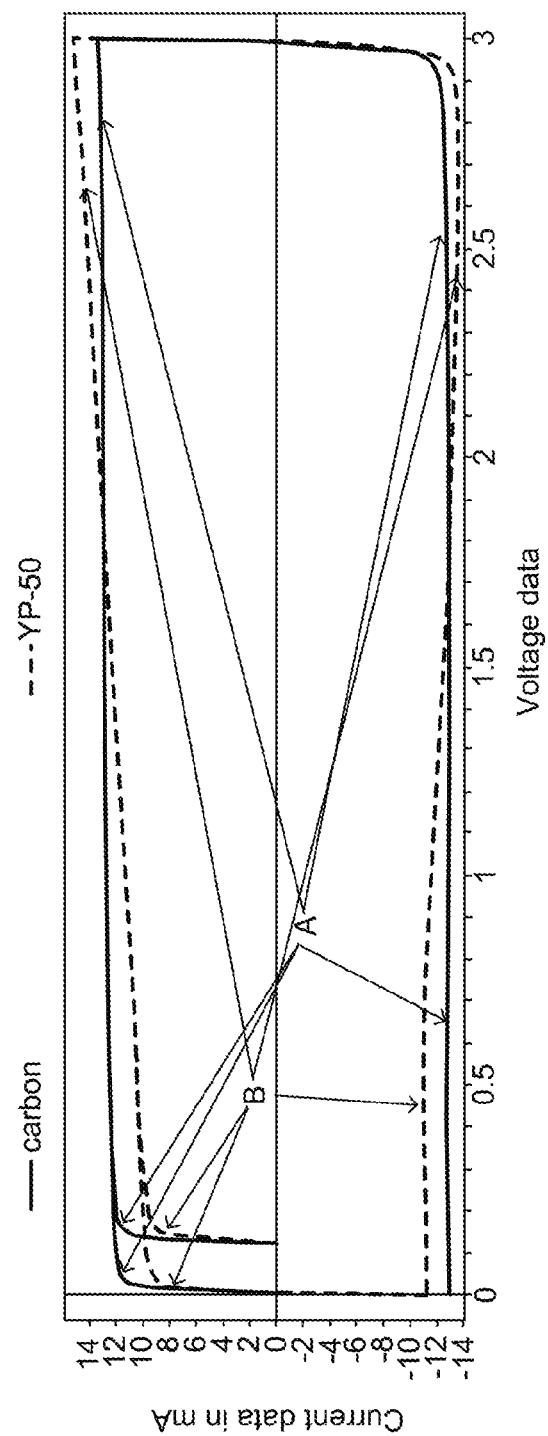
Figure 29D:
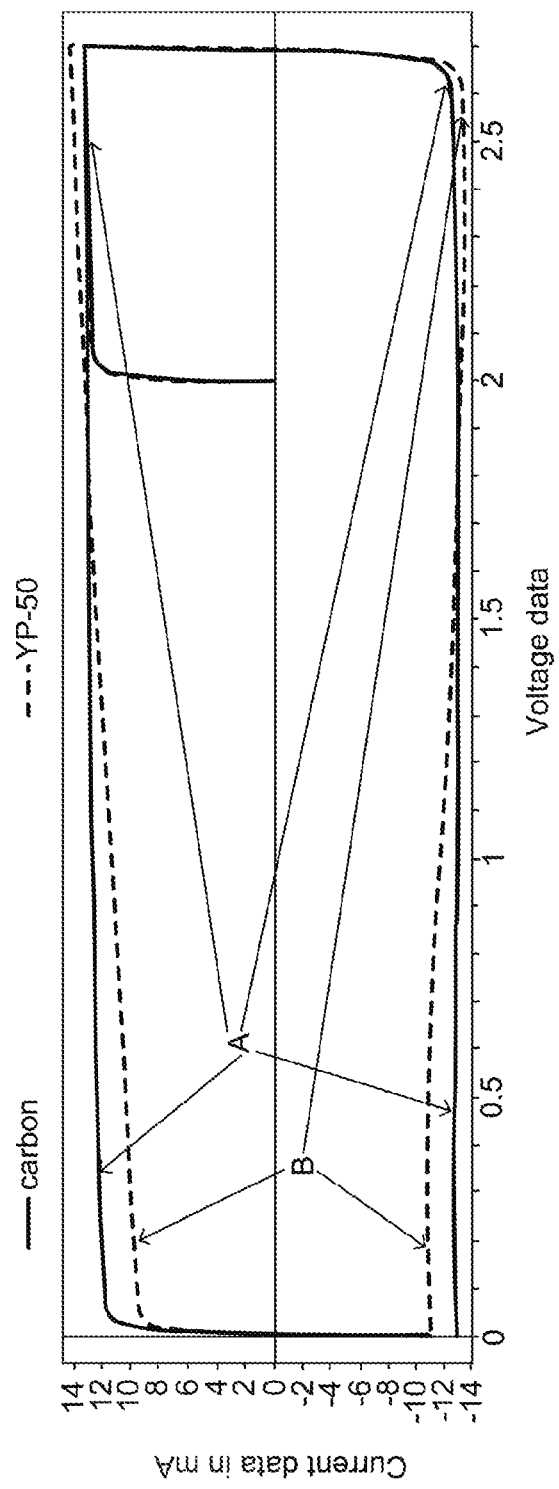

FIG. 29A shows the comparison for the two carbons cycled up to 2.7 V at the initial baseline. FIG. 29B shows the comparison for the two carbons cycled up to 3.0 V at the initial baseline. FIG. 29C shows the comparison for the two carbons cycled up to 2.7 V after the incubation at 12 h at 3 V and 65 C. FIG. 29D shows the comparison for the two carbons cycled up to 3.0 V after the incubation at 12 h at 3 V and 65 C. In all circumstances, the carbon produced from HMT:BPA:oxaliac precursor system and solvent-free processing exhibits shows a more box-like structure to the data. The "box-like" behavior is indicative of an efficient electric double layer capacitance (EDLC) effect, desirable for ultracapacitors. The lower current response at higher voltages (~3V) indicates greater stability and little to no charge transfer occurring to side reactions as opposed to the commercial carbon, which shows increasing current at higher voltage.

One method to quantitate the fit of the CV data to ideal box shape is to calculate a "boxellation factor" (BF) which equals the difference of the current at 90% max voltage and the current at 10% max voltage divided by the current at 50% max voltage (BF=(i@0.9 $v_{max}$-i@0.1 $v_{max}$)/i@0.5 $v_{max}$. For the control sample of Example 29 (YP-50), the calculated BF at baseline was about 0.3 and 0.4 at 2.7 V and 3 V, respectively, whereas for the carbon produced employing the solvent free process and based on the HMT:BPA:oxaliac acid precursors, the BF at baseline was about 0.1 and 0.1, respectively. For the control sample of Example 29, the calculated BF after the incubation at 12 h at 3 V and 65 C was about 0.6 and 0.7 at 2.7 V and 3 V, respectively, whereas for the carbon produced employing the solvent free process and based on the HMT:BPA:oxaliac acid precursors, the BF after the incubation was about 0.1 and 0.1, respectively.

Accordingly, certain embodiments are directed to carbon materials having low boxellation factors. For example, in certain embodiments, the BF at baseline is less than about 0.3, less than about 0.2, less than about 0.15 or even less than about 0.1. In other embodiments, the BF after an incubation period as described above is less than about 0.5, less than about 0.4, less than about 0.3, less than about 0.2, less than about 0.15 or even less than about 0.1. The BF of the carbon materials is calculated and tested according to the above description.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Application No. 61/786,074, filed Mar. 14, 2013, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for preparing a carbon material, comprising:
   a. preparing a mixture by physically blending polymer precursors, wherein the mixture comprises less than 10% solvent by weight, and the polymer precursors comprise monomers;
   b. aging the mixture at a temperature for a time sufficient for the polymer precursors to react with each other and form a polymer; and
   c. pyrolyzing the polymer in an inert atmosphere.

2. The method of claim 1, wherein the inert atmosphere comprises nitrogen gas.

3. The method of claim 1, wherein the temperature ranges from 500 to 2400° C.

4. The method of claim 1, wherein the polymer precursors comprise hexamethylenetetramine and bisphenol A.

5. The method of claim 4, wherein the hexamethylenetetramine and bisphenol A are present at a mole ratio between 0.05:1 and 5:1, respectively.

6. The method of claim 1, wherein the pyrolyzing is performed in a rotary kiln, a microwave kiln, a pusher-type kiln, an elevator kiln, or a fluid bed reactor.

7. The method of claim 1, further comprising activating the pyrolyzed polymer in an atmosphere comprising carbon dioxide, carbon monoxide, steam, oxygen or combinations thereof.

8. The method of claim 7, wherein the activating is performed at a temperature ranging from 800 to 1300° C.

9. The method of claim 7, wherein the polymer precursors comprise hexamethylenetetramine and bisphenol A.

10. The method of claim 9, wherein the hexamethylenetetramine and bisphenol A are present at a mole ratio between 0.05:1 and 5:1, respectively.

11. The method of claim 7, wherein the activating is performed in a rotary kiln, a microwave kiln, a pusher-type kiln, an elevator kiln, or a fluid bed reactor.

12. A method for preparing a carbon material, comprising:
    a. preparing a mixture by physically blending polymer precursors, wherein the mixture comprises less than 10% solvent by weight, and the polymer precursors comprise monomers; and
    b. heating the mixture at temperatures ranging from 500 to 2400° C. in an inert atmosphere comprising nitrogen gas.

13. The method of claim 12, wherein the polymer precursors comprise hexamethylenetetramine and bisphenol A.

14. The method of claim 13, wherein the hexamethylenetetramine and bisphenol A are present at a mole ratio between 0.05:1 and 5:1, respectively.

15. The method of claim 12, wherein the heating is performed in a rotary kiln, a microwave kiln, a pusher-type kiln, an elevator kiln, or a fluid bed reactor.

16. A method for preparing a carbon material, comprising:
    a. preparing a mixture by physically blending polymer precursors, wherein the mixture comprises less than 10% solvent by weight, and the polymer precursors comprise monomers; and
    b. heating the mixture at temperatures ranging from 800 to 1300° C. in an atmosphere comprising carbon dioxide, carbon monoxide, steam, oxygen or combinations thereof.

17. The method of claim 16, wherein the polymer precursors comprise hexamethylenetetramine and bisphenol A.

18. The method of claim 17, wherein the hexamethylenetetramine and bisphenol A are present at a mole ratio between 0.05:1 and 5:1, respectively.

19. The method of claim 16, wherein the heating is performed in a rotary kiln, a microwave kiln, a pusher-type kiln, an elevator kiln, or a fluid bed reactor.

* * * * *